United States Patent
Ji et al.

(10) Patent No.: US 11,736,252 B2
(45) Date of Patent: Aug. 22, 2023

(54) METHOD AND APPARATUS FOR SIGNAL TRANSMISSION TO HIGH SPEED MOBILE UE IN A WIRELESS COMMUNICATION SYSTEM

(71) Applicant: Samsung Electronics Co., Ltd., Suwon-si (KR)

(72) Inventors: Hyoungju Ji, Suwon-si (KR); Jinhyun Park, Suwon-si (KR); Taehyoung Kim, Suwon-si (KR); Jinyoung Oh, Suwon-si (KR); Youngrok Jang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 28 days.

(21) Appl. No.: 17/501,388

(22) Filed: Oct. 14, 2021

(65) Prior Publication Data

US 2022/0123891 A1 Apr. 21, 2022

(30) Foreign Application Priority Data

Oct. 15, 2020 (KR) .................... 10-2020-0133761

(51) Int. Cl.
*H04L 5/00* (2006.01)
*H04W 72/10* (2009.01)
*H04W 72/23* (2023.01)

(52) U.S. Cl.
CPC ........... *H04L 5/0048* (2013.01); *H04W 72/23* (2023.01)

(58) Field of Classification Search
CPC .............................. H04L 5/004; H04W 72/042
See application file for complete search history.

(56) References Cited

U.S. PATENT DOCUMENTS

| 2020/0106559 | A1 | 4/2020 | Vilaipornsawai et al. |
| 2020/0228263 | A1 | 7/2020 | Khoshnevisan et al. |
| 2022/0132593 | A1* | 4/2022 | Ren .................... H04W 72/0446 |
| 2022/0225359 | A1* | 7/2022 | Kim ...................... H04L 5/0094 |

OTHER PUBLICATIONS

International Search Report dated Jan. 24, 2022, issued in an International Application No. PCT/KR2021/014292.
CMCC; Enhancements on HST-SFN deployment; 3GPP TSG RAN WG1 #102-e; R1-2006204; e-Meeting, Aug. 7, 2020.
Huawei, HiSilicon; Enhancements on Multi-TRP for high speed train in Rel-17; 3GPP TSG RAN WG1 Meeting #102-e R1-2006394; e-Meeting, Aug. 8, 2020.

(Continued)

*Primary Examiner* — Ronald B Abelson
(74) *Attorney, Agent, or Firm* — Jefferson IP Law, LLP

(57) ABSTRACT

The present disclosure relates to a communication method and system for converging a 5th-Generation (5G) communication system for supporting higher data rates beyond a 4th-Generation (4G) system with a technology for Internet of Things (IoT). The present disclosure may be applied to intelligent services based on the 5G communication technology and the IoT-related technology, such as smart home, smart building, smart city, smart car, connected car, health care, digital education, smart retail, security and safety services. A signal transmission/reception method and apparatus for a high-speed mobile user equipment (UE) in a wireless communication system are provided.

20 Claims, 26 Drawing Sheets

(56) References Cited

OTHER PUBLICATIONS

Qualcomm Incorporated; Enhancements on HST-SFN deployment; 3GPP TSG-RAN WG1 Meeting #102-e R1-2006794; e-Meeting, Aug. 8, 2020.

3rd Generation Partnership Project; Technical Specification Group Radio Access Network; Evolved Universal Terrestrial Radio Access (E-UTRA); User Equipment (UE) radio transmission and reception (Release 16), 3GPP TS 36.101 V16.6.0 (Jun. 2020).

3rd Generation Partnership Project; Technical Specification Group Radio Access Network; NR; User Equipment (UE) radio transmission and reception; Part 1: Range 1 Standalone (Release 16) 3GPP TS 38.101-1 V16.4.0 (Jun. 2020).

3rd Generation Partnership Project; Technical Specification Group Radio Access Network; NR; Physical layer procedures for data (Release 16), 3GPP TS 38.214 V16.2.0 (Jun. 2020).

\* cited by examiner

METHOD AND APPARATUS FOR SIGNAL TRANSMISSION TO HIGH SPEED MOBILE UE IN A WIRELESS COMMUNICATION SYSTEM

CROSS-REFERENCE TO RELATED APPLICATION(S)

This application is based on and claims priority under 35 U.S.C. § 119(a) of a Korean patent application number 10-2020-0133761, filed on Oct. 15, 2020, in the Korean Intellectual Property Office, the disclosure of which is incorporated by reference herein in its entirety.

BACKGROUND

1. Field

The disclosure relates to a signal transmission/reception method and apparatus for a high-speed mobile User Equipment (UE) in a wireless communication system.

2. Description of Related Art

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a method and an apparatus for transmitting or receiving a reference signal for efficient uplink or downlink management for various services in a mobile communication system.

In accordance with an aspect of the disclosure, a method performed by a terminal in a wireless communication system is provided. The method includes receiving, from a base station, a tracking reference signal, transmitting, to the base station, an uplink signal based on the tracking reference signal, receiving, from the base station, control information associated with a quasi-co-location (QCL) relationship between the tracking reference signal and a downlink channel, and receiving, from the base station, the downlink channel transmitted with frequency offset pre-compensation which is based on the uplink signal.

In accordance with an aspect of the disclosure, a method performed by a base station in a wireless communication system is provided. The method includes transmitting, to a terminal, a tracking reference signal, receiving, from the terminal, an uplink signal transmitted based on the tracking reference signal, transmitting, to the terminal, control information associated with a quasi-co-location (QCL) relationship between the tracking reference signal and a downlink channel, and transmitting, to the terminal, the downlink channel with frequency offset pre-compensation based on the uplink signal.

In accordance with an aspect of the disclosure, a terminal in a wireless communication system is provided. The terminal includes a transceiver a controller. The controller is configured to receive, from a base station via the transceiver, a tracking reference signal, transmit, to the base station via the transceiver, an uplink signal based on the tracking reference signal, receive, from the base station via the transceiver, control information associated with a quasi-co-location (QCL) relationship between the tracking reference signal and a downlink channel, and receive, from the base station via the transceiver, the downlink channel transmitted with frequency offset pre-compensation which is based on the uplink signal.

In accordance with an aspect of the disclosure, a base station in a wireless communication system is provided. The base station includes a transceiver and a controller. The controller is configured to transmit, to a terminal via the transceiver, a tracking reference signal, receive, from the terminal via the transceiver, an uplink signal transmitted based on the tracking reference signal, transmit, to the terminal via the transceiver, control information associated with a quasi-co-location (QCL) relationship between the tracking reference signal and a downlink channel, and transmit, to the terminal via the transceiver, the downlink channel with frequency offset pre-compensation based on the uplink signal.

Another aspect of the disclosure is to provide a method and an apparatus for transmitting data and a reference signal for stable uplink or downlink transmission or reception of a high speed mobile terminal in a mobile communication system.

Additional aspects will be set forth in part in the description which follows and, in part, will be apparent from the description, or may be learned by practice of the presented embodiments.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

The same reference numerals are used to represent the same elements throughout the drawings.

DETAILED DESCRIPTION

Figure 1:
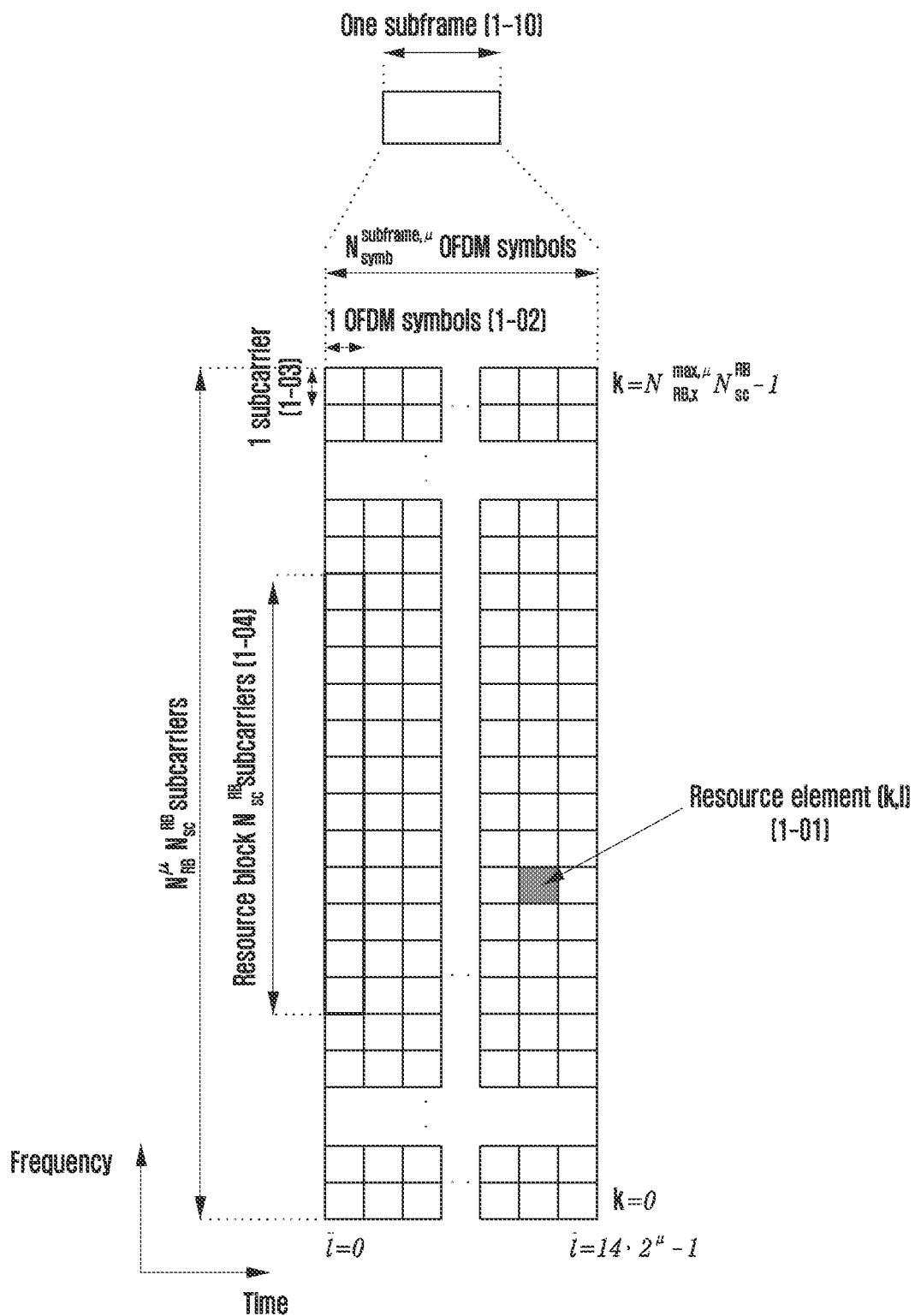
FIG. 1 is a diagram illustrating a basic structure of a time-frequency domain, which is a radio resource domain of a 5G system, according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In describing embodiments of the disclosure, descriptions related to technical contents well-known in the art and not associated directly with the disclosure will be omitted. Such an omission of unnecessary descriptions is intended to prevent obscuring of the main idea of the disclosure and more clearly transfer the main idea.

For the same reason, in the accompanying drawings, some elements may be exaggerated, omitted, or schematically illustrated. Further, the size of each element does not completely reflect the actual size. In the drawings, identical or corresponding elements are provided with identical reference numerals.

The advantages and features of the disclosure and ways to achieve them will be apparent by making reference to embodiments as described below in detail in conjunction with the accompanying drawings. However, the disclosure is not limited to the embodiments set forth below, but may be implemented in various different forms. The following embodiments are provided only to completely disclose the disclosure and inform those skilled in the art of the scope of the disclosure, and the disclosure is defined only by the scope of the appended claims. Throughout the specification, the same or like reference numerals designate the same or like elements.

Herein, it will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operations to be performed on the computer or other programmable apparatus to produce a computer implemented process such that the instructions that execute on the computer or other programmable apparatus provide operations for implementing the functions specified in the flowchart block or blocks.

Further, each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

As used in embodiments of the disclosure, the "unit" refers to a software element or a hardware element, such as a Field Programmable Gate Array (FPGA) or an Application Specific Integrated Circuit (ASIC), which performs a predetermined function. However, the "unit" does not always have a meaning limited to software or hardware. The "unit" may be constructed either to be stored in an addressable storage medium or to execute one or more processors. Therefore, the "unit" includes, for example, software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by the "unit" may be either combined into a smaller number of elements, or a "unit", or divided into a larger number of elements, or a "unit". Moreover, the elements and "units" or may be implemented to reproduce one or more central processing units (CPUs) within a device or a security multimedia card. Further, the "unit" in the embodiments may include one or more processors.

Hereinafter, embodiments of the disclosure will be described in detail with reference to the accompanying drawings. In the following description of the disclosure, a detailed description of known functions or configurations incorporated herein will be omitted when it is determined that the description may make the subject matter of the disclosure unnecessarily unclear. The terms which will be described below are terms defined in consideration of the functions in the disclosure, and may be different according to users, intentions of the users, or customs. Therefore, the definitions of the terms should be made based on the contents throughout the specification. In the following description, a base station is an entity that allocates resources to terminals, and may be at least one of a gNode B, an eNode B, a Node B, a base station (BS), a wireless access unit, a base station controller, and a node on a network. A terminal may include a user equipment (UE), a mobile station (MS), a cellular phone, a smartphone, a computer, or a multimedia system capable of performing communication functions. Of course, examples of the base station and the terminal are not limited thereto. The following description of the disclosure is directed to a technology for receiving, by a terminal, broadcast information from a base station. The disclosure relates to a communication technique for converging IoT technology with a 5G (5th generation) communication system designed to support a higher data transfer rate beyond the 4G (4th generation) system, and a system therefor. The disclosure may be applied to intelligent services (e.g., smart homes, smart buildings, smart cities, smart cars or connected cars, healthcare, digital education, retail business, security and safety-related services, etc.) on the basis of 5G communication technology and IoT-related technology.

In the following description, terms referring to broadcast information, terms referring to control information, terms related to coverage, terms referring to state changes (e.g., events), terms referring to network entities, terms referring to messages, terms referring to device elements, and the like are illustratively used for the sake of convenience. Therefore, the disclosure is not limited by the terms as used below, and other terms referring to subjects having equivalent technical meanings may be used.

In the following description, some of terms and names defined in the 3rd generation partnership project long term evolution (3GPP LTE) standards mat be used for the convenience of description. However, the disclosure is not limited by these terms and names, and may be applied in the same way to systems that conform other standards.

A wireless communication system has evolved from providing an initial voice-oriented service to a broadband wireless communication system that provides high-speed and high-quality packet data services, such as high speed packet access (HSPA) in 3GPP, long-term evolution (LTE) or evolved universal terrestrial radio access (E-UTRA), LTE-advanced (LTE-A), LTE-pro, high rate packet data (HRPD) in 3GPP2, ultra-mobile broadband (UMB), and communication standards such as IEEE's 802.16e.

In the LTE system, which is a representative example of a broadband wireless communication system, in downlink (DL), orthogonal frequency division multiplexing (OFDM) scheme is adopted, and in uplink (UL), single carrier frequency division multiple access (SC-FDMA) scheme is adopted. Uplink refers to a radio link in which a terminal (user equipment (UE) or mobile station (MS)) transmits data or control signals to a base station (eNode B (eNB) or base station (BS)), and downlink refers to a radio link through which a base station transmits data or control signals to the terminal. In addition, the above-described multiple access method allows the data or control information of each user to be distinguished by allocating and operating the time-frequency resources to which the data or control information for each user are to be transmitted do not overlap each other, that is, to establish orthogonality.

The 5G communication system, which is a communication system after LTE, must support services that simultaneously satisfy various requirements so that various requirements from users and service providers can be freely reflected. Services considered for the 5G communication system include enhanced mobile broadband (eMBB), massive machine type communication, (mMTC), and Ultra reliability low latency communication (URLLC).

According to some embodiments, eMBB aims to provide more improved data transfer rates than those supported by existing LTE, LTE-A or LTE-Pro. For example, in the 5G communication system, the eMBB should be able to provide a peak data rate of 20 Gbps in the downlink and a peak data rate of 10 Gbps in the uplink from the viewpoint of one base station. In addition, the 5G communication system must provide the peak data rate and, at the same time, provide the increased user perceived data rate of the terminal. In order to satisfy such a requirement, it may be required to improve various transmission/reception technologies, including a more advanced multi-antenna (multi input multi output, (MIMO)) transmission technology. In addition, in the LTE system, a signal is transmitted using a transmission bandwidth of up to 20 MHz in the 2 GHz band, whereas the 5G communication system can satisfy the data transmission rate required by the 5G communication system by using a frequency bandwidth wider than 20 MHz in a frequency band of 3 to 6 GHz or 6 GHz or more.

At the same time, mMTC is being considered to support application services such as the Internet of Things (IoT) in the 5G communication system. In order to efficiently provide the Internet of Things, mMTC requires access support for large-scale terminals within a cell, improvement of coverage of terminals, improved battery life, and reduction of costs of terminals. Because the Internet of Things is attached to various sensors and various devices to provide communication functions, it must be able to support a large number of terminals (e.g., 1,000,000 UEs/km) within a cell. In addition, because a terminal supporting mMTC is highly likely to be located in a shaded area that a cell cannot cover, such as the basement of a building, due to the nature of the service, it requires wider coverage compared to other services provided by the 5G communication system. A terminal supporting mMTC must be composed of a low-cost terminal, and because it is difficult to frequently exchange the battery of the terminal, a very long battery life time is required.

Lastly, in the case of URLLC, it is a cellular-based wireless communication service used for a specific purpose (mission-critical). For example, services used for remote control of a robot or machinery, industrial automation, an unmanned aerial vehicle, remote health care, an emergency alert, etc. may be considered. Therefore, the communication provided by URLLC must provide very low latency and very high reliability. For example, a service supporting URLLC must satisfy the air interface latency of less than 0.5 milliseconds and, at the same time, must satisfy the requirement of a packet error rate of 10-5 or less. Therefore, for a service supporting URLLC, the 5G system must provide a transmit time interval (TTI) that is smaller than that of other services, and at the same time must allocate a wide resource in a frequency band to secure the reliability of the communication link. However, the aforementioned mMTC, URLLC, and eMBB are only examples of different service types, and the service types to which the disclosure is applied are not limited to the above-described examples.

The services considered in the above-mentioned 5G communication system should be provided by convergence with each other based on one framework. That is, for efficient resource management and control, it is preferable that each service is integrated and controlled and transmitted as a single system rather than being operated independently.

In addition, although the embodiment of the disclosure will be described below using LTE, LTE-A, LTE Pro, or new radio (NR) system as an example, the embodiment of the disclosure may be applied to other communication systems having a similar technical background or channel type. In addition, the embodiments of the disclosure may be applied to other communication systems through some modifications within the scope of the disclosure as judged by a person having skilled technical knowledge.

Hereinafter, a frame structure of the 5G system will be described in more detail with reference to the drawings.

FIG. 1 is a diagram illustrating a basic structure of a time-frequency domain, which is a radio resource domain in which data or control information is transmitted in a wireless communication system, according to an embodiment of the disclosure.

Referring to FIG. 1, the horizontal and vertical axes of the time-frequency domain represent the time domain and the frequency domain, respectively. The basic unit of resource in the time domain and frequency domain is a resource element (RE) 1-01, which may be defined as one orthogonal frequency division multiplexing (OFDM) symbol 1-02 in the time domain and may be defined as one subcarrier 1-03 in the frequency domain. As an example, one resource block (RB) 1-04 in the frequency domain may consist of 12 consecutive REs ($N_{sc}^{RB}$). In one embodiment, one subframe 1-10 may consist of a plurality of OFDM symbols.

Figure 2:
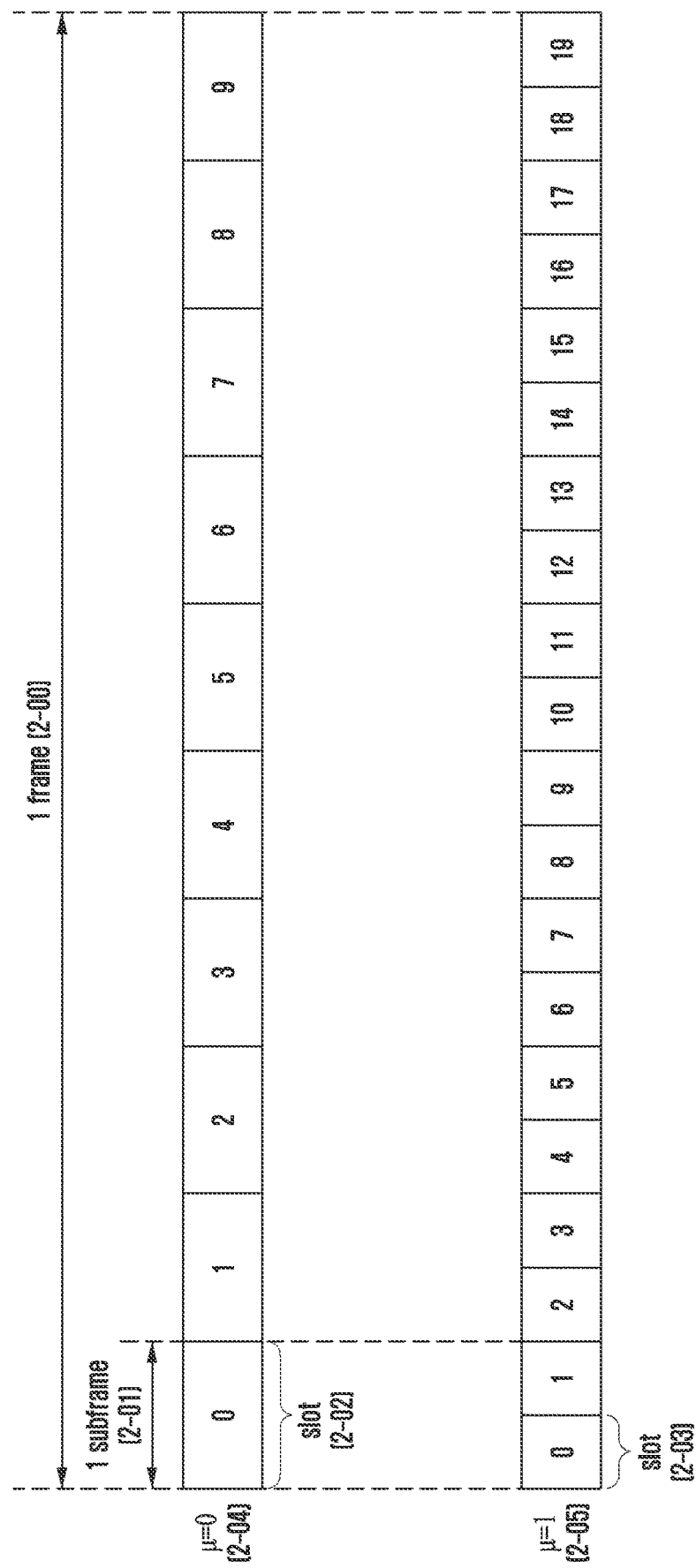
FIG. 2 is a diagram illustrating a slot structure considered in a 5G system according to an embodiment of the disclosure.

FIG. 2 is a diagram illustrating a slot structure considered in a wireless communication system according to an embodiment of the disclosure.

Referring to FIG. 2, one frame 2-00 may include one or more subframes 2-01, and one subframe may include one or more slots 2-02. For example, one frame 2-00 may be defined as 10 ms. One subframe 2-01 may be defined as 1 ms, and in this case, one frame 2-00 may consist of a total of 10 subframes 2-01. One slot 2-02 and 2-03 may be defined as 14 OFDM symbols. That is, the number of symbols per slot lot ($N_{symb}^{slot}$) may have a value of '14'. One subframe 2-01 may consist of one or more slots 2-02 and 2-03, and the number of slots 2-02 and 2-03 per one subframe 2-01 may vary according to a set value (μ) 2-04 and 2-05 for the subcarrier spacing. In the example of FIG. 2, the slot structure in the case where μ=0 (2-04) and μ=1 (2-05) is illustrated as the subcarrier spacing set value. When μ=0 (2-04), one subframe 2-01 may consist of one slot 2-02, and when μ=1 (2-05), one subframe 2-01 may consist of two slots 2-03. That is, depending on the set value μ for the subcarrier spacing, the number of slots per one subframe ($N_{slot}^{subframe,\mu}$) may vary, and accordingly, the number of slots per one frame ($N_{slot}^{frame,\mu}$) may vary. $N_{slot}^{subframe,\mu}$ and $N_{slot}^{frame,\mu}$ according to each subcarrier spacing set value μ may be defined in Table 1 below.

TABLE 1

| μ | $N_{symb}^{slot}$ | $N_{slot}^{frame, \mu}$ | $N_{slot}^{subframe, \mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |
| 5 | 14 | 320 | 32 |

In the 5G wireless communication system, a synchronization signal block (can be mixed with SSB, SS block, SS/PBCH block, etc.) may be transmitted for initial access, and the synchronization signal block may be composed of a primary synchronization signal (PSS), a secondary synchronization signal (SSS), and a physical broadcast channel (PBCH). More specifically, the synchronization signal block may be defined as follows.

PSS: a reference signal serving for downlink time/frequency synchronization may provide some information on cell ID.

SSS: serves as a reference for downlink time/frequency synchronization, and may provide the remaining cell ID information not provided by PSS. Additionally, it may serve as a reference signal for demodulation of the PBCH.

PBCH: it is possible to provide essential system information necessary for transmitting and receiving the data channel and control channel of the terminal. The essential system information may include search space related control information indicating radio resource mapping information of a control channel, scheduling control information on a separate data channel for transmitting system information, and the like.

SS/PBCH block: may consist of a combination of PSS, SSS, and PBCH. One or a plurality of SS/PBCH blocks may be transmitted within 5 ms, and each transmitted SS/PBCH block may be distinguished by an index.

In the initial access stage in which the terminal accesses the system for the first time, the terminal may first obtain downlink time and frequency domain synchronization from a synchronization signal through cell search and obtain a cell ID. The synchronization signal may include PSS and SSS. The synchronization signal is a reference signal for cell search, and may be transmitted by applying a subcarrier spacing suitable for a channel environment, such as phase noise, for each frequency band. The 5G base station may transmit a plurality of synchronization signal blocks according to the number of analog beams to be operated. PSS and SSS may be mapped over 12 RBs and transmitted, and PBCH may be mapped over 24 RBs and transmitted.

Next, the terminal may receive a PBCH for transmitting a master information block (MIB) from the base station to obtain system information related to transmission and reception, such as a system bandwidth, and basic parameter values. The system information includes configuration information for control area #0. The terminal may monitor the control area #0 assuming that the demodulation reference signal (DMRS) transmitted from the selected SS/PBCH block and the control area #0 is quasi co-located (QCL). The terminal obtains scheduling information on the physical downlink shared channel (PDSCH) including the system information block (SIB) through the downlink control information transmitted in the control area #0, that is, the physical downlink control channel (PDCCH). The terminal may obtain configuration information related to a random access channel (RACH) required for initial access from the system information block. The terminal may transmit a physical RACH (PRACH) to the base station in consideration of the selected SS/PBCH index, and the base station receiving the PRACH may obtain information on the SS/PBCH block index selected by the terminal. Based on the obtained information on the SS/PBCH block index, the base station may figure out that both which block the terminal has selected from each of the SS/PBCH blocks and the terminal monitors the control area #0 corresponding to the SS/PBCH block selected. Thereafter, the terminal initially accesses the network through operations such as registration and authentication with the base station.

Next, with reference to the drawings for the bandwidth part (BWP) configuration in the 5G communication system will be described in detail.

In the NR system, it is possible for one component carrier (CC) or a serving cell to consist of up to 250 or more RBs. Therefore, when the terminal always receives the entire serving cell bandwidth like LTE, power consumption of the terminal may be extreme. In order to solve this problem, the base station may configure one or more bandwidth parts (BWP) to the terminal to support the terminal to change the reception area within the cell. In the NR system, the base station may configure the initial BWP, which is the bandwidth of the control area #0, that is, the control resource set (CORESET) #0, or common search space (CSS), to the terminal through a master information block (MIB). Thereafter, the base station may configure the first BWP of the terminal through radio resource control (RRC) signaling and notify the terminal of BWP configuration information that may be indicated through the downlink control information (DCI) in the future. Thereafter, the base station may indicate to the terminal which band the terminal will use by notifying the terminal of the BWP ID through DCI. If the terminal does not receive DCI in the currently allocated BWP for a specific time or longer, the terminal may attempt to receive DCI by returning to the default BWP'.

Figure 3:
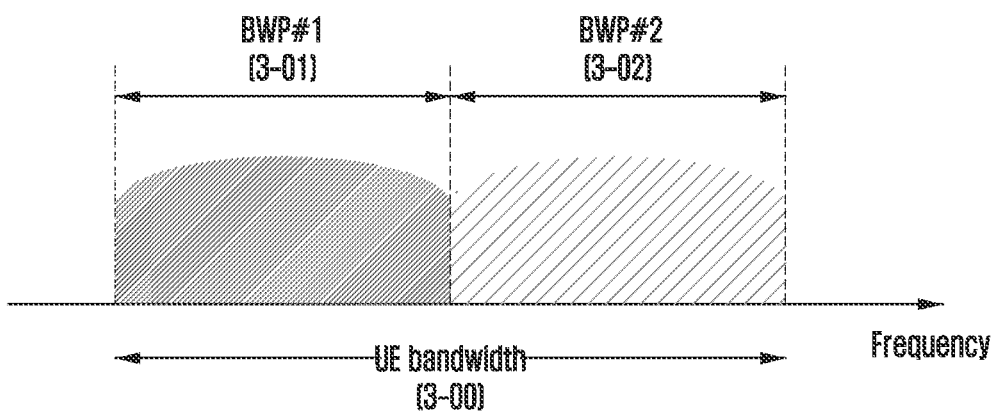
FIG. 3 is a diagram illustrating an example of configurating a bandwidth part in a 5G communication system according to an embodiment of the disclosure.

FIG. 3 is a diagram illustrating an example of configurating a bandwidth part (BWP) in a 5G communication system according to an embodiment of the disclosure.

Referring to FIG. 3, the terminal bandwidth 3-00 is configure to two bandwidth parts, namely, BWP #1 (3-01) and BWP #2 (3-02). The base station may configure one or more bandwidth parts to the terminal, and may configure information as illustrated in Table 2 below for each bandwidth part.

TABLE 2

| BWP::= | SEQUENCE{ |
|---|---|
| > bwp-Id<br>(bandwidth part identifier) | BWP-Id, |
| > locationAndBandwidth<br>(bandwidth part location) | INTEGER (1..65536), |
| > subcarrierSpacing<br>n4, n5},<br>(subcarrier spacing) | ENUMERATED {n0, n1, n2, n3, |
| > cyclicPrefix<br>{ extended } (cyclic prefix)<br>} | ENUMERATED |

Embodiments according to the disclosure are not limited to the above-described example, and various parameters related to bandwidth part may be configured in the terminal in addition to the above-described configuration information. The above-described information may be transmitted by the base station to the terminal through higher layer signaling (e.g., RRC signaling). At least one bandwidth part among one or more configured bandwidth parts may be activated. Information on whether the configured bandwidth part is activated may be semi-statically transmitted from the base station to the terminal through RRC signaling, or may be dynamically transmitted through medium access control (MAC), control element (CE), or DCI.

According to an embodiment, the terminal before radio resource control (RRC) connection may receive an initial BWP for initial access configured from the base station through a master information block (MIB). More specifically, in order to receive the system information required for initial access through the MIB in the initial access step, the terminal may receive a configuration information for control resource set (CORESET) through which a physical downlink control channel (PDCCH) may be transmitted and a configuration information for a search space. For example, the system information may include a remaining system information (RMSI) or a system information block 1 (SIB1). The control area and the search space configured by the MIB may be regarded as Identity (ID) 0, respectively.

The base station may notify the terminal of configuration information such as frequency allocation information, time allocation information, and numerology for the control area #0 through the MIB. In addition, the base station may notify the terminal of configuration information on the monitoring period and occasion for the control area #0, that is, configuration information on the search space #0 through the MIB. The terminal may regard the frequency domain configured as the control area #0 obtained through the MIB as an initial bandwidth part for initial access. In this case, the identity (ID) of the initial bandwidth part may be regarded as 0.

The configuration of the bandwidth part supported by the above-described next-generation mobile communication system (5G or NR system) may be used for various purposes.

For example, when the bandwidth supported by the terminal is smaller than the system bandwidth, the configuration for the bandwidth part may be used. For example, in Table 2, the frequency position of the bandwidth part (configuration information 2) is configured for the terminal, so that the terminal may transmit and receive data at a specific frequency position within the system bandwidth.

As another example, for the purpose of supporting different numerologies, the base station may configure a plurality of bandwidth parts for the terminal. For example, in order to support both data transmission and reception using a subcarrier spacing of 15 kHz and a subcarrier spacing of 30 kHz to an arbitrary terminal, two bandwidth parts may be configured to use a subcarrier spacing of 15 kHz and 30 kHz, respectively. Different bandwidth parts may be frequency division multiplexed (FDM), and when data is transmitted/received at a specific subcarrier space, a bandwidth part configured for the corresponding subcarrier space may be activated.

As another example, for the purpose of reducing power consumption of the terminal, the base station may configure bandwidth parts having different bandwidths to the terminal. For example, when the terminal supports a very large bandwidth, for example, a bandwidth of 100 MHz and always transmits and receives data using the corresponding bandwidth, very large power consumption may be caused. In particular, it is very inefficient in terms of power consumption for the terminal to monitor the downlink control channel for an unnecessarily large bandwidth of 100 MHz in a situation in which there is no traffic. Therefore, for the purpose of reducing power consumption of the terminal, the base station may configure a relatively small bandwidth part for the terminal, for example, a bandwidth part of 20 MHz. In the absence of traffic, the terminal may monitor in a bandwidth part of 20 MHz, and when data are generated, the terminal may transmit/receive data using the bandwidth part of 100 MHz according to the instruction of the base station.

In the method of configurating the bandwidth part described above, the terminals before the RRC connection may receive the configuration information for the initial bandwidth part through the master information block (MIB) in the initial access step. More specifically, the terminal may receive, from the MIB of the physical broadcast channel (PBCH), a control area or a control resource set (CORESET) for a downlink control channel through which downlink control information (DCI) scheduling system information block (SIB) may be transmitted. The bandwidth of the control area configured as the MIB may be regarded as an initial bandwidth part, and through the configured initial bandwidth part, the terminal may receive a physical downlink shared channel (PDSCH) through which the SIB is transmitted. In addition to the purpose of receiving the SIB, the initial bandwidth part may be utilized for other system information (OSI), paging, and random access.

When one or more bandwidth parts are configured for the terminal, the base station may instruct the terminal to change the bandwidth part by using a Bandwidth Part Indicator field in DCI. For example, in FIG. 3, if the currently activated bandwidth part of the terminal is bandwidth part #1 (3-01), the base station may indicate to the terminal bandwidth part #2 (3-02) as the Bandwidth Part Indicator in the DCI, and the terminal may change the bandwidth part to the bandwidth part #2 (3-10) indicated by the Bandwidth Part Indicator in the received DCI.

As described above, because DCI-based bandwidth part change may be indicated by DCI scheduling PDSCH or physical uplink shared channel (PUSCH), when the terminal receives the bandwidth part change request, the terminal should be able to receive or transmit the PDSCH or PUSCH scheduled by the corresponding DCI without unreasonableness in the changed bandwidth part. To this end, the standard stipulates a requirement for a delay time ($T_{BWP}$) required when changing a bandwidth part, and may be defined, for example, as follows.

TABLE 3

| μ | NR Slot length (ms) | BWP switch delay $T_{BWP}$ (slots) | |
|---|---|---|---|
| | | Type 1[Note 1] | Type 2[Note 1] |
| 0 | 1 | 1 | 3 |
| 1 | 0.5 | 2 | 5 |
| 2 | 0.25 | 3 | 9 |
| 3 | 0.125 | 6 | 17 |

Note 1

Depends on UE capability.
Note 2:
If the BWP switch involves changing of SCS, the BWP switch delay is determined by the larger one between the SCS before BWP switch and the SCS after BWP switch.

The requirement for the bandwidth part change delay time supports type 1 or type 2 according to the capability of the terminal. The terminal may report the supportable bandwidth part delay time type to the base station.

Figure 4:
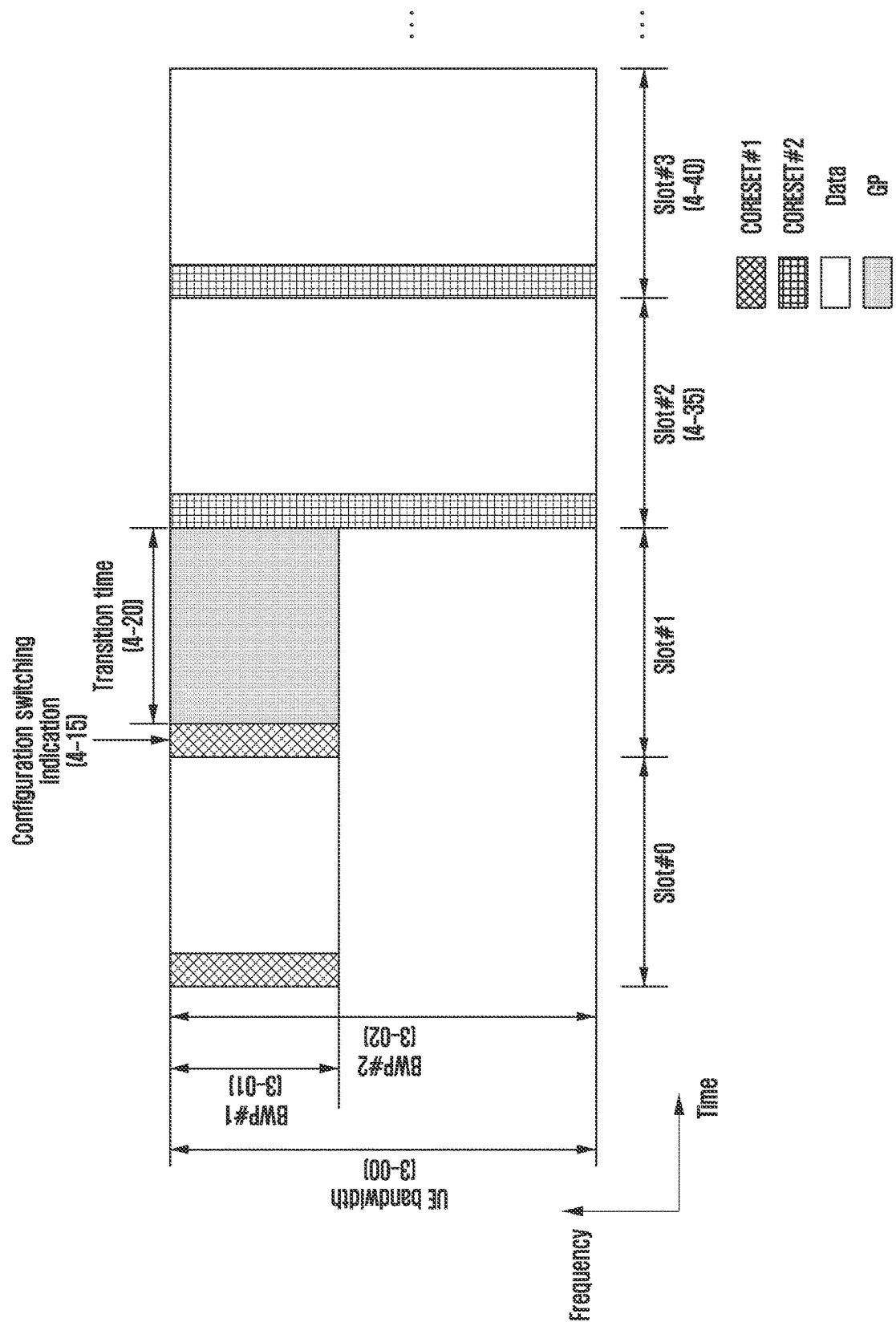
FIG. 4 is a diagram illustrating an example of a bandwidth part change procedure in a 5G communication system according to an embodiment of the disclosure.

FIG. 4 is a diagram illustrating an example of a bandwidth part change procedure in a 5G communication system according to an embodiment of the disclosure.

Referring to FIG. 4, according to the requirement for the bandwidth part change delay time described above, when the terminal receives the DCI including the bandwidth part change indicator 4-15 in slot n, the terminal may complete the change to the new bandwidth part indicated by the bandwidth part change indicator at a time point not later than slot n+$T_{BWP}$, and may transmit/receive a data channel scheduled by the corresponding DCI in the new bandwidth part 3-02 that has been changed. When the base station intends to schedule the data channel with the new bandwidth part, the time domain resource allocation for the data channel may be determined in consideration of the bandwidth part change delay time ($T_{BWP}$, 4-20) of the terminal. That is, when the base station schedules the data channel with the new bandwidth part, in a method of determining time domain resource allocation for the data channel, the base station may schedule the corresponding data channel after the bandwidth part change delay time, in slots 4-35 and 4-40.

Accordingly, the terminal may not expect that the DCI indicating the bandwidth part change indicates a slot offset (K0 or K2) value smaller than the bandwidth part change delay time ($T_{BWP}$, 4-20).

If the terminal receives a DCI (e.g., DCI format 1_1 or 0_1) indicating a bandwidth part change, the terminal may not perform any transmission or reception during the time period from the third symbol of the slot in which the PDCCH including the corresponding DCI is received to the start point of the slot indicated by the slot offset (K0 or K2) value indicated by the time domain resource allocation indicator field in the corresponding DCI. For example, if the terminal receives a DCI indicating a bandwidth part change in slot n, and the slot offset value indicated by the DCI is K, the terminal may not perform any transmission or reception from the third symbol of slot n to the previous symbol of slot n+K (i.e., the last symbol of slot n+K−1).

Next, a method of configurating transmission/reception related parameters for each bandwidth part in the 5G system will be described.

The terminal may receive one or a plurality of bandwidth parts configured from the base station, and parameters to be used for transmission/reception (e.g., uplink/downlink data channel and control channel related configuration information, etc.) may be additionally configured for each configured bandwidth part. For example, in FIG. 3, when the terminal receives bandwidth part #1 (3-01) and bandwidth part #2 (3-02), the terminal may receive transmission/reception parameter #1 configured for bandwidth part #1 (3-01) and may receive transmission/reception parameter #2 configured for bandwidth part #2 (3-02). When the bandwidth part #1 (3-01) is activated, the terminal may perform transmission/reception with the base station based on the transmission/reception parameter #1, and when the bandwidth part #2 (3-02) is activated, the terminal may perform transmission/reception with the base station based on transmission/reception parameter #2.

More specifically, the following parameters may be configured from the base station to the terminal.

First, with respect to the uplink bandwidth part, the following information may be configured.

TABLE 4

```
BWP-Uplink ::= SEQUENCE {
  > bwp-Id                           BWP-Id,
  (BWP identity)
  >   bwp-Common                     BWP-UplinkCommon OPTIONAL, -- Cond
SetupOtherBWP
    (cell-specific or common parameter)
  >   bwp-Dedicated                  BWP-UplinkDedicated OPTIONAL, -- Cond
SetupOtherBWP
    (UE-specific parameter)
    ...
  }
  BWP-UplinkCommon ::= SEQUENCE {
    > genericParameters               BWP,
      (generic parameter)
    > rach-ConfigCommon                 SetupRelease { RACH-ConfigCommon }
OPTIONAL, -- Need M
      (random access related common parameter)
    > pusch-ConfigCommon                SetupRelease { PUSCH-ConfigCommon }
OPTIONAL, -- Need M
      (PUSCH related common parameter)
    > pucch-ConfigCommon                SetupRelease { PUCCH-ConfigCommon }
OPTIONAL, -- Need M
      (PUCCH related common parameter)
    ...
  }
```

TABLE 4-continued

```
BWP-UplinkDedicated ::= SEQUENCE {
    > pucch-Config                SetupRelease { PUCCH-Config } OPTIONAL, -- Need M
      (PUCCH related UE-specific parameter)
    > pusch-Config                SetupRelease { PUSCH-Config } OPTIONAL, -- Need M
      (PUSCH related UE-specific parameter)
    > configuredGrantConfig       SetupRelease { ConfiguredGrantConfig } OPTIONAL, -- Need M
      (Configured grant related parameter)
    > srs-Config                  SetupRelease { SRS-Config } OPTIONAL, -- Need M
      (SRS related parameter)
    >    beamFailureRecovery Config    SetupRelease { BeamFailureRecoveryConfig } OPTIONAL, -- Cond SpCellOnly
      (beam failure recovery related parameter)
    ...
}
```

According to the above table, the terminal may receive cell-specific (or cell common or common) transmission-related parameters (e.g., Random Access Channel (RACH), Physical Uplink Control Channel (PUCCH), and Physical Uplink Shared Channel (PUSCH) related parameters) configured from the base station (corresponding to BWP-UplinkCommon). In addition, the terminal may receive UE-specific (or dedicated) transmission-related parameters (e.g., PUCCH, PUSCH, non-grant-based uplink transmission (Configured Grant PUS CH), Sounding Reference Signal (SRS) related parameters) configured from the base station (corresponding to BWP-UplinkDedicated).

Next, the following information may be configured with respect to the downlink bandwidth part.

According to the above table, the terminal may receive cell-specific (or cell common or common) reception-related parameters (e.g., physical downlink control channel (PDCCH), physical downlink shared channel (PDSCH) related parameters) configured from the base station (corresponding to BWP-DownlinkCommon). In addition, the terminal may receive UE-specific (or dedicated) reception-related parameters (e.g., PDCCH, PDSCH, non-approval-based downlink data transmission (Semi-persistent Scheduled PDSCH), radio link monitoring (RLM) related parameters) configured from the base station (corresponding to BWP-DownlinkDedicated).

Figure 5:
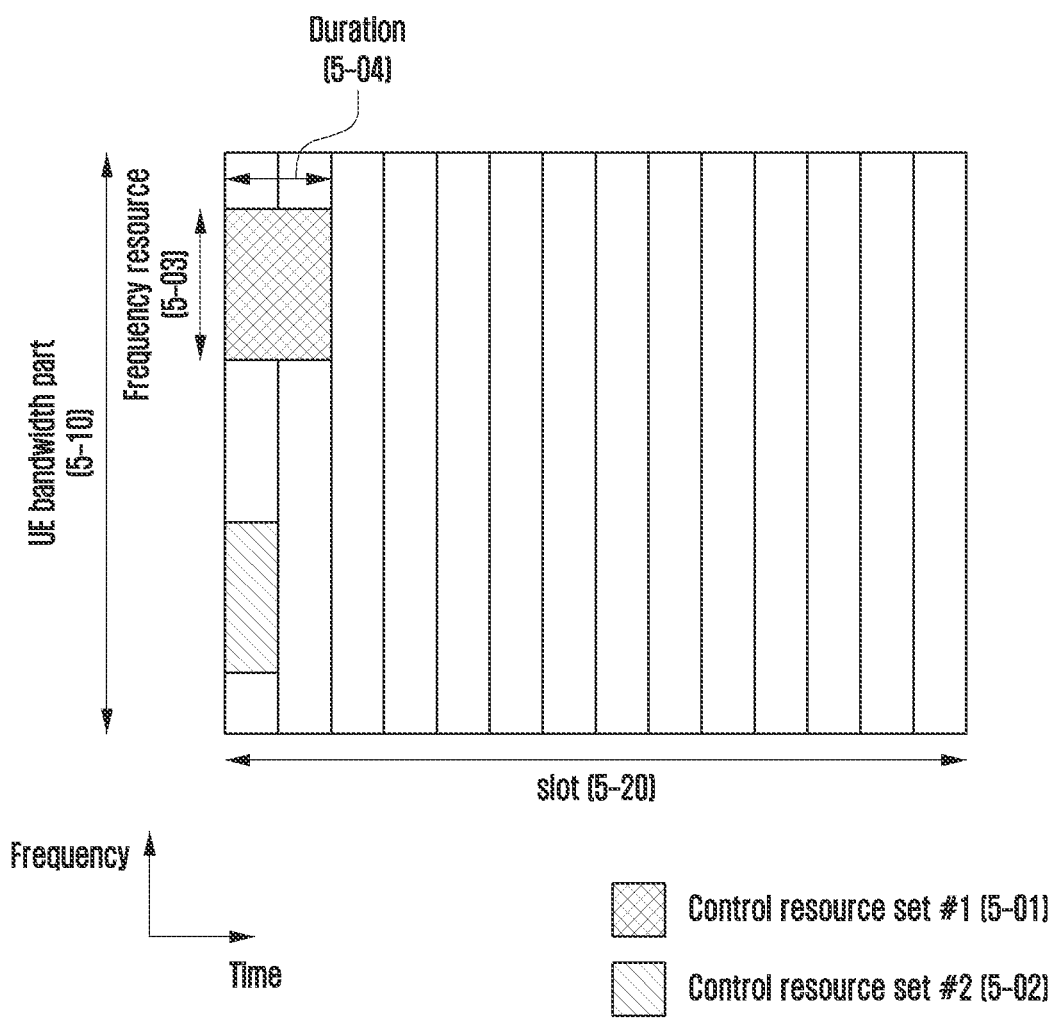
FIG. 5 is a diagram illustrating an example of a control resource set (CORESET) through which a downlink control channel is transmitted in a 5G wireless communication system according to an embodiment of the disclosure.

FIG. 5 is a diagram illustrating an example of a control resource set (CORESET) through which a downlink control

TABLE 5

```
BWP-Downlink ::= SEQUENCE {
    > bwp-Id                      BWP-Id,
      (BWP identity)
    > bwp-Common                  BWP-DownlinkCommon OPTIONAL, -- Cond SetupOtherBWP
      (cell-specific or common parameter)
    > bwp-Dedicated               BWP-DownlinkDedicated OPTIONAL, -- Cond SetupOtherBWP
      (UE-specific parameter)
    ...
}
BWP-DownlinkCommon ::= SEQUENCE {
    > genericParameters           BWP,
      (generic parameter)
    > pdcch-ConfigCommon          SetupRelease { PDCCH-ConfigCommon } OPTIONAL, -- Need M
      (PDCCH related common parameter)
    > pdsch-ConfigCommon          SetupRelease { PDSCH-ConfigCommon } OPTIONAL, -- Need M
      (PDSCH related common parameter)
    ...
}
BWP-DownlinkDedicated ::= SEQUENCE {
    > pdcch-Config                SetupRelease { PDCCH-Config } OPTIONAL, -- Need M
      (PDCCH related UE-specific parameter)
    > pdsch-Config                SetupRelease { PDSCH-Config } OPTIONAL, -- Need M
      (PDSCH related UE-specific parameter)
    > sps-Config                  SetupRelease { SPS-Config } OPTIONAL, -- Need M
      (SPS related parameter)
    > radioLinkMonitoringConfig   SetupRelease { radioLinkMonitoringConfig} OPTIONAL, -- Cond SpCellOnly
      (RLM related parameter)
    ...
}
``` channel is transmitted in a wireless communication system according to an embodiment of the disclosure.

Referring to FIG. 5, it is a diagram illustrating an example in which a terminal bandwidth part 5-10 is configure on the frequency domain and two control resource sets (control resource set #1 (5-01) and control resource set #2 (5-02)) are configured in one slot (5-20) on the time domain. The control resource sets 5-01 and 5-02 may be configured to a specific frequency resource 5-03 within the entire terminal bandwidth part 5-10 on the frequency domain. One or a plurality of OFDM symbols may be configured on the time domain, and this may be defined as Control Resource Set Duration, 5-04. Referring to the example illustrated in FIG. 5, control resource set #1 (5-01) may be configured to a control resource set length of 2 symbols, and control resource set #2 (5-02) may be configured to a control resource set length of 1 symbol.

The control resource set in the above-described 5G system may be configured by the base station to the terminal through higher layer signaling (e.g., system information, Master Information Block (MIB), Radio Resource Control (RRC) signaling). Configurating the control resource set to the terminal refers to providing information such as a control resource set identity, a frequency position of the control resource set, and a symbol length of the control resource set. For example, information provided to configure the control resource set is as follows.

TABLE 6

```
ControlResourceSet ::=                    SEQUENCE {
    -- Corresponds to L1 parameter 'CORESET-ID'
> controlResourceSetId
ControlResourceSetId,
    (control resource set identity)
> frequencyDomainResources               BIT STRING (SIZE
(45)),
    (frequency domain resource allocation information)
> duration                               INTEGER
(1..maxCoReSetDuration),
    (time domain resource allocation information)
> cce-REG-MappingType
CHOICE {
    (CCE-to-REG mapping type)
>> interleaved
SEQUENCE {
>>> reg-BundleSize          ENUMERATED {n2, n3, n6},(REG bundle size)
>>> precoderGranularity     ENUMERATED {sameAsREG-bundle,
allContiguousRBs},
>>> interleaverSize         ENUMERATED {n2, n3, n6}
(interleaverSize)
>>>shiftIndex               INTEGER(0..maxNrofPhysicalResourceBlocks−1)
OPTIONAL (interleaver shift))
    },
>> nonInterleaved                        NULL
    },
> tci-StatesPDCCH                        SEQUENCE(SIZE
(1..maxNrofTCI-StatesPDCCH)) OF TCI-StateId
OPTIONAL,
    (QCL configuration information)
> tci-PresentInDCI                       ENUMERATED
{enabled}                                OPTIONAL, -- Need S
}
```

In the 5G system, the control resource set may be composed of $N_{RB}^{CORESET}$ RBs in the frequency domain, and may be composed of $N_{symb}^{CORESET} \in \{1, 2, 3\}$ symbols in the time domain. One CCE may consist of 6 REGs, and a REG may be defined as 1 RB for 1 OFDM symbol. In one control resource set, REGs may be indexed in time-first order, starting with REG index 0 from the first OFDM symbol of the control resource set, the lowest RB.

The 5G system supports an interleaved method and a non-interleaved method as a transmission method for the PDCCH. The base station may configure whether to transmit interleaving or non-interleaving for each control resource set to the terminal through higher layer signaling. Interleaving may be performed in units of REG bundles. A REG bundle may be defined as a set of one or a plurality of REGs. The terminal may determine the CCE-to-REG mapping method in the corresponding control resource set in the following manner based on whether interleaving or non-interleaving transmission configured from the base station is performed.

TABLE 7

The CCE-to-REG mapping for a control-resource set can be interleaved or non-interleaved and is described by REG bundles:
- REG bundle i is defined as REGs $\{iL, iL + 1, ..., iL + L\, 1\}$ where L is the REG bundle size, $t = 0,1,...,N_{REG}^{CORESET}/L - 1$, and $N_{REG}^{CORESET} = N_{RR}^{CORESET} N_{symb}^{CORESET}$ is the number of REGs in the CORESET
- CCE j consists of REG bundles $\{f(6j/L), f(6j/L+1), ..., f(6j/L+6/L-1)\}$ where $f(\cdot)$ is an interleaver
  For non-interleaved CCE-to-REG mapping, $L = 6$ and $f(x) = x$.
  For interleaved CCE-to-REG mapping, $L \in \{2,6\}$ for $N_{symb}^{CORESET} = 1$ and $L \in \{N_{symb}^{CORESET}, 6\}$ for $N_{symb}^{CORESET} \in \{2,3\}$. The interleaver is defined by
  $f(x) = (rC + c + n_{shift}) \mod (N_{REG}^{CORESET}/L)$
$x = cR + r$
$r = 0, 1, ..., R - 1$
$c = 0, 1, ..., C - 1$
$C = N_{REG}^{CORESET}/(LR')$
  where $R \in \{2,3,6\}$.

The basic unit of the downlink control channel, i.e., REG, may include both REs to which DCI is mapped and areas to which a demodulation reference signal (DMRS), which is a reference signal (RS) for decoding them, is mapped. 3 DMRS REs may be included in one REG. The number of CCEs required to transmit the PDCCH may be 1, 2, 4, 8, or 16 depending on the aggregation level (AL), and different numbers of CCEs may be used to implement link adaptation of the downlink control channel. For example, when AL=L, one downlink control channel may be transmitted through L CCEs.

The terminal needs to detect a signal without figuring out information about the downlink control channel. For blind decoding, a search space indicating a set of CCEs is defined. Because the search space is a set of downlink control channel candidates consisting of CCEs that the terminal should attempt to decode on a given aggregation level, and there are several aggregation levels that make one bundle with 1, 2, 4, 8 or 16 CCEs, the terminal may have a plurality of search spaces. The search space set may be defined as a set of search spaces in all set aggregation levels.

The search space may be classified into a common search space and a UE-specific search space. A group of terminals or all terminals may search the common search space of the PDCCH in order to receive cell-common control information such as dynamic scheduling for system information or a paging message. For example, the terminal may receive the PDSCH scheduling allocation information for transmission of the SIB including the operator information of the cell by examining the common search space of the PDCCH. In the case of the common search space, because a certain group of terminals or all terminals must receive the PDCCH, it may be defined as a set of promised CCEs. The UE-specific scheduling assignment information for the PDSCH or PUSCH may be received by examining the UE-specific search space of the PDCCH. The UE-specific search space may be UE-specifically defined as a function of the terminal's identity and various system parameters.

In the 5G system, the parameter for the search space for the PDCCH may be configured from the base station to the terminal through higher layer signaling (e.g., SIB, MIB, and RRC signaling). For example, the base station may configure the number of PDCCH candidates in each aggregation level L, a monitoring period for the search space, a monitoring occasion in symbol units in a slot for a search space, a search space type (common search space or UE-specific search space), a combination of a DCI format and RNTI to be monitored in the corresponding search space, a control resource set index for monitoring the search space, and the like to the terminal. For example, the parameter for the search space for the PDCCH may include the following information.

TABLE 8

| | |
|---|---|
| SearchSpace ::= | SEQUENCE { |
| -- Identity of the search space. SearchSpaceId = 0 identifies the SearchSpace configured via PBCH (MIB) or ServingCellConfigCommon. | |
| > searchSpaceId | |
| SearchSpaceId, | |
| (search space identity) | |
| > controlResourceSetId | |
| ControlResourceSetId, | |
| (control resource set identity) | |
| > monitoringSlotPeriodicityAndOffset | CHOICE { |
| (monitoring slot level periodicity) | |
| >> sl1 | NULL, |
| >> sl2 | INTEGER |
| (0-1), | |
| >> sl4 | INTEGER |
| (0-3), | |
| >> sl5 | |
| INTEGER (0..4), | |
| >> sl8 | INTEGER |
| (0-7), | |
| >> sl10 | |
| INTEGER (0..9), | |
| >> sl16 | |
| INTEGER (0..15), | |
| >> sl20 | |

TABLE 8-continued

```
INTEGER (0..19)
}       OPTIONAL,
> duration(monitoring duration) INTEGER (2..2559)
> monitoringSymbolsWithinSlot        BIT STRING (SIZE (14))
OPTIONAL,
    (monitoring symbols within slot)
> nrofCandidates                     SEQUENCE {
    (number of PDCCH candidates by aggregation level)
>> aggregationLevel1                 ENUMERATED {n0, n1, n2, n3, n4, n5,
n6, n8},
>> aggregationLevel2                 ENUMERATED {n0, n1, n2, n3, n4, n5,
n6, n8},
>> aggregationLevel4                 ENUMERATED {n0, n1, n2, n3, n4,n5, n6,
n8},
>> aggregationLevel8                 ENUMERATED {n0, n1, n2, n3, n4, n5,
n6, n8},
>> aggregationLevel16                ENUMERATED {n0, n1, n2, n3, n4, n5,
n6, n8}
    },
> searchSpaceType                    CHOICE {
    (search space type)
        -- Configures this search space as common search space (CSS)
and DCI formats to monitor.
>> common                            SEQUENCE {
    (common search space)
}
>> ue-Specific                       SEQUENCE {
    (UE-Specific search space) -- Indicates whether the UE monitors in this
USS for DCI formats 0-0 and 1-0 or for formats 0-1 and 1-1.
>>> formats                          ENUMERATED {formats0-0-And-1-0, formats0-
1-And-1-1},
    ...
}
```

According to the configuration information, the base station may configure one or a plurality of search space sets to the terminal. According to some embodiments, the base station may configure the search space set 1 and the search space set 2 to the terminal. In search space set 1, the terminal may be configured to monitor DCI format A scrambled with X-RNTI in a common search space, and in search space set 2, the terminal may be configured to monitor DCI format B scrambled with Y-RNTI in the UE-specific search space.

According to the configuration information, one or a plurality of search space sets may exist in the common search space or the UE-specific search space. For example, the search space set #1 and the search space set #2 may be configured as the common search space, and the search space set #3 and the search space set #4 may be configured as the UE-specific search space.

The common search space may be classified into a specific type of search space set according to a purpose. An RNTI to be monitored may be different for each type of a determined search space set. For example, the common search space type, purpose, and RNTI to be monitored may be classified as illustrated in Table 13 below.

TABLE 9

| Search space types | Purpose | RNTI |
| --- | --- | --- |
| Type0 CSS | PDCCH transmission for SIB scheduling | SI-RNTI |
| Type0A CSS | PDCCH transmission for scheduling other SI (SIB2, etc.) other than SIB | SI-RNTI |
| Type1 CSS | PDCCH transmission for random access response (RAR) scheduling, Msg3 retransmission scheduling, and Msg4 scheduling | RA-RNTI, TC-RNTI |

TABLE 9-continued

| Search space types | Purpose | RNTI |
| --- | --- | --- |
| Type2 CSS | paging | P-RNTI |
| Type3 CSS | group control information transmission | INT-RNTI, SFI-RNTI, TPC-PUSCH-RNTI, TPC-PUCCH-RNTI, TPC-SRS-RNTI |
| | In case of PCell, PDDCH transmission for data scheduling | C-RNTI, MCS-C-RNTI, CS-RNTI |

In the common search space, a combination of the following DCI format and RNTI may be monitored. Of course, it is not limited to the following examples.
  DCI format 0_0/1_0 with CRC scrambled by C-RNTI, CS-RNTI, SP-CSI-RNTI, RA-RNTI, TC-RNTI, P-RNTI, SI-RNTI
  DCI format 2_0 with CRC scrambled by SFI-RNTI
  DCI format 2_1 with CRC scrambled by INT-RNTI
  DCI format 2_2 with CRC scrambled by TPC-PUSCH-RNTI, TPC-PUCCH-RNTI
  DCI format 2_3 with CRC scrambled by TPC-SRS-RNTI In the UE-specific search space, a combination of the following DCI format and RNTI may be monitored. Of course, it is not limited to the following examples.
  DCI format 0_0/1_0 with CRC scrambled by C-RNTI, CS-RNTI, TC-RNTI
  DCI format 0_1/0_2 with CRC scrambled by C-RNTI, CS-RNTI, TC-RNTI, SP-CSI-RNTI
  DCI format 1_1/1_2 with CRC scrambled by C-RNTI, CS-RNTI, TC-RNTI The specified RNTIs may follow the definitions and uses below.
  C-RNTI (Cell RNTI): UE-specific PDSCH scheduling purpose TC-RNTI (Temporary Cell RNTI): UE-specific PDSCH scheduling purpose CS-RNTI (Configured Scheduling RNTI): Semi-statically configured UE-specific PDSCH scheduling purpose RA-RNTI (Random Access RNTI): Used for scheduling PDSCH in the random access phase P-RNTI (Paging RNTI): PDSCH scheduling purpose for which paging is transmitted SI-RNTI (System Information RNTI): Used for scheduling PDSCH in which system information is transmitted INT-RNTI (Interruption RNTI): Used to indicate whether PDSCH is puncturing TPC-PUSCH-RNTI (Transmit Power Control for PUSCH RNTI): Purpose of indicating power control command for PUSCH TPC-PUCCH-RNTI (Transmit Power Control for PUCCH RNTI): Used to indicate power control command for PUCCH TPC-SRS-RNTI (Transmit Power Control for SRS RNTI): Used to indicate power control command for SRS The above specified DCI formats may follow the definition below.

TABLE 10

| DCI format | Usage |
|---|---|
| 0_0 | Scheduling of PUSCH in one cell |
| 0_1 | Scheduling of one or multiple PUSCH in one cell, or indicating downlink feedback information for configured grant PUSCH (CG-DFI) |
| 0_2 | Scheduling of PUSCH in one cell |
| 1_0 | Scheduling of PDSCH in one cell |
| 1_1 | Scheduling of PDSCH in one cell, and/or triggering one shot HARQ-ACK codebook feedback |
| 1_2 | Scheduling of PDSCH in one cell |
| 2_0 | Notifying a group of UEs of the slot format, available RB sets, COT duration and search space set group switching |
| 2_1 | Notifying a group of UEs of the PRB(s) and OFDM symbol(s) where UE may assume no transmission is intended for the UE |
| 2_2 | Transmission of TPC commands for PUCCH and PUSCH |
| 2_3 | Transmission of a group of TPC commands for SRS transmissions by one or more UEs |
| 2_4 | Notifying a group of UEs of the PRB(s) and OFDM symbol(s) where UE cancels the corresponding UL transmission from the UE |
| 2_5 | Notifying the availability of soft resources as defined in Clause 9.3.1 of [10, TS 38.473] |

TABLE 10-continued

| DCI format | Usage |
|---|---|
| 2_6 | Notifying the power saving information outside DRX Active Time for one or more UEs |
| 3_0 | Scheduling of NR sidelink in one cell |
| 3_1 | Scheduling of LTE sidelink in one cell |

In the 5G system, the search space of the aggregation level L in the control resource set p and the search space set s may be expressed by the following equation.

Equation 1

$$L \cdot \left\{ \left( Y_{p,n_{s,f}^\mu} + \left\lfloor \frac{m_{s,n_{CI}} \cdot N_{CCE,p}}{L \cdot M_{p.s.max}^{(L)}} \right\rfloor + n_{CI} \right) \bmod \lfloor N_{CCE,p} / L \rfloor \right\} + i$$

L: Aggregation level
$n_{CI}$: carrier index
$N_{CCE,p}$: the total number of CCEs present in the control resource set p
$n_{s,f}^\mu$: slot index
$M_{p.s.max}^{(L)}$: the number of PDCCH candidates of aggregation level L
$m_{s,nCI}=0, \ldots, M_{p,s,max}^{(L)}-1$: PDCCH candidate index of aggregation level L
$i=0, \ldots, L-1$
$Y_{p,n_{s,f}^\mu} = (A_p \cdot Y_{p,n_{s,f}^\mu-1}) \bmod D$,
$Y_{p,-1} = N_{RNTI} \neq 0$, $A_0 = 39827$, $A_1 = 39829$, $A_2 = 39839$, $D = 65537$
nRNTI: terminal identity The Y_(p,n$^\mu_{s,f}$) value may correspond to 0 in the case of a common search space.

The Y_(p,n$^\mu_{s,f}$) value may correspond to a value that changes depending on the terminal's identity (C-RNTI or ID configured for the terminal by the base station) and the time index in the UE-specific search space.

Next, a method of configuring a transmission configuration indication (TCI) state, which is a means for indicating or exchanging quasi co-location (QCL) information between a terminal and a base station in a 5G communication system, will be described in detail.

In a wireless communication system, one or more different antenna ports (although it is possible to be replaced with one or more channels, signals, and combinations thereof, in the description of the disclosure in the future, for convenience, different antenna ports are referred to as unified) may be associated with each other by QCL configuration as illustrated in Table 11 below.

TABLE 11

```
QCL-Info ::=           SEQUENCE {
 > cell                ServCellIndex, (serving cell index from which QCL reference
RS is transmitted)
 > bwp-Id              BWP-Id ((BWP index from which QCL reference RS is
transmitted)
 > referenceSignal     CHOICE {( either CSI-RS or
SS/PBCH block is indicated as QCL reference RS)
 >> csi-rs             NZP-CSI-RS-ResourceId,
 >> ssb                SSB-Index
 },
 > qcl-Type            ENUMERATED {typeA, typeB,
typeC, typeD}         (QCL type identity)
 ..
}
```

Specifically, the QCL configuration may connect two different antenna ports in a relationship between a (QCL) target antenna port and a (QCL) reference antenna port, and the terminal may apply (or assume) all or part of the statistical characteristics (e.g., large scale parameters of the channel or reception spatial filter coefficients or transmission spatial filter coefficients of the terminal such as Doppler shift, Doppler spread, average delay, delay spread, average gain, spatial Rx (or Tx) parameters) of the channel measured at the reference antenna port when receiving the target antenna port. In the above, the target antenna port refers to an antenna port for transmitting a channel or signal configured by a higher layer configuration including the QCL configuration, or an antenna port for transmitting a channel or signal to which a TCI state indicating the QCL configuration is applied. In the above, the reference antenna port refers to an antenna port for transmitting a channel or signal indicated (specific) by a parameter (e.g., referenceSignal) indicating a reference signal in the QCL configuration.

Specifically, the statistical characteristics of the channel defined (a parameter indicating the type of QCL in the QCL configuration, for example, indicated by qcl-Type) by the QCL configuration may be classified as follows according to the QCL type.
- 'QCL-TypeA': {Doppler shift, Doppler spread, average delay, delay spread}
- 'QCL-TypeB': {Doppler shift, Doppler spread}
- 'QCL-TypeC': {Doppler shift, average delay}
- 'QCL-TypeD': {Spatial Rx parameter}

At this time, the types of QCL type are not limited to the above four types, but all possible combinations are not listed in order not to obscure the gist of the description. QCL-TypeA is a QCL type used when the bandwidth and transmission period of the reference antenna port are sufficient so that all statistical characteristics measurable in frequency and time domain may be referred to as the target antenna port (e.g., when the number of samples and transmission band/time of the reference antenna port is greater than the number of samples and transmission band/time of the target antenna port on both the frequency domain and the time domain). QCL-TypeB is a QCL type used when the transmission period of the reference antenna port is sufficient to measure statistical properties measurable on the time domain, that is, Doppler shift and Doppler spreads. QCL-TypeC is a QCL type used when the bandwidth and transmission period of the reference antenna port are insufficient to measure second-order statistics, that is, Doppler spread and delay spreads, so that only first-order statistics, that is, Doppler shift and average delay, can be referred to. QCL-TypeD is a QCL type configured when spatial reception filter values used when receiving a reference antenna port can be used when receiving a target antenna port.

On the other hand, the base station can configure or instruct up to two QCL configurations to one target antenna port through the TCI state configuration as illustrated in Table 12A below.

TABLE 12A

```
TCI-State ::=           SEQUENCE {
  > tci-StateId         TCI-StateId, (TCI state identity)
  > qcl-Type1           QCL-Info, (configuring the first QCL for the target
antenna port to which the corresponding TCI state is applied)
  > qcl-Type2           QCL-Info (configuring the second QCL for the target
antenna port to which the corresponding TCI state is applied) OPTIONAL, -- Need
M
}
```

Among the two QCL configurations included in one TCI state configuration, the first QCL configuration may be configured to one of QCL-TypeA, QCL-TypeB, and QCL-TypeC. In this case, the configurable QCL type is specified according to the types of the target antenna port and the reference antenna port, and will be described in detail below. In addition, the second QCL configuration among the two QCL configurations included in the one TCI state configuration may be configured to QCL-TypeD, and may be omitted in some cases.

Tables 12BA to 12BE below are tables illustrating valid TCI state configurations according to the target antenna port type.

Table 12BA illustrates the valid TCI state configuration when the target antenna port is CSI-RS for tracking (TRS). The TRS refers to an NZP CSI-RS in which a repetition parameter is not configured among CSI-RSs and trs-Info is configured to true. In the case of configuration 3 in Table 12BA it may be used for aperiodic TRS.

TABLE 12BA

Valid TCI state configuration when the target antenna port is CSI-RS for tracking (TRS)

| Valid TCI state Configuration | DL RS 1 | qcl-Type1 | DL RS 2 (if configured) | qcl-Type2 (if configured) |
|---|---|---|---|---|
| 1 | SSB | QCL-TypeC | SSB | QCL-TypeD |
| 2 | SSB | QCL-TypeC | CSI-RS (BM) | QCL-TypeD |
| 3 | TRS (periodic) | QCL-TypeA | TRS (same as DL RS 1) | QCL-TypeD |

Table 1BB illustrates the valid TCI state configuration when the target antenna port is CSI-RS for CSI. The CSI-RS for CSI refers to an NZP CSI-RS that is not used for beam management among CSI-RSs (e.g., a repetition parameter is not configured) and trs-Info is not configured to true.

TABLE 12BB

Valid TCI state configuration when the target antenna port is CSI-RS for CS

| Valid TCI state Configuration | DL RS 1 | qcl-Type1 | DL RS 2 (if configured) | qcl-Type2 (if configured) |
|---|---|---|---|---|
| 1 | TRS | QCL-TypeA | SSB | QCL-TypeD |
| 2 | TRS | QCL-TypeA | CSI-RS for BM | QCL-TypeD |
| 3 | TRS | QCL-TypeA | TRS (same as DL RS 1) | QCL-TypeD |
| 4 | TRS | QCL-TypeB | | |

Table 12BC illustrates a valid TCI state configuration when the target antenna port is CSI-RS for beam management (the same meaning as BM, CSI-RS for L1 RSRP reporting). The CSI-RS for BM refers to an NZP CSI-RS in which a repetition parameter is configured among CSI-RSs, has a value of On or Off, and trs-Info is not configured to true.

TABLE 12BC

Valid TCI state configuration when the target antenna port is CSI-RS for BM (for L1 RSRP reporting)

| Valid TCI state Configuration | DL RS 1 | qcl-Type1 | DL RS 2 (if configured) | qcl-Type2 (if configured) |
|---|---|---|---|---|
| 1 | TRS | QCL-TypeA | TRS (same as DL RS 1) | QCL-TypeD |
| 2 | TRS | QCL-TypeA | CSI-RS (BM) | QCL-TypeD |
| 3 | SS/PBCH Block | QCL-TypeC | SS/PBCH Block | QCL-TypeD |

Table 12BD illustrates the valid TCI state configuration when the target antenna port is a PDCCH DMRS.

TABLE 12BD

Valid TCI state configuration when the target antenna port is PDCCH DMRS

| Valid TCI state Configuration | DL RS 1 | qcl-Type1 | DL RS 2 (if configured) | qcl-Type2 (if configured) |
|---|---|---|---|---|
| 1 | TRS | QCL-TypeA | TRS (same as DL RS 1) | QCL-TypeD |
| 2 | TRS | QCL-TypeA | CSI-RS (BM) | QCL-TypeD |
| 3 | CSI-RS (CSI) | QCL-TypeA | CSI-RS (same as DL RS 1) | QCL-TypeD |

Table 12BE illustrates a valid TCI state configuration when the target antenna port is a PDSCH DMRS.

TABLE 12BE

Valid TCI state configuration when the target antenna port is PDSCH DMRS

| Valid TCI state Configuration | DL RS 1 | qcl-Type1 | DL RS 2 (If configured) | qcl-Type2 (if configured) |
|---|---|---|---|---|
| 1 | TRS | QCL-TypeA | TRS | QCL-TypeD |
| 2 | TRS | QCL-TypeA | CSI-RS (BM) | QCL-TypeD |
| 3 | CSI-RS (CSI) | QCL-TypeA | CSI-RS (CSI) | QCL-TypeD |

The representative QCL configuration method according to Tables 12BA to 12BE is to configure and operate a target antenna port and a reference antenna port for each operation as "SSB"→"TRS"→"CSI-RS for CSI, or CSI-RS for BM, or PDCCH DMRS, or PDSCH DMRS". Through this, it is possible to link the statistical characteristics that can be measured from the SSB and the TRS to each antenna port to help the reception operation of the terminal Methods of allocating time and frequency resources for data transmission in NR are described below.

In NR, the following detailed frequency domain resource allocation (FD-RA) methods may be provided in addition to frequency-domain resource candidate allocation through BWP indication.

Figure 6:
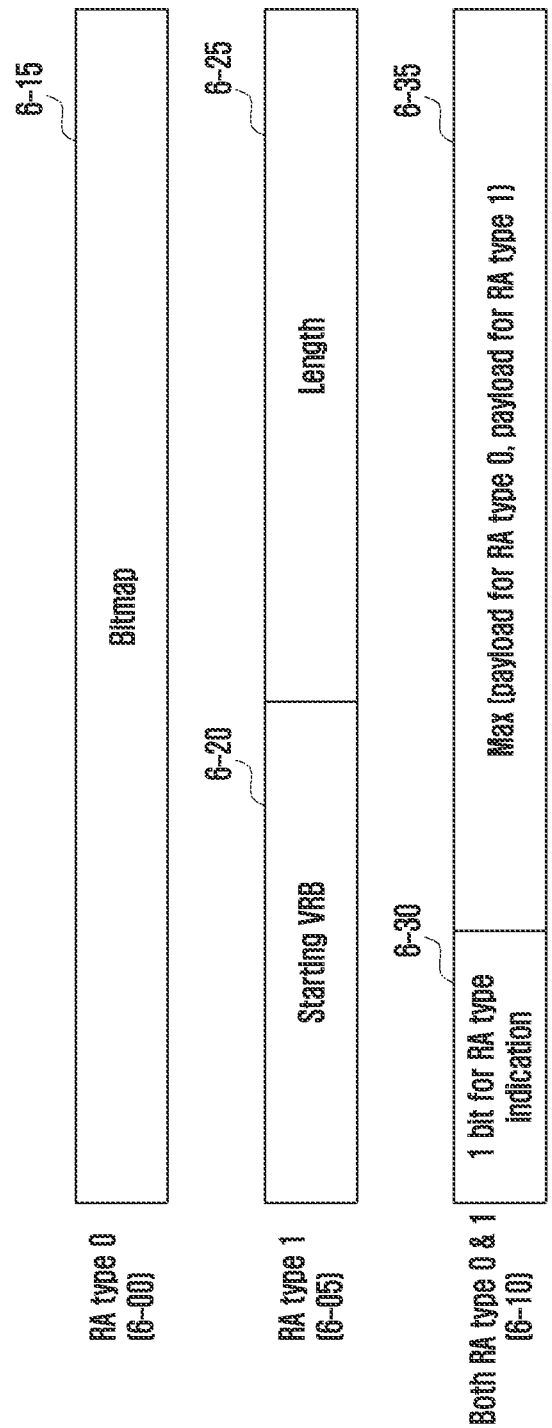
FIG. 6 is a diagram illustrating frequency domain resource allocation methods in a 5G wireless communication system according to an embodiment of the disclosure.

FIG. 6 is a diagram illustrating frequency domain resource allocation methods of type 0 (6-00), type 1 (6-05), and dynamic switch (6-10) configurable in a wireless communication system according to an embodiment of the disclosure.

Referring to FIG. 6, if the terminal is configured to use only resource type 0 through higher layer signaling (6-00), some downlink control information (DCI) for allocating a PDSCH to a corresponding terminal has a bitmap composed of $N_{RBG}$ bits. The conditions for this will be described again later. At this time, $N_{RBG}$ refers to the number of resource block groups (RBGs) determined as illustrated in Table 13 below according to the BWP size allocated by the BWP indicator and the upper layer parameter rbg-Size, and the data in the RBG represented as 1 by the bitmap 6-15 are transmitted

TABLE 13

| Bandwidth Part Size | Configuration 1 | Configuration 2 |
|---|---|---|
| 1-36 | 2 | 4 |
| 37-72 | 4 | 8 |
| 73-144 | 8 | 16 |
| 145-275 | 16 | 16 |

If the terminal is configured to use only resource type 1 through higher layer signaling (6-05), some DCI for allocating PDSCH to the terminal has frequency domain resource allocation information composed of $\lceil \log_2(N_{RB}^{DL,BWP}(N_{RB}^{DL,BWP}+1)/2) \rceil$ bits. Conditions for this will be described again later. The base station may configure the starting VRB (6-20) and the length (6-25) of frequency-domain resources continuously allocated therefrom.

If the terminal is configured to use both resource type 0 and resource type 1 through higher layer signaling (6-10), some DCI for allocating the PDSCH to the terminal has frequency domain resource allocation information composed of bits of a larger value (6-35) among a payload (6-15) for configuring resource type 0 and a payload (6-20, 6-25) for configuring resource type 1. Conditions for this will be described again later. At this time, one bit may be added to the first part (MSB) of the frequency domain resource allocation information in DCI, and when the bit is 0, it may indicate that resource type 0 is used, and when it is 1, it may indicate that resource type 1 is used.

Figure 7:
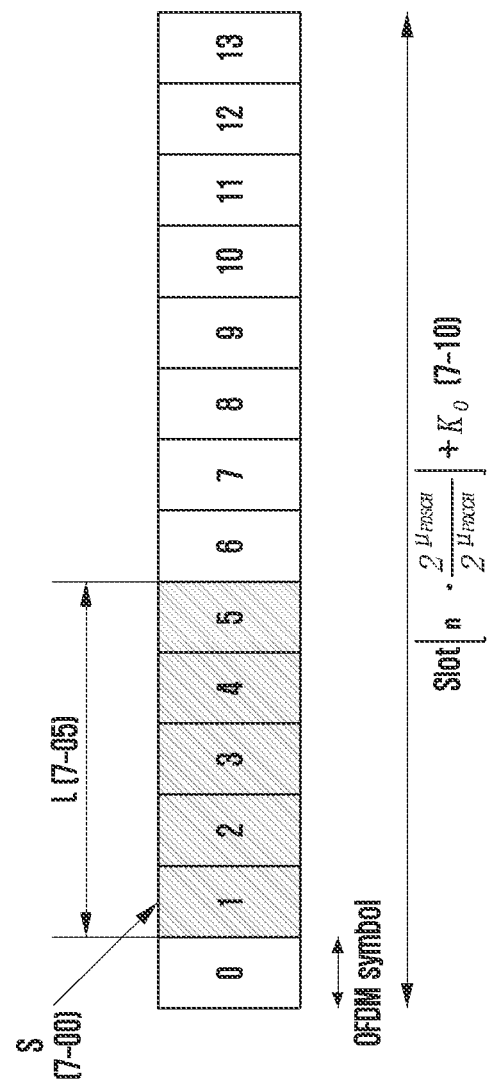
FIG. 7 is a diagram illustrating an example of time domain resource allocation of an NR according to an embodiment of the disclosure.

FIG. 7 is a diagram illustrating an example of physical downlink shared channel (PDSCH) time domain resource allocation in a wireless communication system according to an embodiment of the disclosure.

Referring to FIG. 7, the base station may indicate the time domain position of the PDSCH resource according to the OFDM symbol start position (7-00) and the length (7-05) within one slot (7-10) that is dynamically indicated through subcarrier spacing (SCS)(μPDSCH, μPDCCH) of the data channel and the control channel, a scheduling offset (K0) value, and DCI configured using the higher layer.

Figure 8:
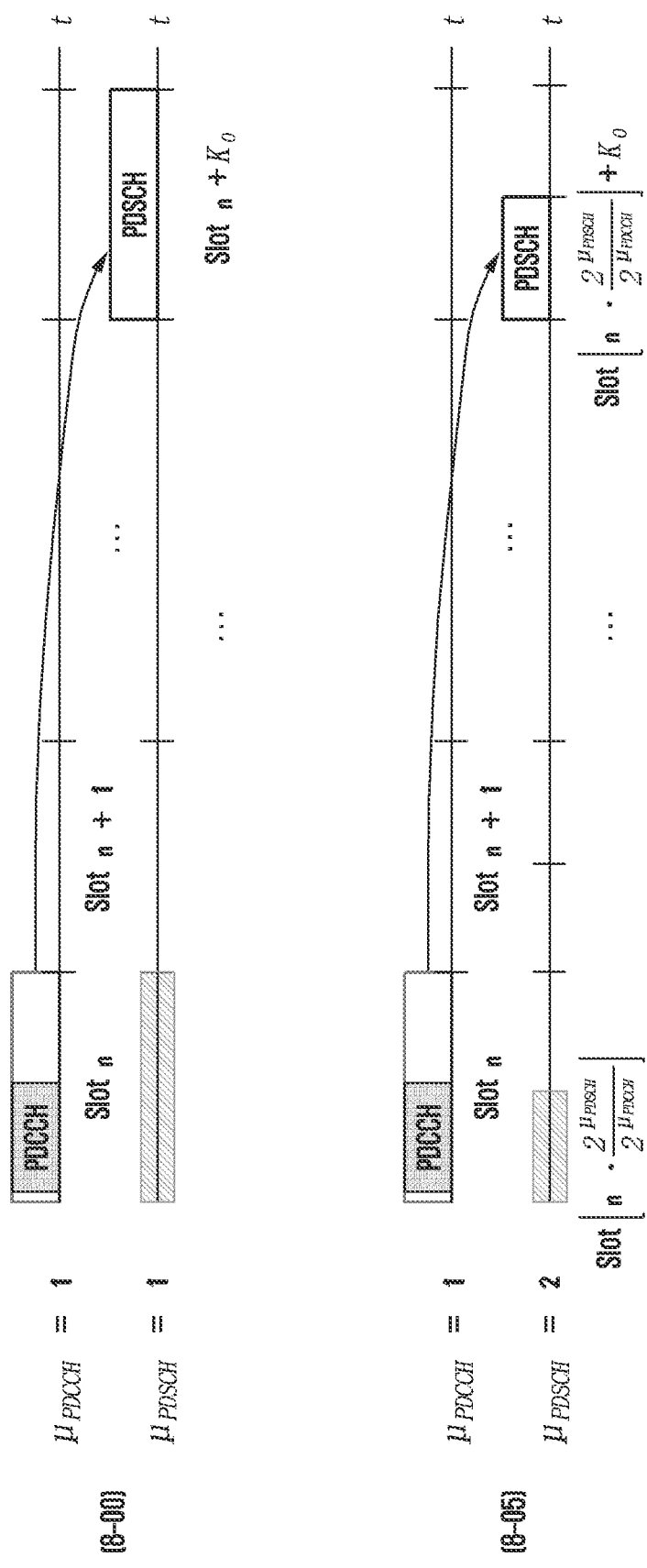
FIG. 8 is a diagram illustrating an example of time-domain resource allocation according to subcarrier spacings of a data channel and a control channel in a wireless communication system according to an embodiment of the disclosure.

FIG. 8 is a diagram illustrating an example of time-domain resource allocation according to subcarrier spacings of a data channel and a control channel in a wireless communication system according to an embodiment of the disclosure.

Referring to FIG. 8, when the subcarrier spacing of the data channel and the control channel are the same (8-00, μPDSCH=μPDCCH), because the slot numbers for the data channel and the control channel are the same, the base station and the terminal may determine a scheduling offset according to a predetermined slot offset K0. On the other hand, when the subcarrier spacing of the data channel and the control channel are different (8-05, μPDSCH≠μPDCCH), because the slot numbers for the data channel and the control channel are different, the base station and the terminal may determine a scheduling offset according to a predetermined slot offset K0 based on the subcarrier spacing of the PDCCH.

Referring to FIG. 8, an offset analysis method for a case where the subcarrier spacing between the data channel and the control channel is the same or different has been described, but the above method is not limited thereto, and similarly, it may be applied even when the subcarrier spacing of different channels or reference signals is the same or different, such as a case where the subcarrier spacing between the CSI-RS and the control channel or the subcarrier spacing between the SRS and the control channel is different.

Hereinafter, downlink control information (hereinafter referred to as DCI) in a next-generation mobile communication system (5G or NR system) will be described in detail.

Scheduling information for uplink data (or physical uplink shared channel, PUSCH)) or downlink data (or physical downlink shared channel, PDSCH)) in a next-generation mobile communication system (5G or NR system) may be transmitted from the base station to the terminal through DCI. The terminal may monitor the DCI format for fallback and the DCI format for non-fallback for PUSCH or PDSCH. The DCI format for fallback may include a field predetermined between the base station and the terminal, and the DCI format for non-fallback may include a configurable field.

DCI may be transmitted through a PDCCH, which is a physical downlink control channel, through channel coding and modulation processes. A cyclic redundancy check (CRC) may be attached to the DCI message payload, and the CRC may be scrambled with a radio network temporary identifier (RNTI) corresponding to the identity of the terminal. Depending on the purpose of the DCI message, different RNTIs may be used for scrambling of the CRC attached to the payload of the DCI message. For example, the purpose of the DCI message may include UE-specific data transmission, a power control command, or a random access response. That is, the RNTI may not be explicitly transmitted, but may be transmitted while being included in the CRC calculation process. When the DCI message transmitted on the PDCCH is received, the terminal may check the CRC using the allocated RNTI. If the CRC check result is correct, the terminal may determine that the corresponding message has been transmitted to the terminal.

For example, DCI scheduling PDSCH for system information (SI) may be scrambled with SI-RNTI. DCI scheduling a PDSCH for a random access response (RAR) message may be scrambled as a random access (RA)-RNTI. DCI scheduling a PDSCH for a paging message may be scrambled with a P (paging)-RNTI. DCI notifying SFI (Slot Format Indicator) may be scrambled with SFI-RNTI. DCI notifying Transmit Power Control (TPC) may be scrambled with TPC-RNTI. DCI for scheduling UE-specific PDSCH or PUSCH may be scrambled with C-RNTI (Cell RNTI).

DCI format 0_0 may be used as DCI for fallback scheduling PUSCH, and in this case, CRC may be scrambled with C-RNTI, CS (Configured Scheduling)-RNTI, or MCS (Modulation Coding Scheme)-C (cell)-RNTI. In an embodiment, DCI format 0_0 in which CRC is scrambled with C-RNTI may include information as illustrated in Table 14 below.

TABLE 14

Identifier for DCI formats - 1 bit
Frequency domain resource assignment -
$\lceil \log_2(N_{RB}^{UL, BWP}(N_{RB}^{UL, BWP} + 1)/2) \rceil$ bits
Time domain resource assignment - 4 bits
Frequency hopping flag - 1 bit.
Modulation and coding scheme- 5 bits
New data indicator - 1 bit
Redundancy version - 2 bits
HARQ process number - 4 bits
TPC command for scheduled PUSCH - 2 bits
UL/SUL indicator - 0 or 1 bit DCI format 0_1 may be used as non-fallback DCI for scheduling PUSCH, in this case CRC may be scrambled with C-RNTI, CS-RNTI, SP (Semi persistent)-CSI (Channel State Information)-RNTI, or MCS-C-RNTI. In an embodiment, DCI format 0_1 in which CRC is scrambled with C-RNTI may include information as illustrated in Table 15 below.

TABLE 15

Carrier indicator - 0 or 3 bits
UL/SUL indicator - 0 or 1 bit
Identifier for DCI formats - 1 bits
Bandwidth part indicator - 0, 1 or 2 bits
Frequency domain resource assignment
    For resource allocation type 0, $N_{RBG}$ bits
    For resource allocation type 1), $\lceil \log_2(N_{RB}^{UL,BWP}(N_{RB}^{UL,BWP} + 1)/2) \rceil$ bits
    If both resource allocation type 0 and 1 are configured,
        $\max(\lceil \log_2(N_{RB}^{UL,BWP}(N_{RB}^{UL,BWP} + 1)/2) \rceil, N_{RBG}) + 1$ bits
Time domain resource assignment - 1, 2, 3, 4, 5, or 6 bits
Frequency hopping flag - 0 or 1 bit, only for resource allocation type 1.
    0 bit if only resource allocation type 0 is configured;
    1 bit otherwise.
Modulation and coding scheme - 5 bits
New data indicator - 1 bit
Redundancy version - 2 bits
HARQ process number - 4 bits
1st downlink assignment index - 1 or 2 or 4 bits
    1 bit for semi-static HARQ-ACK codebook;
    2 bits for dynamic HARQ-ACK codebook, or for enhanced dynamic
    HARQ-ACK codebook without UL-TotalDAI-Included-r16.
    4 bits for enhanced dynamic HARQ-ACK codebook with UL-TotalDAI-
    Included-r16.
2nd downlink assignment index - 0 or 2 bits
    2 bits for dynamic HARQ-ACK codebook, or for enhanced dynamic
    HARQ-ACK codebook without UL-TotalDAI-Included-r16.
    4 bits for enhanced dynamic HARQ-ACK codebook with UL-TotalDAI-
    Included-r16.

TABLE 15-continued 0 bit otherwise.
TPC command for scheduled PUSCH - 2 bits

SRS resource indicator- $\left\lceil \log_2\left(\sum_{k=1}^{\min\{L_{max},N_{SRS}\}} \binom{N_{SRS}}{k}\right) \right\rceil$ or $\lceil \log_2(N_{SRS}) \rceil$ bits $\left\lceil \log_2\left(\sum_{k=1}^{\min\{L_{max},N_{SRS}\}} \binom{N_{SRS}}{k}\right) \right\rceil$ bits for non-codebook based PUSCH transmission;

$\lceil \log_2(N_{SRS}) \rceil$ bits for codebook based PUSCH transmission.
Precoding information and number of layers - up to 6 bits
Antenna ports - up to 5 bits
SRS request - up to 3 bits
CSI request - 0, 1, 2, 3, 4, 5, or 6 bits
CBG transmission information - 0, 2, 4, 6, or 8 bits
PTRS-DMRS association - 0 or 2 bits.
beta_offset indicator - 0, 1, or 2 bits
DMRS sequence initialization - 0 or 1 bit
UL-SCH indicator - 0 or 1 bit
Open-loop power control parameter set indication - up to 2 bits
SCell dormancy indication - up to 5 bits DCI format 0_2 may be used as non-fallback DCI for scheduling PUSCH, and DCI payload may be configured more flexibly compared to DCI format 0_1. In this case, the CRC may be scrambled with C-RNTI, CS-RNTI, SP-CSI-RNTI, or MCS-C-RNTI. In an embodiment, DCI format 0_2 in which CRC is scrambled with C-RNTI may include information as illustrated in Table 16 below.

TABLE 16

Carrier indicator - up to 3 bits
UL/SUL indicator - 0 or 1 bit
Identifier for DCI formats - 1 bits
Bandwidth part indicator - 0, 1 or 2 bits
Frequency domain resource assignment
    For resource allocation type 0, $N_{RBG}$ bits
    For resource allocation type 1,
    $\lceil \log_2(N_{RBG,H1}(N_{RBG,H1} + 1)/2) \rceil$ bits
    If both resource allocation type 0 and 1 are configured,
    $\max(\lceil \log_2(N_{RBG,H1}(N_{RBG,H1} + 1)/2) \rceil, N_{RBG}) + 1$ bits
Time domain resource assignment - 1, 2, 3, 4, 5, or 6 bits
Frequency hopping flag - 0 or 1 bit, only for resource allocation type 1.
    0 bit if only resource allocation type 0 is configured;
    1 bit otherwise.
Modulation and coding scheme - 5 bits
New data indicator - 1 bit
Redundancy version - up to 2 bits
HARQ process number - up to 4 bits
Downlink assignment index - 0 or 1 or 2 or 4 bits
>0 bit if the higher layer parameter Downlinkassignmentindex-ForDCIFormat0_2 is not configured
    >1st downlink assignment index - 1 or 2 bits
    >>1 bit for semi-static HARQ-ACK codebook;
    >>2 bits for dynamic HARQ-ACK codebook with single HARQ-ACK codebook.
    >2nd downlink assignment index - 0 or 2 bits TABLE 16-continued >>2 bits for dynamic HARQ-ACK codebook with two HARQ-ACK sub-codebooks;
    >>0 bit otherwise.
TPC command for scheduled PUSCH - 2 bits SRS resource indicator- $\left\lceil \log_2\left(\sum_{k=1}^{L_{max}} \binom{N_{SRS}}{k}\right) \right\rceil$ or $\lceil \log_2(N_{SRS}) \rceil$ bits $\left\lceil \log_2\left(\sum_{k=1}^{L_{max}} \binom{N_{SRS}}{k}\right) \right\rceil$ bits for non-codebook based PUSCH transmission;

$\lceil \log_2(N_{SRS}) \rceil$ bits for codebook based PUSCH transmission.
Precoding information and number of layers - up to 6 bits
Antenna ports - up to 5 bits
SRS request - up to 3 bits
CSI request - 0, 1, 2, 3, 4, 5, or 6 bits
CBG transmission information - 0, 2, 4, 6, or 8 bits
PTRS-DMRS association - 0 or 2 bits.
beta_offset indicator - 0 or 2 bits
DMRS sequence initialization - 0 or 1 bit
UL-SCH indicator - 1 bit
Open-loop power control parameter set indication - up to 2 bits
SCell dormancy indication - up to 5 bits DCI format 1_0 may be used as a DCI for fallback scheduling PDSCH, and in this case, CRC may be scrambled with C-RNTI, CS-RNTI, or MCS-C-RNTI. In an embodiment, DCI format 1_0 in which CRC is scrambled with C-RNTI may include information as illustrated in Table 17 below.

TABLE 17

Identifier for DCI formats - 1 bit
Frequency domain resource assignment -$\lceil (\log_2(N_{RB}^{DL, BWP}(N_{RB}^{DL, BWP} + 1)/2) \rceil$ bits
Time domain resource assignment - 4 bits
Frequency hopping flag - 1 bit.
Modulation and coding scheme - 5 bits
New data indicator - 1 bit
Redundancy version - 2 bits
HARQ process number - 4 bits
Downlink assignment index - 2 bits TABLE 17-continued TPC command for scheduled PUCCH - 2 bits
PUCCH resource indicator- 3 bits
PDSCH-to-HARQ feedback timing indicator - 3 bits DCI format 1_1 may be used as non-fallback DCI for scheduling PDSCH, and in this case, CRC may be scrambled with C-RNTI, CS-RNTI, or MCS-C-RNTI. In an embodiment, DCI format 1_1 in which CRC is scrambled with C-RNTI may include information as illustrated in Table 18 below.

TABLE 18

Carrier indicator - 0 or 3 bits
Identifier for DCI formats -1 bits
Bandwidth part indicator - 0, 1 or 2 bits
Frequency domain resource assignment
For resource allocation type 0, $N_{RBG}$ bits
For resource allocation type 1, $\lceil (\log_2(N_{RB}^{DL, BWP}(N_{RB}^{DL, BWP} + 1)/2))\rceil$ bits
If both resource allocation type 0 and 1 are configured,
$\max(\lceil(\log_2(N_{RB}^{DL, BWP}(N_{RB}^{DL, BWP} + 1)/2))\rceil, N_{RBG}) + 1$ bits
Time domain resource assignment -0, 1, 2, 3, or 4 bits
VRB-to-PRB mapping - 0 or 1 bit, only for resource allocation type 1.
0 bit if only resource allocation type 0 is configured;
1 bit otherwise.
PRB bundling size indicator - 0 or 1 bit
Rate matching indicator - 0, 1, or 2 bits
ZP CSI-RS trigger - 0, 1, or 2 bits
For transport block 1:
Modulation and coding scheme - 5 bits
New data indicator - 1 bit
Redundancy version - 2 bits
For transport block 2:
Modulation and coding scheme - 5 bits
New data indicator - 1 bit
Redundancy version - 2 bits
HARQ process number - 4 bits
Downlink assignment index - 2 or 4 or 6 bits
TPC command for scheduled PUCCH - 2 bits
PUCCH resource indicator - 3 bits
PDSCH-to-HARQ_feedback timing indicator - 3 bits
Antenna ports - up to 6 bits
Transmission configuration indication - 0 or 3 bits
SRS request - up to 3 bits
CBG transmission information - 0, 2, 4, 6, or 8 bits
DMRS sequence initialization - 0 or 1 bit
Open-loop power control parameter set indication - up to 2 bits
SCell dormancy indication - up to 5 bits DCI format 1_2 may be used as non-fallback DCI for scheduling PDSCH, and DCI payload may be more flexibly configured compared to DCI format 1_1. In this case, the CRC may be scrambled with C-RNTI, CS-RNTI, or MCS-C-RNTI. In an embodiment, DCI format 1_2 in which CRC is scrambled with C-RNTI may include information as illustrated in Table 19 below.

TABLE 19

Carrier indicator - up to 3 bits
Identifier for DCI formats -1 bits
Bandwidth part indicator - 0, 1 or 2 bits
Frequency domain resource assignment
For resource allocation type 0, $N_{RBG}$ bits
For resource allocation type 1, $\lceil(\log_2(N_{RBG, K2}(N_{RBG, K2} + 1)/2))\rceil$ bits
If both resource allocation type 0 and 1 are configured,
$\max(\lceil(\log_2(N_{RBG, K2}(N_{RBG, K2} + 1)/2))\rceil, N_{RBG}) + 1$ bits
Time domain resource assignment -0, 1, 2, 3, or 4 bits
VRB-to-PRB mapping - 0 or 1 bit, only for resource allocation type 1.
0 bit if only resource allocation type 0 is configured;
1 bit otherwise.
PRB bundling size indicator - 0 or 1 bit TABLE 19-continued Rate matching indicator - 0, 1, or 2 bits
ZP CSI-RS trigger - 0, 1, or 2 bits
Modulation and coding scheme - 5 bits
New data indicator - 1 bit
Redundancy version - up to 2 bits
HARQ process number - up to 4 bits
Downlink assignment index - 0, 1, 2 or 4 bits
TPC command for scheduled PUCCH - 2 bits
PUCCH resource indicator - up to 3 bits
PDSCH-to-HARQ_feedback timing indicator - up to 3 bits
Antenna ports - up to 6 bits
Transmission configuration indication - up to 3 bits
SRS request - up to 3 bits
CBG transmission information - 0, 2, 4, 6, or 8 bits
DMRS sequence initialization - 0 or 1 bit
Open-loop power control parameter set indication - up to 2 bits
SCell dormancy indication - up to 5 bits The maximum number of DCIs of different sizes that the terminal can receive per slot in the corresponding cell is 4. The maximum number of DCIs of different sizes scrambled with C-RNTIs that the terminal can receive per slot in the corresponding cell is 3.

On the other hand, the antenna port indication field of the DCI format 1_1 or 1_2 may be configured as follows Table 20 to Table 23.

TABLE 20

Antenna port(s) (1000 + DMRS port), dmrs-Type = 1, maxLength = 1
One Codeword:
Codeword 0 enabled,
Codeword 1 disabled

| Value | Number of DMRS CDM group(s) without data | DMRS port(s) |
|---|---|---|
| 0 | 1 | 0 |
| 1 | 1 | 1 |
| 2 | 1 | 0, 1 |
| 3 | 2 | 0 |
| 4 | 2 | 1 |
| 5 | 2 | 2 |
| 6 | 2 | 3 |
| 7 | 2 | 0, 1 |
| 8 | 2 | 2, 3 |
| 9 | 2 | 0-2 |
| 10 | 2 | 0-3 |
| 11 | 2 | 0, 2 |
| 12-15 | Reserved | Reserved |

TABLE 21

Antenna port(s) (1000 + DMRS port), dmrs-Type = 1, maxLength = 2

| | One Codeword: Codeword 0 enabled, Codeword 1 disabled | | | | Two Codewords: Codeword 0 enabled, Codeword 1 enabled | | |
|---|---|---|---|---|---|---|---|
| Value | Number of DMRS CDM group(s) without data | DMRS port(s) | Number of front-load symbols | Value | Number of DMRS CDM group(s) without data | DMRS port(s) | Number of front-load symbols |
| 0 | 1 | 0 | 1 | 0 | 2 | 0-4 | 2 |
| 1 | 1 | 1 | 1 | 1 | 2 | 0, 1, 2, 3, 4, 6 | 2 |
| 2 | 1 | 0, 1 | 1 | 2 | 2 | 0, 1, 2, 3, 4, 5, 6 | 2 |
| 3 | 2 | 0 | 1 | 3 | 2 | 0, 1, 2, 3, 4, 5, 6, 7 | 2 |
| 4 | 2 | 1 | 1 | 4-31 | reserved | reserved | reserved |
| 5 | 2 | 2 | 1 | | | | |
| 6 | 2 | 3 | 1 | | | | |
| 7 | 2 | 0, 1 | 1 | | | | |
| 8 | 2 | 2, 3 | 1 | | | | |
| 9 | 2 | 0-2 | 1 | | | | |
| 10 | 2 | 0-3 | 1 | | | | |
| 11 | 2 | 0, 2 | 1 | | | | |
| 12 | 2 | 0 | 2 | | | | |
| 13 | 2 | 1 | 2 | | | | |
| 14 | 2 | 2 | 2 | | | | |
| 15 | 2 | 3 | 2 | | | | |
| 16 | 2 | 4 | 2 | | | | |
| 17 | 2 | 5 | 2 | | | | |
| 18 | 2 | 6 | 2 | | | | |
| 19 | 2 | 7 | 2 | | | | |
| 20 | 2 | 0, 1 | 2 | | | | |
| 21 | 2 | 2, 3 | 2 | | | | |
| 22 | 2 | 4, 5 | 2 | | | | |
| 23 | 2 | 6, 7 | 2 | | | | |
| 24 | 2 | 0, 4 | 2 | | | | |
| 25 | 2 | 2, 6 | 2 | | | | |
| 26 | 2 | 0, 1, 4 | 2 | | | | |
| 27 | 2 | 2, 3, 6 | 2 | | | | |
| 28 | 2 | 0, 1, 4, 5 | 2 | | | | |
| 29 | 2 | 2, 3, 6, 7 | 2 | | | | |
| 30 | 2 | 0, 2, 4, 6 | 2 | | | | |
| 31 | Reserved | Reserved | Reserved | | | | |

TABLE 22

Antenna port(s) (1000 + DMRS port), dmrs-Type = 2, maxLength = 1

| | One codeword: Codeword 0 enabled, Codeword 1 disabled | | | Two codewords: Codeword 0 enabled, Codeword 1 enabled | |
|---|---|---|---|---|---|
| Value | Number of DMRS CDM group(s) without data | DMRS port(s) | Value | Number of DMRS CDM group(s) without data | DMRS port(s) |
| 0 | 1 | 0 | 0 | 3 | 0-4 |
| 1 | 1 | 1 | 1 | 3 | 0-5 |
| 2 | 1 | 0, 1 | 2-31 | reserved | reserved |
| 3 | 2 | 0 | | | |
| 4 | 2 | 1 | | | |
| 5 | 2 | 2 | | | |
| 6 | 2 | 3 | | | |
| 1 | 2 | 0, 1 | | | |
| 8 | 2 | 2, 3 | | | |
| 9 | 2 | 0-2 | | | |
| 10 | 2 | 0-3 | | | |
| 11 | 3 | 0 | | | |
| 12 | 3 | 1 | | | |
| 13 | 3 | 2 | | | |
| 14 | 3 | 3 | | | |
| 15 | 3 | 4 | | | |
| 16 | 3 | 5 | | | |
| 17 | 3 | 0, 1 | | | |
| 18 | 3 | 2, 3 | | | |
| 19 | 3 | 4, 5 | | | |
| 20 | 3 | 0-2 | | | |
| 21 | 3 | 3-5 | | | |
| 22 | 3 | 0-3 | | | |
| 23 | 2 | 0, 2 | | | |
| 24-31 | Reserved | Reserved | | | |

TABLE 23-1

Antenna port(s) (1000 + DMRS port), dmrs-Type = 2, maxLength = 2

| | One codeword: Codeword 0 enabled, Codeword 1 disabled | | | | Two Codewords: Codeword 0 enabled, Codeword 1 enabled | | |
|---|---|---|---|---|---|---|---|
| Value | Number of DMRS CDM group(s) without data | DMRS port(s) | Number of front-load symbols | Value | Number of DMRS CDM group(s) without data | DMRS port(s) | Number of front-load symbols |
| 0 | 1 | 0 | 1 | 0 | 3 | 0-4 | 1 |
| 1 | 1 | 1 | 1 | 1 | 3 | 0-5 | 1 |
| 2 | 1 | 0, 1 | 1 | 2 | 2 | 0, 1, 2, 3, 6 | 2 |
| 3 | 2 | 0 | 1 | 3 | 2 | 0, 1, 2, 3, 6, 8 | 2 |
| 4 | 2 | 1 | 1 | 4 | 2 | 0, 1, 2, 3, 6, 7, 8 | 2 |
| 5 | 2 | 2 | 1 | 5 | 2 | 0, 1, 2, 3, 6, 7, 8, 9 | 2 |
| 6 | 2 | 3 | 1 | 6-63 | Reserved | Reserved | Reserved |
| 7 | 2 | 0, 1 | 1 | | | | |
| 8 | 2 | 2, 3 | 1 | | | | |
| 9 | 2 | 0-2 | 1 | | | | |
| 10 | 2 | 0-3 | 1 | | | | |
| 11 | 3 | 0 | 1 | | | | |
| 12 | 3 | 1 | 1 | | | | |
| 13 | 3 | 2 | 1 | | | | |
| 14 | 3 | 3 | 1 | | | | |
| 15 | 3 | 4 | 1 | | | | |
| 16 | 3 | 5 | 1 | | | | |
| 17 | 3 | 0, 1 | 1 | | | | |
| 18 | 3 | 2, 3 | 1 | | | | |
| 19 | 3 | 4, 5 | 1 | | | | |
| 20 | 3 | 0-2 | 1 | | | | |
| 21 | 3 | 3-5 | 1 | | | | |
| 22 | 3 | 0-3 | 1 | | | | |
| 23 | 2 | 0, 2 | 1 | | | | |
| 24 | 3 | 0 | 2 | | | | |
| 25 | 3 | 1 | 2 | | | | |
| 26 | 3 | 2 | 2 | | | | |
| 27 | 3 | 3 | 2 | | | | |
| 28 | 3 | 4 | 2 | | | | |
| 29 | 3 | 5 | 2 | | | | |
| 30 | 3 | 6 | 2 | | | | |
| 31 | 3 | 7 | 2 | | | | |

TABLE 23-2

Antenna port(s) (1000 + DMRS port), dmrs-Type = 2, maxLength = 2

| | One codeword: Codeword 0 enabled, Codeword 1 disabled | | | | Two Codewords: Codeword 0 enabled, Codeword 1 enabled | | |
|---|---|---|---|---|---|---|---|
| Value | Number of DMRS CDM group(s) without data | DMRS port(s) | Number of front-load symbols | Value | Number of DMRS CDM group(s) without data | DMRS port(s) | Number of front-load symbols |
| 32 | 3 | 8 | 2 | | | | |
| 33 | 3 | 9 | 2 | | | | |
| 34 | 3 | 10 | 2 | | | | |
| 35 | 3 | 11 | 2 | | | | |
| 36 | 3 | 0, 1 | 2 | | | | |
| 37 | 3 | 2, 3 | 2 | | | | |
| 38 | 3 | 4, 5 | 2 | | | | |
| 39 | 3 | 6, 7 | 2 | | | | |
| 40 | 3 | 8, 9 | 2 | | | | |
| 41 | 3 | 10, 11 | 2 | | | | |
| 42 | 3 | 0, 1, 6 | 2 | | | | |
| 43 | 3 | 2, 3, 8 | 2 | | | | |
| 44 | 3 | 4, 5, 10 | 2 | | | | |
| 45 | 3 | 0, 1, 6, 7 | 2 | | | | |
| 46 | 3 | 2, 3, 8, 9 | 2 | | | | |
| 47 | 3 | 4, 5, 10, 11 | 2 | | | | |
| 48 | 1 | 0 | 2 | | | | |
| 49 | 1 | 1 | 2 | | | | |
| 50 | 1 | 6 | 2 | | | | |

TABLE 23-2-continued

Antenna port(s) (1000 + DMRS port), dmrs-Type = 2, maxLength = 2

| | One codeword: Codeword 0 enabled, Codeword 1 disabled | | | | Two Codewords: Codeword 0 enabled, Codeword 1 enabled | | |
| --- | --- | --- | --- | --- | --- | --- | --- |
| Value | Number of DMRS CDM group(s) without data | DMRS port(s) | Number of front-load symbols | Value | Number of DMRS CDM group(s) without data | DMRS port(s) | Number of front-load symbols |
| 51 | 1 | 7 | 2 | | | | |
| 52 | 1 | 0, 1 | 2 | | | | |
| 53 | 1 | 6, 7 | 2 | | | | |
| 54 | 2 | 0, 1 | 2 | | | | |
| 55 | 2 | 2, 3 | 2 | | | | |
| 56 | 2 | 6, 7 | 2 | | | | |
| 57 | 2 | 8, 9 | 2 | | | | |
| 58-63 | Reserved | Reserved | Reserved | | | | |

Table 23-1 and Table 23-2 are preferably understood to be connected to each other.

Table 20 is a table used when dmrs-type is 1 and maxLength is 1, and Table 21 is used when dmrs-Type=1 and maxLength=2 are indicated. The port of DMRS used is indicated based on Table 22 when dmrs-type=2 and maxLength=1, and Table 23-1 and Table 23-2 when drms-type=2 and maxLength=2.

In the table, numbers 1, 2, and 3 indicated by Number of DMRS CDM group(s) without data refer to CDM groups {0}, {0, 1}, {0, 1, 2}, respectively. DMRS port(s) is the index of the port to be used in order. Antenna port is indicated by DMRS port+1000. The CDM group of the DMRS is connected to the method of generating the DMRS sequence and the antenna port as illustrated in Tables 24 and 25. Table 24 is the parameter when dmrs-type=1 is used, and Table 25 is the parameter when dmrs-type=2 is used.

TABLE 24

Parameters for PDSCH DM-RS dmrs-type = 1.

| | | | $w_f(k')$ | | $w_t(l')$ | |
| --- | --- | --- | --- | --- | --- | --- |
| p | λ | Δ | k' = 0 | k' = 1 | l' = 0 | l' = 1 |
| 1000 | 0 | 0 | +1 | +1 | +1 | +1 |
| 1001 | 0 | 0 | +1 | −1 | +1 | +1 |
| 1002 | 1 | 1 | +1 | +1 | +1 | +1 |
| 1003 | 1 | 1 | +1 | −1 | +1 | +1 |
| 1004 | 0 | 0 | +1 | +1 | +1 | −1 |
| 1005 | 0 | 0 | +1 | −1 | +1 | −1 |
| 1006 | 1 | 1 | +1 | +1 | +1 | −1 |
| 1007 | 1 | 1 | +1 | −1 | +1 | −1 |

TABLE 25

Parameters for PDSCH DM-RS dmrs-type = 2.

| | CDM group | | $w_f(k')$ | | $w_t(l')$ | |
| --- | --- | --- | --- | --- | --- | --- |
| p | λ | Δ | k' = 0 | k' = 1 | l' = 0 | l' = 1 |
| 1000 | 0 | 0 | +1 | +1 | +1 | +1 |
| 1001 | 0 | 0 | +1 | −1 | +1 | +1 |
| 1002 | 1 | 2 | +1 | +1 | +1 | +1 |
| 1003 | 1 | 2 | +1 | −1 | +1 | +1 |
| 1004 | 2 | 4 | +1 | +1 | +1 | +1 |
| 1005 | 2 | 4 | +1 | −1 | +1 | +1 |
| 1006 | 0 | 0 | +1 | +1 | +1 | −1 |
| 1007 | 0 | 0 | +1 | −1 | +1 | −1 |
| 1008 | 1 | 2 | +1 | +1 | +1 | −1 |
| 1009 | 1 | 2 | +1 | −1 | +1 | −1 |
| 1010 | 2 | 4 | +1 | +1 | +1 | −1 |
| 1011 | 2 | 4 | +1 | −1 | +1 | −1 |

The DMRS sequence according to each parameter is determined by Equation 2 below.

$$a_{k,l}^{(p,\mu)} = \beta_{PDSCH}^{DMRS} w_f(k') w_t(l') r(2n+k') \quad \text{Equation 2}$$

$$k = \begin{cases} 4n + 2k' + \Delta & \text{Configuration type 1} \\ 6n + k' + \Delta & \text{Configuration type 2} \end{cases}$$

$$k' = 0, 1$$

$$l = \bar{l} + l'$$

$$n = 0, 1, \ldots$$

Next, a process for measuring and reporting a channel state in a wireless communication system according to an embodiment of the disclosure will be described in detail.

In NR, CSI-RS (channel state information reference signal) may be supported as a reference signal for channel state measurement of the terminal, and each CSI-RS resource configuration configured by a higher layer may include at least the following detailed configuration information. However, it is not limited to the following examples.

NZP-CSI-RS-Resource ConfigID: ID of the corresponding CSI-RS resource configurations NrofPorts: The number of CSI-RS ports included in the CSI-RS resource CSI-RS-timeConfig: Transmission period and slot offset of the CSI-RS resource CSI-RS-ResourceMapping: OFDM symbol position in the slot of the CSI-RS resource and subcarrier position in the PRB CSI-RS-Density: The frequency density of the CSI-RS.

CDMType: CDM length and CDM RE pattern of the CSI-RS.

CSI-RS-FreqBand: Transmission bandwidth and start position of the CSI-RS

Pc: ratio between PDSCH (physical downlink shared channel) EPRE (Energy Per RE) and NZP CSI-RS EPRE powerControlOffset: ratio between PDSCH EPRE (Energy Per RE) and CSI-RS EPRE powerControlOffsetSS: ratio between SS/PBCH block EPRE and CSI-RS EPRE According to some embodiments, in NR, one CSI-RS port number of {1, 2, 4, 8, 12, 16, 24, 32} may be configured in one CSI-RS resource, and different degrees of configuration freedom are supported according to the number of CSI-RS ports configured in the CSI-RS resource.

Table 26 illustrates the CSI-RS density, CDM length and type, frequency domain and time domain start position of CSI-RS component RE pattern ($\bar{k}$, $\bar{l}$), the number of frequency-domain REs (k') and the number of time-domain REs (l') of the CSI-RS component RE pattern configurable according to the number of NR CSI-RS ports (X).

According to some embodiments, the CSI-RS component RE pattern is a basic unit constituting the CSI-RS resource, and may be composed of a total of YZ REs with (Y=1+max (k')) REs adjacent on the frequency domain and (Z=1+max (l')) REs adjacent on the time domain. Referring to Table 26, NR supports different degrees of the frequency domain configuration freedom according to the number of CSI-RS ports configured in the CSI-RS resource.

Figure 9:
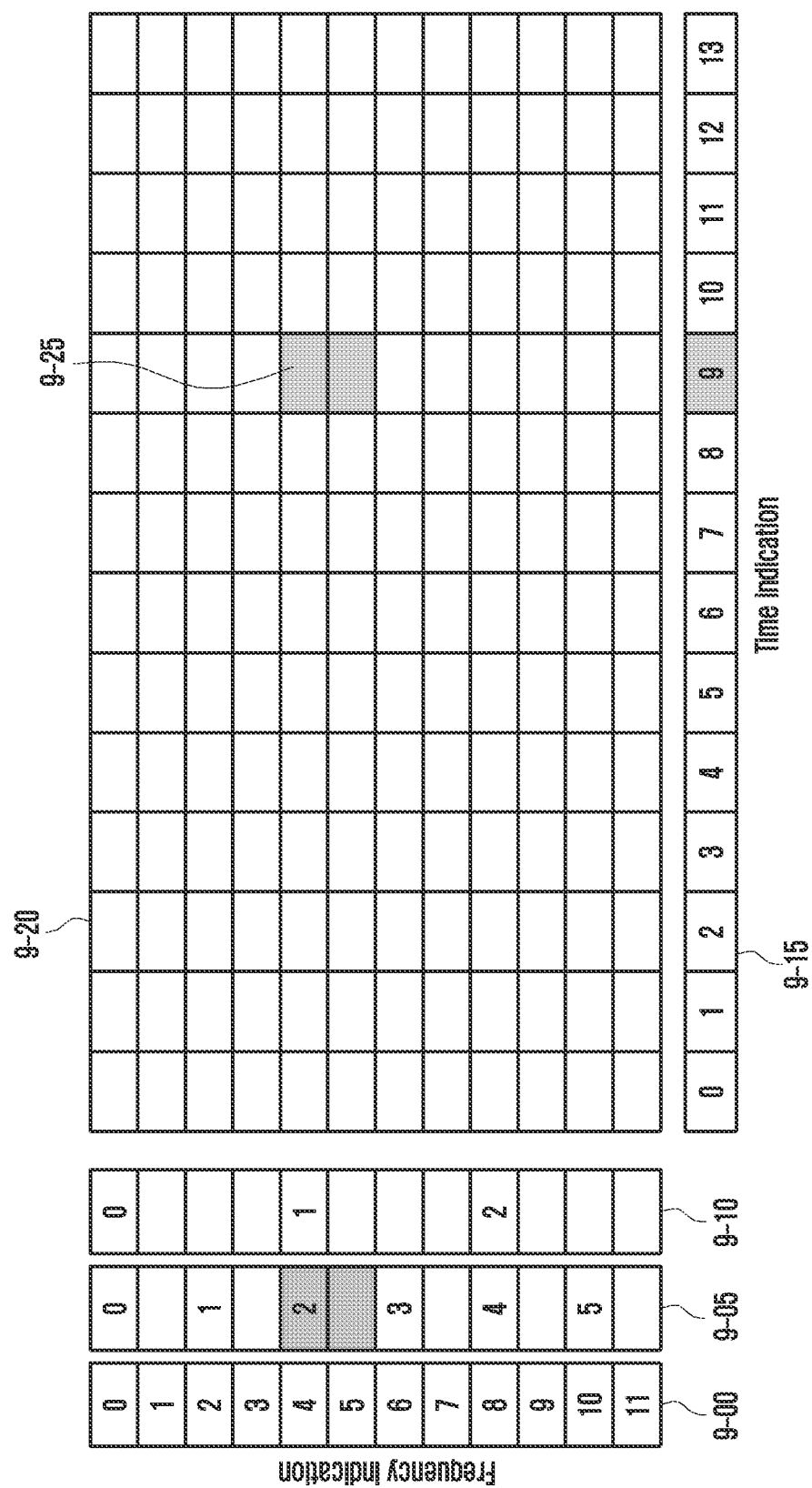
FIG. 9 is a diagram illustrating a structure of a base station and a terminal radio protocol when performing single cell, carrier aggregation, and dual connectivity according to an embodiment of the disclosure.

FIG. 9 illustrates designation of a CSI-RS resource element by CSI-RS resource mapping in a wireless communication system according to an embodiment of the disclosure.

Referring to FIG. 9, it is a diagram illustrating an example of CSI-RS RE designation by CSI-RS-ResourceMapping configured by a higher layer. When the CSI-RS is 1 port, the CSI-RS may be configured without subcarrier restrictions in the PRB, and the terminal may be assigned a CSI-RS RE location by a 12-bit bitmap (9-00). When the CSI-RS is {2, 4, 8, 12, 16, 24, 32} port and Y=2, it is possible to configure CSI-RS for every two subcarriers in the PRB, and the terminal may be assigned a CSI-RS RE location by a 6-bit bitmap (9-05). When the CSI-RS is 4 ports and Y=4, CSI-RS can be configured for every four subcarriers in the PRB, and the terminal may be assigned a CSI-RS RE location by a 3-bit bitmap (9-10). Similarly, in the case of the time axis RE position, it is possible for the terminal to receive the CSI-RS by a bitmap of a total of 14 bits. At this time, it is possible to change the length of the bitmap according to the Z value of Table 19 (CSI-RS locations within a slot), as in the frequency location designation, but the principle is similar to the above description, so a detailed description thereof will be omitted.

For example, if X=2 port is configured, the base station designates the frequency axis RE position by (9-05), and if the base station designates the frequency axis subcarrier position by 2 of (9-05) and designates the time axis OFDM symbol position by 9 of (9-15), based on this, the terminal may know that the CSI-RS is transmitted at the RE position of (9-25) in the corresponding PRB (9-20).

TABLE 26

| Row | Ports X | Density ρ | Ccdm-Type | ($\bar{k}$, $\bar{l}$) | CDM group index j | k' | l' |
|---|---|---|---|---|---|---|---|
| 1 | 1 | 3 | No CDM | $(k_0, l_0), (k_0 + 4, l_0), (k_0 + 8, l_0)$ | 0, 0, 0 | 0 | 0 |
| 2 | 1 | 1, 0.5 | No CDM | $(k_0, l_0)$ | 0 | 0 | 0 |
| 3 | 2 | 1, 0.5 | FD-CDM2 | $(k_0, l_0)$ | 0 | 0, 1 | 0 |
| 4 | 4 | 1 | FD-CDM2 | $(k_0, l_0), (k_0 + 2, l_0)$ | 0, 1 | 0, 1 | 0 |
| 5 | 4 | 1 | FD-CDM2 | $(k_0, l_0), (k_0, l_0 + 1)$ | 0, 1 | 0, 1 | 0 |
| 6 | 8 | 1 | FD-CDM2 | $(k_0, l_0), (k_1, l_0), (k_2, l_0), (k_3, l_0)$ | 0, 1, 2, 3 | 0, 1 | 0 |
| 7 | 8 | 1 | FD-CDM2 | $(k_0, l_0), (k_1, l_0), (k_0, l_0 + 1), (k_1, l_0 + 1)$ | 0, 1, 2, 3 | 0, 1 | 0 |
| 8 | 8 | 1 | CDM4 (FD2, TD2) | $(k_0, l_0), (k_1, l_0)$ | 0, 1 | 0, 1 | 0, 1 |
| 9 | 12 | 1 | FD-CDM2 | $(k_0, l_0), (k_1, l_0), (k_2, l_0), (k_3, l_0),$ $(k_4, l_0), (k_5, l_0)$ | 0, 1, 2, 3, 4, 5 | 0, 1 | 0 |
| 10 | 12 | 1 | CDM4 (FD2, TD2) | $(k_0, l_0), (k_1, l_0), (k_2, l_0)$ | 0, 1, 2 | 0, 1 | 0, 1 |
| 11 | 16 | 1, 0.5 | FD-CDM2 | $(k_0, l_0), (k_1, l_0), (k_2, l_0), (k_3, l_0),$ $(k_0, l_0 + 1), (k_1, l_0 + 1), (k_2, l_0 + 1),$ $(k_3, l_0 + 1)$ | 0, 1, 2, 3, 4, 5, 6, 7 | 0, 1 | 0 |
| 12 | 16 | 1, 0.5 | CDM4 (FD2, TD2) | $(k_0, l_0), (k_1, l_0), (k_2, l_0), (k_3, l_0)$ | 0, 1, 2, 3 | 0, 1 | 0, 1 |
| 13 | 24 | 1, 0.5 | FD-CDM2 | $(k_0, l_0), (k_1, l_0), (k_2, l_0), (k_0, l_0 + 1),$ $(k_1, l_0 + 1), (k_2, l_0 + 1)$ $(k_0, l_1), (k_1, l_1), (k_2, l_1), (k_0, l_1 + 1),$ $(k_1, l_1 + 1), (k_2, l_1 + 1)$ | 0, 1, 2, 3, 4, 5, 6, 7, 8, 9, 10, 11 | 0, 1 | 0 |
| 14 | 24 | 1, 0.5 | CDM4 (FD2, TD2) | $(k_0, l_0), (k_1, l_0), (k_2, l_0),$ $(k_0, l_1), (k_1, l_1), (k_2, l_1)$ | 0, 1, 2, 3, 4, 5 | 0, 1 | 0, 1 |
| 15 | 24 | 1, 0.5 | CDM8 (FD2, TD4) | $(k_0, l_0), (k_1, l_0), (k_2, l_0)$ | 0, 1, 2 | 0, 1 | 0, 1, 2, 3 |
| 16 | 32 | 1, 0.5 | FD-CDM2 | $(k_0, l_0), (k_1, l_0), (k_2, l_0), (k_3, l_0),$ $(k_0, l_0 + 1), (k_1, l_0 + 1), (k_2, l_0 + 1), (k_3, l_0 + 1),$ $(k_0, l_1), (k_1, l_1), (k_2, l_1), (k_3, l_1),$ $(k_0, l_1 + 1), (k_1, l_1 + 1), (k_2, l_1 + 1), (k_3, l_1 + 1)$ | 0, 1, 2, 3, 4, 5, 6, 7, 8, 9, 10, 11, 12, 13, 14, 15 | 0, 1 | 0 |
| 17 | 32 | 1, 0.5 | CDM4 (FD2, TD2) | $(k_0, l_0), (k_1, l_0), (k_2, l_0), (k_3, l_0),$ $(k_0, l_1), (k_1, l_1), (k_2, l_1), (k_3, l_1)$ | 0, 1, 2, 3, 4, 5, 6, 7 | 0, 1 | 0, 1 |
| 18 | 32 | 1, 0.5 | CDM8 (FD2, TD4) | $(k_0, l_0), (k_1, l_0), (k_2, l_0), (k_3, l_0)$ | 0, 1, 2, 3 | 0, 1 | 0, 1, 2, 3 |

Next, a method of measuring and reporting a channel state in a 5G communication system will be described in detail.

The channel state information (CSI) may include a channel quality information (CQI), a precoding matrix indicator (PMI), a CSI-RS resource indicator (CRI), an SS/PBCH block resource indicator (SSBRI), a layer indicator (LI), a rank indicator (RI), and/or reference signal received power (L1-RSRP). The base station may control the time and frequency resources for the above-described CSI measurement and report of the terminal.

For the above-described CSI measurement and report, the terminal may receive configuration information for N (≥1) CSI reports (CSI-ReportConfig), configuration information for M (≥1) RS transmission resources (CSI-ResourceConfig), one or two trigger states (CSI-AperiodicTriggerStateList, CSI-SemiPersistentOnPUSCH-TriggerStateList) list (List) information through higher layer signaling.

The configuration information for the above-described CSI measurement and reporting may be more specifically described in Tables 27 to 33 as follows.

TABLE 27

```
CSI-ReportConfig
   The IE CSI-ReportConfig is used to configure a periodic or semi-persistent
report sent on PUCCH on the cell in which the CSI-ReportConfig is included, or to
configure a semi-persistent or aperiodic report sent on PUSCH triggered by DCI
received on the cell in which the CSI-ReportConfig is included (in this case, the cell
on which the report is sent is determined by the received DCI). See TS 38.214, clause
5.2.1.
   CSI-ReportConfig information element
   -- ASN1START
   -- TAG-CSI-REPORTCONFIG-START
   CSI-ReportConfig :: =                         SEQUENCE {
      reportConfigId                                CSI-ReportConfigId,
      carrier                            ServCellIndex              OPTIONAL, -- Need
S
      resourcesForChannelMeasurement                                   CSI-ResourceConfigId,
      csi-IM-ResourcesForInterference                                  CSI-ResourceConfigId
OPTIONAL,   -- Need R
      nzp-CSI-RS-ResourcesForInterference                              CSI-ResourceConfigId
OPTIONAL,   -- Need R
      reportConfigType                              CHOICE {
         periodic                             SEQUENCE {
            reportSlotConfig                                  CSI-ReportPeriodicityAndOffset,
            pucch-CSI-ResourceList                                      SEQUENCE (SIZE
(1..maxNrofBWPs)) OF PUCCH-CSI-Resource
         },
         semiPersistentOnPUCCH                                    SEQUENCE {
            reportSlotConfig                            CSI-ReportPeriodicityAndOffset,
            pucch-CSI-ResourceList                                      SEQUENCE (SIZE
(1..maxNrofBWPs)) OF PUCCH-CSI-Resource
         },
         semiPersistentOnPUSCH                                    SEQUENCE {
            reportSlotConfig                            ENUMERATED {sl5, sl10, sl20, sl40,
sl80, sl160, sl320},
            reportSlotOffsetList                                 SEQUENCE (SIZE (1.. maxNrofUL-
Allocations)) OF INTEGER(0..32),
            p0alpha                           P0-PUSCH-AlphaSetId
         },
         aperiodic                            SEQUENCE {
            reportSlotOffsetList                                 SEQUENCE (SIZE (1..maxNrofUL-
Allocations)) OF INTEGER(0..32)
         }
      },
      reportQuantity                           CHOICE {
         none                          NULL,
         cri-RI-PMI-CQI                                NULL,
         cri-RI-i1                       NULL,
         cri-RI-i1-CQI                              SEQUENCE {
            pdsch-BundleSizeForCSI                                      ENUMERATED {n2, n4}
OPTIONAL    -- Need S
         },
         cri-RI-CQI                          NULL,
         cri-RSRP                         NULL,
         ssb-Index-RSRP                              NULL,
         cri-RI-LI-PMI-CQI                                NULL
      },
      reportFreqConfiguration                                SEQUENCE {
         cqi-FormatIndicator                                ENUMERATED { widebandCQI,
subbandCQI }                      OPTIONAL,   -- Need R
         pmi-FormatIndicator                                ENUMERATED { widebandPMI,
subbandPMI }                      OPTIONAL,   -- Need R
         csi-ReportingBand                               CHOICE {
            subbands3                               BIT STRING(SIZE(3)),
            subbands4                               BIT STRING(SIZE(4)),
            subbands5                               BIT STRING(SIZE(5)),
            subbands6                               BIT STRING(SIZE(6)),
            subbands7                               BIT STRING(SIZE(7)),
            subbands8                               BIT STRING(SIZE(8)),
```

TABLE 27-continued

```
            subbands9                                      BIT STRING(SIZE(9)),
            subbands10                                     BIT STRING(SIZE(10)),
            subbands11                                     BIT STRING(SIZE(11)),
            subbands12                                     BIT STRING(SIZE(12)),
            subbands13                                     BIT STRING(SIZE(13)),
            subbands14                                     BIT STRING(SIZE(14)),
            subbands15                                     BIT STRING(SIZE(15)),
            subbands16                                     BIT STRING(SIZE(16)),
            subbands17                                     BIT STRING(SIZE(17)),
            subbands18                                     BIT STRING(SIZE(18)),
            ...,
            subbands19-v1530                               BIT STRING(SIZE(19))
        } OPTIONAL -- Need S
    }                                                                  OPTIONAL,
-- Need R
        timeRestrictionForChannelMeasurements          ENUMERATED
{configured, notConfigured},
        timeRestrictionForInterferenceMeasurements     ENUMERATED
{configured, notConfigured},
        codebookConfig                                 CodebookConfig
OPTIONAL,   -- Need R
        dummy                                          ENUMERATED {n1, n2}
OPTIONAL,   -- Need R
        groupBasedBeamReporting                        CHOICE {
            enabled                                    NULL,
            disabled                                   SEQUENCE {
                nrofReportedRS                                 ENUMERATED {n1, n2, n3, n4}
OPTIONAL   -- Need S
            }
        },
        cqi-Table                ENUMERATED {table1, table2, table3, spare1}
OPTIONAL,   -- Need R
        subbandSize                   ENUMERATED {value1, value2},
        non-PMI-PortIndication                  SEQUENCE (SIZE (1..maxNrofNZP-CSI-
RS-ResourcesPerConfig)) OF PortIndexFor8Ranks OPTIONAL,   -- Need R
        ...,
        [[
        semiPersistentOnPUSCH-v1530                    SEQUENCE {
            reportSlotConfig-v1530                     ENUMERATED {sl4, sl8, sl16}
        }                                                                  OPTIONAL
-- Need R
        ]]
    }
    CSI-ReportPeriodicityAndOffset ::= CHOICE {
        slots4                          INTEGER(0..3),
        slots5                          INTEGER(0..4),
        slots8                          INTEGER(0..7),
        slots10                         INTEGER(0..9),
        slots16                         INTEGER(0..15),
        slots20                         INTEGER(0..19),
        slots40                         INTEGER(0..39),
        slots80                         INTEGER(0..79),
        slots160                        INTEGER(0..159),
        slots320                        INTEGER(0..319)
    }
    PUCCH-CSI-Resource ::=                             SEQUENCE {
        uplinkBandwidthPartId                          BWP-Id,
        pucch-Resource                         PUCCH-ResourceId
    }
    PortIndexFor8Ranks ::=                             CHOICE {
        portIndex8                                     SEQUENCE{
            rank1-8                    PortIndex8                          OPTIONAL,
-- Need R
            rank2-8                                    SEQUENCE(SIZE(2)) OF PortIndex8
OPTIONAL,   -- Need R
            rank3-8                                    SEQUENCE(SIZE(3)) OF PortIndex8
OPTIONAL,   -- Need R
            rank4-8                                    SEQUENCE(SIZE(4)) OF PortIndex8
OPTIONAL,   -- Need R
            rank5-8                                    SEQUENCE(SIZE(5)) OF PortIndex8
OPTIONAL,   -- Need R
            rank6-8                                    SEQUENCE(SIZE(6)) OF PortIndex8
OPTIONAL,   -- Need R
            rank7-8                                    SEQUENCE(SIZE(7)) OF PortIndex8
OPTIONAL,   -- Need R
            rank8-8                                    SEQUENCE(SIZE(8)) OF PortIndex8
OPTIONAL   -- Need R
        },
        portIndex4                     SEQUENCE{
            rank1-4                    PortIndex4                          OPTIONAL,
```

TABLE 27-continued

```
-- Need R
    rank2-4                                SEQUENCE(SIZE(2)) OF PortIndex4
OPTIONAL,  -- Need R
    rank3-4                                SEQUENCE(SIZE(3)) OF PortIndex4
OPTIONAL,  -- Need R
    rank4-4                                SEQUENCE(SIZE(4)) OF PortIndex4
OPTIONAL   -- Need R
    },
    portIndex2                   SEQUENCE{
    rank1-2                      PortIndex2                                OPTIONAL,
-- Need R
    rank2-2                                SEQUENCE(SIZE(2)) OF PortIndex2
OPTIONAL   -- Need R
    },
    portIndex1                   NULL
}
PortIndex8::=                    INTEGER (0..7)
PortIndex4::=                    INTEGER (0..3)
PortIndex2::=                    INTEGER (0..1)
-- TAG-CSI-REPORTCONFIG-STOP
-- ASN1STOP
```

CSI-ReportConfig field descriptions
carrier
Indicates in which serving cell the CSI-ResourceConfig indicated below are
to be found. If the field is absent, the resources are on the same serving cell as this
report configuration.
codebookConfig
Codebook configuration for Type-1 or Type-II including codebook subset
restriction.
cqi-FormatIndicator
Indicates whether the UE shall report a single (wideband) or multiple
(subband) CQI. (see TS 38.214, clause 5.2.1.4).
cqi-Table
Which CQI table to use for CQI calculation (see TS 38.214, clause 5.2.2.1).
csi-IM-ResourcesForInterference
CSI IM resources for interference measurement. csi-ResourceConfigId of a
CSI-ResourceConfig included in the configuration of the serving cell indicated with
the field "carrier" above. The CSI-ResourceConfig indicated here contains only CSI-
IM resources. The bwp-Id in that CSI-ResourceConfig is the same value as the bwp-
Id in the CSI-ResourceConfig indicated by resourcesForChannelMeasurement.
csi-ReportingBand
Indicates a contiguous or non-contiguous subset of subbands in the bandwidth
part which CSI shall be reported for. Each bit in the bit-string represents one subband.
The right-most bit in the bit string represents the lowest subband in the BWP. The
choice determines the number of subbands (subbands3 for 3 subbands, subbands4
for 4 subbands, and so on) (see TS 38.214, clause 5.2.1.4). This field is absent if
there are less than 24 PRBs (no sub band) and present otherwise, the number of sub
bands can be from 3 (24 PRBs, subband size 8) to 18 (72 PRBs, sub band size 4).
dummy
This field is not used in the specification. If received it shall be ignored by the
UE.
groupBasedBeamReporting
Turning on/off group beam based reporting (see TS 38.214, clause 5.2.1.4)
non-PMI-PortIndication
Port indication for RI/CQI calculation. For each CSI-RS resource in the linked
ResourceConfig for channel measurement, a port indication for each rank R,
indicating which R ports to use. Applicable only for non-PMI feedback (see TS
38.214, clause 5.2.1.4.2).
The first entry in non-PMI-PortIndication corresponds to the NZP-CSI-RS-
Resource indicated by the first entry in nzp-CSI-RS-Resources in the NZP-CSI-RS-
ResourceSet indicated in the first entry of nzp-CSI-RS-ResourceSetList of the CSI-
ResourceConfig whose CSI-ResourceConfigId is indicated in a CSI-MeasId together
with the above CSI-ReportConfigId. The second entry in non-PMI-PortIndication
corresponds to the NZP-CSI-RS-Resource indicated by the second entry in nzp-CSI-
RS-Resources in the NZP-CSI-RS-ResourceSet indicated in the first entry of nzp-
CSI-RS-ResourceSetList of the same CSI-ResourceConfig, and so on until the NZP-
CSI-RS-Resource indicated by the last entry in nzp-CSI-RS-Resources in the in the
NZP-CSI-RS-ResourceSet indicated in the first entry of nzp-CSI-RS-
ResourceSetList of the same CSI-ResourceConfig. Then the next entry corresponds
to the NZP-CSI-RS-Resource indicated by the first entry in nzp-CSI-RS-Resources
in the NZP-CSI-RS-ResourceSet indicated in the second entry of nzp-CSI-RS-
ResourceSetList of the same CSI-ResourceConfig and so on.
nrofReportedRS
The number (N) of measured RS resources to be reported per report setting in
a non-group-based report. N <= N_max, where N_max is either 2 or 4 depending on
UE capability.
(see TS 38.214, clause 5.2.1.4) When the field is absent the UE applies the
value 1
nzp-CSI-RS-ResourcesForInterference

TABLE 27-continued

NZP CSI RS resources for interference measurement. csi-ResourceConfigId
of a CSI-ResourceConfig included in the configuration of the serving cell indicated
with the field "carrier" above. The CSI-ResourceConfig indicated here contains only
NZP-CSI-RS resources. The bwp-Id in that CSI-ResourceConfig is the same value
as the bwp-Id in the CSI-ResourceConfig indicated by
resourcesForChannelMeasurement.
p0alpha
Index of the p0-alpha set determining the power control for this CSI report
transmission (see TS 38.214, clause 6.2.1.2).
pdsch-BundleSizeForCSI
PRB bundling size to assume for CQI calculation when reportQuantity is
CRI/RI/i1/CQI. If the field is absent, the UE assumes that no PRB bundling is applied
(see TS 38.214, clause 5.2.1.4.2).
pmi-FormatIndicator
Indicates whether the UE shall report a single (wideband) or multiple
(subband) PMI. (see TS 38.214, clause 5.2.1.4).
pucch-CSI-ResourceList
Indicates which PUCCH resource to use for reporting on PUCCH.
reportConfigType
Time domain behavior of reporting configuration
reportFreqConfiguration
Reporting configuration in the frequency domain. (see TS 38.214, clause
5.2.1.4).
reportQuantity
The CSI related quantities to report. Corresponds to L1 parameter
'ReportQuantity' (see TS 38.214, clause 5.2.1).
reportSlotConfig
Periodicity and slot offset (see TS 38.214, clause 5.2.1.4) .
reportSlotConfig-v1530
Extended value range for reportSlotConfig for semi-persistent CSI on
PUSCH. If the field is present, the UE shall ignore the value provided in the legacy
field (semiPersistentOnPUSCH.reportSlotConfig).
reportSlotOffsetList
Timing offset Y for semi persistent reporting using PUSCH. This field lists
the allowed offset values. This list must have the same number of entries as the
pusch-TimeDomainAllocationList in PUSCH-Config. A particular value is indicated
in DCI. The network indicates in the DCI field of the UL grant, which of the
configured report slot offsets the UE shall apply. The DCI value 0 corresponds to the
first report slot offset in this list, the DCI value 1 corresponds to the second report
slot offset in this list, and so on. The first report is transmitted in slot n + Y, second
report in n + Y + P, where P is the configured periodicity.
Timing offset Y for aperiodic reporting using PUSCH. This field lists the
allowed offset values. This list must have the same number of entries as the pusch-
TimeDomainAllocationList in PUSCH-Config. A particular value is indicated in
DCI. The network indicates in the DCI field of the UL grant, which of the configured
report slot offsets the UE shall apply. The DCI value 0 corresponds to the first report
slot offset in this list, the DCI value 1 corresponds to the second report slot offset in
this list, and so on (see TS 38.214, clause 5.2.3).
resourcesForChannelMeasurement
Resources for channel measurement. csi-ResourceConfigId of a CSI-
ResourceConfig included in the configuration of the serving cell indicated with the
field "carrier" above. The CSI-ResourceConfig indicated here contains only NZP-
CSI-RS resources and/or SSB resources. This CSI-ReportConfig is associated with
the DL BWP indicated by bwp-Id in that CSI-ResourceConfig.
subbandSize
Indicates one out of two possible BWP-dependent values for the subband size
as indicated in TS 38.214, table 5.2.1.4-2. If csi-ReportingBand is absent, the UE
shall ignore this field.
timeRestrictionForChannelMeasurements
Time domain measurement restriction for the channel (signal) measurements
(see TS 38.214, clause 5.2.1.1)
timeRestrictionForInterferenceMeasurements
Time domain measurement restriction for interference measurements (see TS
38.214, clause 5.2.1.1)

TABLE 28

CSI-ResourceConfig
The IE CSI-ResourceConfig defines a group of one or more NZP-CSI-RS-
ResourceSet, CSI-IM-ResourceSet and/or CSI-SSB-ResourceSet.
  CSI-ResourceConfig information element
-- ASN1 START
-- TAG-CSI-RESOURCECONFIG-START
CSI-ResourceConfig ::=         SEQUENCE {
   csi-ResourceConfigId        CSI-ResourceConfigId,
   csi-RS-ResourceSetList      CHOICE {

TABLE 28-continued

```
        nzp-CSI-RS-SSB                      SEQUENCE {
            nzp-CSI-RS-ResourceSetList    SEQUENCE (SIZE (1..maxNrofNZP-
CSI-RS-ResourceSetsPerConfig)) OF NZP-CSI-RS-ResourceSetId
OPTIONAL, -- Need R
            csi-SSB-ResourceSetList              SEQUENCE (SIZE (1..maxNrofCSI-SSB-
ResourceSetsPerConfig)) OF CSI-SSB-ResourceSetId
OPTIONAL -- Need R
        },
            csi-IM-ResourceSetList              SEQUENCE (SIZE (1..maxNrofCSI-IM-
ResourceSetsPerConfig)) OF CSI-IM-ResourceSetId
        },
        bwp-Id                     BWP-Id,
        resourceType               ENUMERATED { aperiodic, semiPersistent, periodic
},
        ...
    }
    -- TAG-CSI-RESOURCECONFIG-STOP
    -- ASN1STOP
```

CSI-ResourceConfig field descriptions
bwp-Id
The DL BWP which the CSI-RS associated with this CSI-ResourceConfig are
located in (see TS 38.214, clause 5.2.1.2
csi-ResourceConfigId
Used in CSI-ReportConfig to refer to an instance of CSI-ResourceConfig
csi-RS-ResourceSetList
Contains up to maxNrofNZP-CSI-RS-ResourceSetsPerConfig resource sets
if ResourceConfigType is 'aperiodic' and 1 otherwise (see TS 38.214, clause 5.2.1.2)
csi-SSB-ResourceSetList
List of SSB resources used for beam measurement and reporting in a resource
set (see TS 38.214, section FFS_Section)
resourceType
Time domain behavior of resource configuration (see TS 38.214, clause
5.2.1.2). It does not apply to resources provided in the csi-SSB-ResourceSetList.

TABLE 29

```
    NZP-CSI-RS-ResourceSet
    The IE NZP-CSI-RS-ResourceSet is a set of Non-Zero-Power (NZP) CSI-RS
resources (their IDs) and set-specific parameters.
    NZP-CSI-RS-ResourceSet information element
        -- ASN1START
        -- TAG-NZP-CSI-RS-RESOURCESET-START
    NZP-CSI-RS-ResourceSet ::=         SEQUENCE {
        nzp-CSI-ResourceSetId         NZP-CSI-RS-ResourceSetId,
        nzp-CSI-RS-Resources          SEQUENCE (SIZE (1..maxNrofNZP-CSI-
RS-ResourcesPerSet)) OF NZP-CSI-RS-ResourceId,
        repetition                    ENUMERATED { on, off }
OPTIONAL, -- Need S
        aperiodicTriggeringOffset         INTEGER(0..6)
OPTIONAL, -- Need S
        trs-Info                      ENUMERATED {true}
OPTIONAL, -- Need R
        ...
    }
    -- TAG-NZP-CSI-RS-RESOURCESET-STOP
    -- ASN1STOP
```

NZP-CSI-RS-ResourceSet field descriptions
aperiodicTriggeringOffset
Offset X between the slot containing the DCI that triggers a set of aperiodic
NZP CSI-RS resources and the slot in which the CSI-RS resource set is transmitted.
The value 0 corresponds to 0 slots, value 1 corresponds to 1 slot, value 2
corresponds to 2 slots, value 3 corresponds to 3 slots, value 4 corresponds to 4 slots,
value 5 corresponds to 16 slots, value 6 corresponds to 24 slots. When the field is
absent the UE applies the value 0.
nzp-CSI-RS-Resources
NZP-CSI-RS-Resources associated with this NZP-CSI-RS resource set (see
TS 38.214, clause 5.2). For CSI, there are at most 8 NZP CSI RS resources per
resource set
repetition
Indicates whether repetition is on/off. If the field is set to 'OFF' or if the field
is absent, the UE may not assume that the NZP-CSI-RS resources within the
resource set are transmitted with the same downlink spatial domain transmission
filter and with same NrofPorts in every symbol (see TS 38.214, clauses 5.2.2.3.1
and 5.1.6.1.2). Can only be configured for CSI-RS resource sets which are TABLE 29-continued associated with CSI-ReportConfig with report of L1 RSRP or "no report"
trs-Info
Indicates that the antenna port for all NZP-CSI-RS resources in the CSI-RS
resource set is same. If the field is absent or released the UE applies the value
"false" (see TS 38.214, clause 5.2.2.3.1).

TABLE 30

CSI-SSB-ResourceSet
  The IE CSI-SSB-ResourceSet is used to configure one SS/PBCH block
resource set which refers to SS/PBCH as indicated in ServingCellConfigCommon.
  CSI-SSB-ResourceSet information element
  -- ASN1START
  -- TAG-CSI-SSB-RESOURCESET-START
  CSI-SSB-ResourceSet ::=          SEQUENCE {
      csi-SSB-ResourceSetId         CSI-SSB-ResourceSetId,
      csi-SSB-ResourceList          SEQUENCE (SIZE(1..maxNrofCSI-SSB-
ResourcePerSet)) OF SSB-Index,
      ...
  }
  -- TAG-CSI-SSB-RESOURCESET-STOP
  -- ASN1STOP

TABLE 31

CSI-IM-ResourceSet
  The IE CSI-IM-ResourceSet is used to configure a set of one or more CSI
Interference Management (IM) resources (their IDs) and set-specific parameters.
  CSI-IM-ResourceSet information element
  -- ASN1START
  -- TAG-CSI-IM-RESOURCESET-START
  CSI-IM-ResourceSet ::=           SEQUENCE {
      csi-IM-ResourceSetId          CSI-IM-ResourceSetId,
      csi-IM-Resources              SEQUENCE (SIZE(1..maxNrofCSI-IM-
ResourcesPerSet)) OF CSI-IM-ResourceId,
      ...
  }
  -- TAG-CSI-IM-RESOURCESET-STOP
  -- ASN1STOP CSI-IM-ResourceSet field descriptions
csi-IM-Resources
CSI-IM-Resources associated with this CSI-IM-ResourceSet (see TS
38.214, clause 5.2)

TABLE 32

CSI-AperiodicTriggerStateList
  The CSI-AperiodicTriggerStateList IE is used to configure the UE with a list
of aperiodic trigger states. Each codepoint of the DCI field "CSI request" is associated
with one trigger state. Upon reception of the value associated with a trigger state, the
UE will perform measurement of CSI-RS (reference signals) and aperiodic reporting
on L1 according to all entries in the associatedReportConfigInfoList for that trigger
state.
  CSI-AperiodicTriggerStateList information element
  -- ASN1START
  -- TAG-CSI-APERIODICTRIGGERSTATELIST-START
  CSI-AperiodicTriggerStateList ::=            SEQUENCE (SIZE (1..maxNrOfCSI-
AperiodicTriggers)) OF CSI-AperiodicTriggerState
  CSI-AperiodicTriggerState ::=                SEQUENCE {
      associatedReportConfigInfoList                    SEQUENCE
(SIZE(1..maxNrofReportConfigPerAperiodicTrigger)) OF CSI-
AssociatedReportConfigInfo,
      ...
  }
  CSI-AssociatedReportConfigInfo ::=              SEQUENCE {
      reportConfigId                CSI-ReportConfigId,
      resourcesForChannel              CHOICE {
        nzp-CSI-RS                     SEQUENCE {

TABLE 32-continued

```
        resourceSet                        INTEGER (1..maxNrofNZP-CSI-RS-
ResourceSetsPerConfig),
        qcl-info                           SEQUENCE (SIZE(1..maxNrofAP-CSI-RS-
ResourcesPerSet)) OF TCI-StateId OPTIONAL -- Cond Aperiodic
    },
        csi-SSB-ResourceSet                              INTEGER (1..maxNrofCSI-SSB-
ResourceSetsPerConfig)
    },
    csi-IM-ResourcesForInterference                      INTEGER(1..maxNrofCSI-IM-
ResourceSetsPerConfig)        OPTIONAL, -- Cond CSI-IM-ForInterference
    nzp-CSI-RS-ResourcesForInterference INTEGER (1..maxNrofNZP-CSI-
RS-ResourceSetsPerConfig)     OPTIONAL, -- CondNZP-CSI-RS-ForInterference
    ...
}
-- TAG-CSI-APERIODICTRIGGERSTATELIST-STOP
-- ASN1STOP
```

CSI-AssociatedReportConfigInfo field descriptions
csi-IM-ResourcesForInterference
CSI-IM-ResourceSet for interference measurement. Entry number in csi-
IM-ResourceSetList in the CSI-ResourceConfig indicated by csi-IM-
ResourcesForInterference in the CSI-ReportConfig indicated by reportConfigId
above (1 corresponds to the first entry, 2 to the second entry, and so on). The
indicated CSI-IM-ResourceSet should have exactly the same number of resources
like the NZP-CSI-RS-ResourceSet indicated in nzp-CSI-RS-ResourcesforChannel.
csi-SSB-ResourceSet
CSI-SSB-ResourceSet for channel measurements. Entry number in csi-SSB-
ResourceSetList in the CSI-ResourceConfig indicated by
resourcesForChannelMeasurement in the CSI-ReportConfig indicated by
reportConfigId above (1 corresponds to the first entry, 2 to the second entry, and so
on).
nzp-CSI-RS-ResourcesForInterference
NZP-CSI-RS-ResourceSet for interference measurement. Entry number in
nzp-CSI-RS-ResourceSetList in the CSI-ResourceConfig indicated by nzp-CSI-
RS-ResourcesForInterference in the CSI-ReportConfig indicated by
reportConfigId above (1 corresponds to the first entry, 2 to the second entry, and so
on).
qcl-info
List of references to TCI-States for providing the QCL source and QCL type
for each NZP-CSI-RS-Resource listed in nzp-CSI-RS-Resources of the NZP-CSI-
RS-ResourceSet indicated by nzp-CSI-RS-ResourcesforChannel. Each TCI-
StateId refers to the TCI-State which has this value for tci-StateId and is defined in
tci-StatesToAddModList in the PDSCH-Config included in the BWP-Downlink
corresponding to the serving cell and to the DL BWP to which the
resourcesForChannelMeasurement (in the CSI-ReportConfig indicated by
reportConfigId above) belong to. First entry in qcl-info-forChannel corresponds to
first entry in nzp-CSI-RS-Resources of that NZP-CSI-RS-ResourceSet, second
entry in qcl-info-forChannel corresponds to second entry in nzp-CSI-RS-
Resources, and so on (see TS 38.214, clause 5.2.1.5.1)
reportConfigId
The reportConfigId of one of the CSI-ReportConfigToAddMod configured
in CSI-MeasConfig
resourceSet
NZP-CSI-RS-ResourceSet for channel measurements. Entry number in nzp-
CSI-RS-ResourceSetList in the CSI-ResourceConfig indicated by
resourcesForChannelMeasurement in the CSI-ReportConfig indicated by
reportConfigId above (1 corresponds to the first entry, 2 to the second entiy, and so
on).

| Conditional Presence | Explanation |
| --- | --- |
| Aperiodic | The field is mandatory present if the NZP-CSI-RS-Resources in the associated resourceSet have the resourceType aperiodic. The field is absent otherwise. |
| CSI-IM-ForInterference | This field is optional need M if the CSI-ReportConfig identified by reportConfigId is configured with csi-IM-ResourcesForInterference; otherwise it is absent. |
| NZP-CSI-RS-ForInterference | This field is optional need M if the CSI-ReportConfig identified by reportConfigId is configured with nzp-CSI-RS-ResourcesForInterference; otherwise it is absent. |

TABLE 33

CSI-SemiPersistentOnPUSCH-TriggerStateList
   The CSI-SemiPersistentOnPUSCH-TriggerStateList IE is used to configure the UE with list of trigger states for semi-persistent reporting of channel state information on L1. See also TS 38.214, clause 5.2.
   CSI-SemiPersistentOnPUSCH-TriggerStateList information element
   -- ASN1START
   --   TAG-CSI-SEMIPERSISTENTONPUSCHTRIGGERSTATELIST-START
   CSI-SemiPersistentOnPUSCH-TriggerStateList ::=         SEQUENCE(SIZE (1..maxNrOfSemiPersistentPUSCH-Triggers)) OF CSI-SemiPersistentOnPUSCH-TriggerState
     CSI-SemiPersistentOnPUSCH-TriggerState ::=        SEQUENCE {
       associatedReportConfigInfo                    CSI-ReportConfigId,
       ...
   }
   --   TAG-CSI-SEMIPERSISTENTONPUSCHTRIGGERSTATELIST-STOP
   -- ASN1STOP With respect to the aforementioned CSI report configuration (CSI-ReportConfig), each report configuration CSI-ReportConfig is associated with one or more CSI resource configurations, that is, CSI-ResourceConfig. The correlation between the CSI report configuration and the CSI resource configuration may be indicated by the following parameters in CSI-ReportConfig.

carrier: indicates a cell/component carrier (CC) to which the CSI resource configuration associated with the CSI report configuration belongs resourcesForChannelMeasurement: indicates CSI resource configuration for channel measurement related to CSI reporting configuration csi-IM-ResourcesForinterference: indicates a CSI resource configuration consisting of a CSI-IM resource for interference measurement associated with a CSI report configuration nzp-CSI-RS-ResourcesForinterference: indicates a CSI resource configuration consisting of a CSI-RS resource for interference measurement associated with a CSI report configuration The terminal performs CSI reporting, based on the channel state information measured by the CSI-RS or CSI-IM resource in the associated CSI resource configuration according to the above relationship.

As a time domain reporting operation for each report configuration CSI-ReportConfig, 'Aperiodic', 'Semi-Persistent', and 'Periodic' methods are supported, and this may be configured from the base station to the terminal by the reportConfigType parameter configured from the upper layer. The type of uplink resource to which the CSI report is transmitted is determined according to the time domain reporting operation. The aperiodic CSI reporting of the terminal is performed using PUSCH, the periodic CSI reporting is performed using PUCCH, and the 'PUCCH-based semi-persistent (semi-PersistentOnPUCCH)' or 'PUSCH-based semi-persistent (semi-PersistentOnPUSCH)' report is supported for semi-persistent CSI reporting. When the semi-persistent CSI reporting is triggered or activated by DCI, the report is performed using PUSCH, and when activated by a MAC control element (MAC CE), the report is performed using the PUCCH. In the case of the periodic or semi-permanent CSI reporting method, the terminal may receive a PUCCH or PUSCH resource for transmitting CSI from the base station through higher layer signaling. A period and a slot offset of a PUCCH or PUSCH resource to transmit CSI may be given based on the numerology of an uplink (UL) partial bandwidth configured to transmit a CSI report. In the case of the aperiodic CSI reporting method, the terminal may be scheduled with a PUSCH resource for transmitting CSI from the base station through L1 signaling (DCI, for example, DCI format 0_1 described above).

With respect to the above-described CSI resource configuration (CSI-ResourceConfig), each CSI resource configuration CSI-ReportConfig may include S ($\geq 1$) CSI resource sets (configured as a higher layer parameter csi-RS-ResourceSetList). The CSI resource set list may be composed of a non-zero power (NZP) CSI-RS resource set and an SS/PBCH block set, or may be composed of a CSI-interference measurement (CSI-IM) resource set. Each CSI resource configuration may be located in a downlink (DL) partial bandwidth identified by a higher layer parameter bwp-id. The time domain operation of the CSI-RS resource in the CSI resource configuration may be configured to one of 'aperiodic' CSI resource configuration, 'periodic' CSI resource configuration, or 'semi-permanent' CSI resource configuration from a higher layer parameter resourceType. For the periodic or semi-permanent CSI resource configuration, the number of CSI-RS resource sets may be limited to S=1 and the configured period and slot offset may be given based on the numerology of the downlink partial bandwidth identified by bwp-id.

There is a restriction on mutual time domain operation between the CSI report configuration and the CSI resource configuration associated therewith. For example, an aperiodically configured CSI resource configuration cannot be associated with a periodically configured CSI reporting configuration. The combination between the supported CSI reporting configuration and the CSI resource configuration may be based on the following Table 34.

TABLE 34

Triggering/Activation of CSI Reporting for the possible CSI-RS Configurations.

| CSI-RS Configuration | Periodic CSI Reporting | Semi-Persistent CSI Reporting | Aperiodic CSI Reporting |
|---|---|---|---|
| Periodic CSI-RS | No dynamic triggering/ activation | For reporting on PUCCH, the UE receives an activation command (TS 38.321); for reporting on PUSCH, the UE | Triggered by DCI; additionally, activation command (TS 38.321) possible as defined in Subclause 5.2.1.5.1. |

TABLE 34-continued

Triggering/Activation of CSI Reporting
for the possible CSI-RS Configurations.

| CSI-RS Configuration | Periodic CSI Reporting | Semi-Persistent CSI Reporting | Aperiodic CSI Reporting |
|---|---|---|---|
| Semi-Persistent CSI-RS | Not Supported | receives triggering on DCI For reporting on PUCCH, the UE receives an activation command (TS 38.321); for reporting on PUSCH, the UE receives triggering on DCI | Triggered by DCI; additionally, activation command (TS 38.321) possible as defined in Subclause 5.2.1.5.1. |
| Aperiodic CSI-RS | Not Supported | Not Supported | Triggered by DCI; additionally, activation command (TS 38.321) possible as defined in Subclause 5.2.1.5.1. |

The aperiodic CSI report may be triggered by the "CSI request" indicator field of the aforementioned DCI format 0_1 or 0_2 corresponding to the scheduling DCI for the PUSCH. The terminal may monitor the PDCCH, obtain control information conforming to DCI format 0_1 or 0_2, and obtain scheduling information for PUSCH and a CSI request indicator from the control information. The CSI request indicator may be configured to $N_{TS}$ (=0, 1, 2, 3, 4, 5, or 6) bits, and the number of bits of the CSI request indicator may be determined by higher layer signaling (reportTriggerSize). The CSI request indicator field is mapped to one trigger state, and the mapping between the indicator field and the trigger state is indicated by a higher layer parameter CSI-AperiodicTriggerStateList. Each trigger state may indicate one aperiodic CSI report configuration and one CSI resource set in the CSI resource configuration associated therewith. The purpose of indicating the CSI resource set is to indicate which CSI resource set among them if the number of two or more CSI resource sets is included in the CSI resource configuration on which CSI report is to be performed.

Meanwhile, the number of fields of the CSI request indicator and the number of trigger states of the higher layer parameter CSI-AperiodicTriggerStateList may be inconsistent. The interpretation of the CSI request indicator for this may be as follows.

When the CSI request indicator indicates 0 (all bit values are 0), it may mean that no CSI report is requested.
If the number (M) of CSI trigger states in the configured CSI-AperiodicTriggerStateList is greater than $2^{N_{TS}}-1$, according to a predefined mapping relationship, M CSI trigger states may be mapped to $2^{N_{TS}}-1$, and one of the trigger states of $2^{N_{TS}}-1$ may be indicated by the CSI request field.
If the number (M) of CSI trigger states in the configured CSI-AperiodicTriggerStateList is less than or equal to $2^{N_{TS}}-1$, one of the M CSI trigger states may be indicated by the CSI request field.

The following Table 35 shows an example of a relationship between a CSI request indicator and a CSI trigger state that may be indicated by the corresponding indicator.

TABLE 35

| CSI request field | CSI trigger state | CSI-ReportConfigId | CSI-ResourceConfigId |
|---|---|---|---|
| 00 | no CSI request | N/A | N/A |
| 01 | CSI trigger state#1 | CSI report#1 CSI report#2 | CSI resource#1, CSI resource#2 |
| 10 | CSI trigger state#2 | CSI report#3 | CSI resource#3 |
| 11 | CSI trigger state#3 | CSI report#4 | CSI resource#4 |

The terminal may perform measurement on the CSI resource in the CSI trigger state triggered by the CSI request field, and from this, the terminal may generate CSI (including at least one of the aforementioned CQI, PMI, CRI, SSBRI, LI, RI, or L1-RSRP). The terminal may transmit the obtained CSI using the PUSCH scheduled by the corresponding DCI format 0_1. When one bit corresponding to an uplink data indicator (UL-SCH indicator) in DCI format 0_1 indicates "1", and uplink data (UL-SCH) and acquired CSI may be multiplexed and transmitted on a PUSCH resource scheduled by DCI format 0_1. When one bit corresponding to the uplink data indicator (UL-SCH indicator) in DCI format 0_1 indicates "0", only CSI without uplink data (UL-SCH) may be mapped to a PUSCH resource scheduled by DCI format 0_1 and transmitted.

Figure 10:
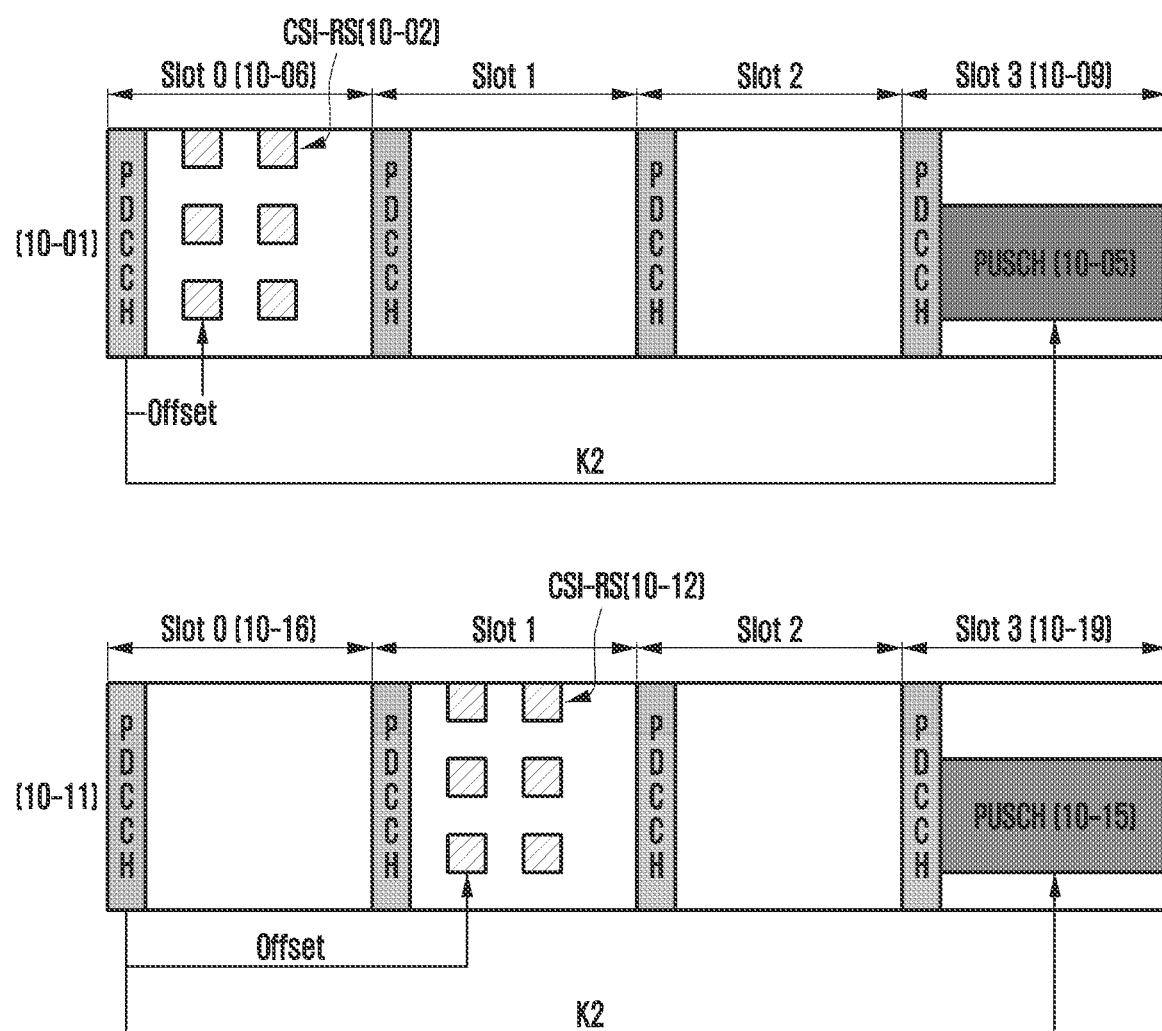
FIG. 10 is a diagram for explaining an example of CSI-RS configuration according to an embodiment of the disclosure.

FIG. 10 is a diagram illustrating an example of an aperiodic CSI reporting method in a wireless communication system according to an embodiment of the disclosure.

Referring to FIG. 10, the terminal may monitor PDCCH 10-01 to obtain DCI format 0_1 or 0_2 and may obtain scheduling information and CSI request information for the PUSCH 10-05 therefrom. The terminal may obtain resource information on the CSI-RS 10-02 to be measured from the received CSI request indicator. The terminal may determine at which point in time the terminal should perform measurement on the transmitted CSI-RS 10-02 resource, based on the time when DCI format 0_1 or 0_2 is received and the parameter (aperiodicTriggeringOffset) for the offset in the CSI resource set configuration (e.g., NZP CSI-RS resource set configuration (NZP-CSI-RS-ResourceSet)). More specifically, the terminal may receive the offset value X of the parameter aperiodicTriggeringOffset in the NZP-CSI-RS resource set configuration by higher layer signaling from the base station, and the configured offset value X may mean an offset between a slot in which a DCI triggering aperiodic CSI report is received and a slot in which a CSI-RS resource is transmitted. For example, the aperiodicTriggeringOffset parameter value and the offset value X may have a mapping relationship described in Table 36 below.

TABLE 36

| aperiodicTriggeringOffset | Offset X |
|---|---|
| 0 | 0 slot |
| 1 | 1 slot |
| 2 | 2 slots |
| 3 | 3 slots |
| 4 | 4 slots |
| 5 | 16 slots |
| 6 | 24 slots |

An example of FIG. 10 shows an example in which the above-described offset value is configured as X=0. In this case, the terminal may receive the CSI-RS 10-02 in the slot (corresponding to slot 0 of FIG. 11) in which DCI format 0_1 triggering aperiodic CSI reporting is received, and may report the CSI information measured by the received CSI- RS to the base station through the PUSCH 10-05. The terminal may obtain scheduling information (information corresponding to each field of DCI format 0_1) for the PUSCH 10-05 for CSI reporting from DCI format 0_1. For example, in DCI format 0_1, the terminal may obtain information on a slot in which to transmit the PUSCH 10-05 from the time domain resource allocation information for the PUSCH 10-05. In an example of FIG. 11, the terminal obtains a K2 value corresponding to a slot offset value for PDCCH-to-PUSCH as 3, and accordingly, the terminal may transmit the PUSCH 10-05 at slot 3 (10-09) three slots away from the slot 0 (10-06), at which the PUSCH 10-05 receives the PDCCH 10-01.

In another example of FIG. 10, the terminal may obtain the DCI format 0_1 by monitoring the PDCCH 10-11, and may obtain scheduling information and CSI request information for the PUSCH 10-15 therefrom. The terminal may obtain resource information on the CSI-RS 11-12 to be measured from the received CSI request indicator. An example of FIG. 10 shows an example in which the offset value for the aforementioned CSI-RS is set to X=1. In this case, the terminal may receive the CSI-RS 10-12 in the slot (corresponding to the slot 0 (10-16) of FIG. 10) in which the DCI format 0_1 triggering the aperiodic CSI report is received, and may report the CSI information measured by the received CSI-RS to the base station through the PUSCH 10-15 at slot 3 (10-19).

In an NR system, a tracking RS (i.e., TRS) may be configured for fine time/frequency tracking of the base station. The TRS may be referred to as other terms such as CSI-RS for tracking in the specification, but in this specification, the TRS will be referred to as TRS for convenience of description. The TRS may be transmitted in one (X=1) or two (X=2) consecutive slots with a specific period such as 10 ms or 20 ms, and this is called TRS burst.

Figure 11:
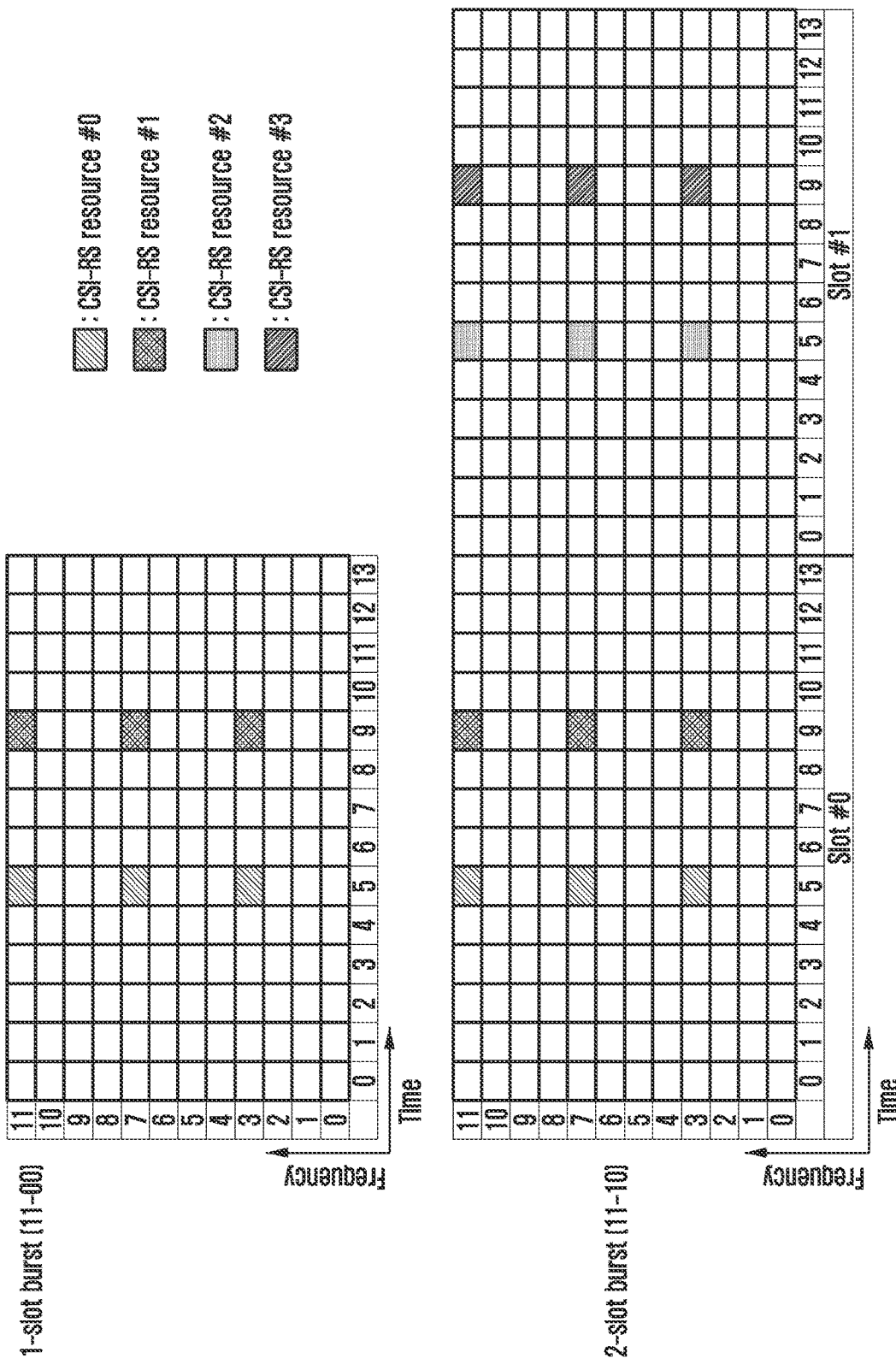
FIG. 11 is a diagram illustrating an example of an aperiodic CSI reporting method according to an embodiment of the disclosure.

FIG. 11 illustrates an RE pattern of a TRS according to an embodiment of the disclosure.

Referring to FIG. 11, it is a diagram illustrating examples of possible TRS patterns within one slot 11-00. As shown in FIG. 11, the TRS may be configured with a plurality of single port CSI-RS resources having a frequency RE density of 3 RE/RB, and the number of CSI-RS resources that can be located in one slot may be two. According to some embodiments, in the frequency band of 6 GHz or less referred to as frequency range 1 (FR1), TRS may be transmitted over two consecutive slots 11-10, that is, X=2, and a symbol pair in which the CSI-RS resource can be located within each slot may be one of [{5th, 9th}, {6th, lath}, {7th, 11th}]. That is, one TRS transmission may consist of four CSI-RS resources spanning two consecutive slots.

In a frequency band of 6 GHz or higher, referred to as frequency range 2 (FR2), in addition to the TRS burst structure of FR1, a TRS transmission structure composed of two CSI-RS resources, that is, X=1, may be used. At this time, the symbol pairs in which the CSI-RS resource in the slot can be located may be [{1st, 5th}, {2nd, 6th}, {3rd, 7th}, {4th, 8th}, {5th, 9th}, {6th, lath}, {7th, 11th}, {8th, 12th}, {9th, 13th}, {10th, 14th}]. It should be noted that the OFDM symbol position in FIG. 11 is an example of TRS configuration, and the actual transmission position may be changed according to base station transmission.

Figure 12:
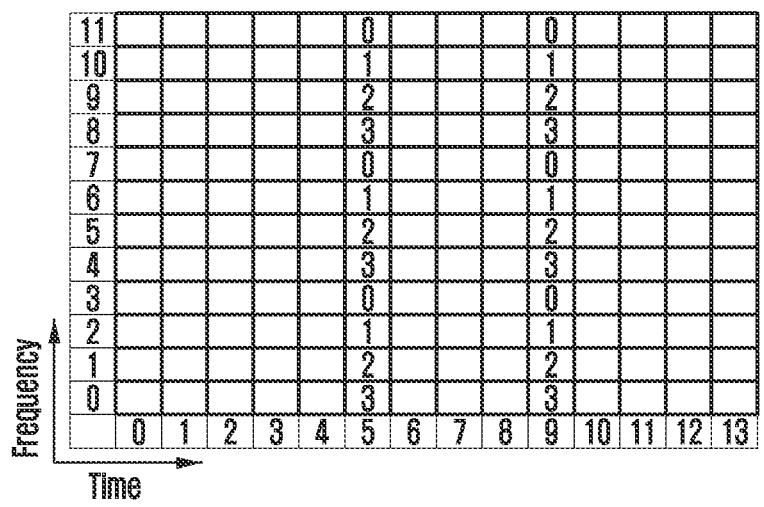
FIG. 12 is a diagram illustrating examples of various operation scenarios of SRS according to an embodiment of the disclosure.

FIG. 12 illustrates a single port CSI-RS configuration according to an embodiment of the disclosure.

Referring to FIG. 12, it illustrates an example of a single port CSI-RS configuration for covering the TRS RE pattern of FIG. 11. The base station may configure one CSI resource set in one CSI resource configuration and configure up to four CSI-RS resources therein. In this case, the frequency density of the CSI-RS is configured to 3 RE/RB/port. If X=1 TRS burst is used, the base station configures CSI-RS resources #0 and #1. If X=2 TRS burst, the base station configures all of CSI-RS resources #0, #1, #2, #3. If X=1 or X=2 TRS burst, the terminal may assume the same antenna port having the same port index for the CSI-RS resources configured in one resource set, and based on this, continuous time/frequency tracking may be performed. When the base station uses CSI-RS resources in one CSI resource set as TRS, the trs-Info parameter in the CSI resource set may be configured to 'true'. In this case, since the CSI reporting is not required for the CSI-RS resource used as the TRS, by making the reporting configuration (CSI-ReportConfig) corresponding to the CSI resource set not to be configured (that is, there is no reporting setting referring to the CSI-RS resource), or the setting value of the report configuration to be 'none', it is possible to ensure that the terminal uses the corresponding CSI-RS resources for time/frequency tracking and does not need to generate a CSI report.

In FIG. 12, the subcarrier position and OFDM symbol position of 1-port CSI-RS resources may be appropriately changed according to the TRS subcarrier position of FIG. 11.

The TRS may be transmitted in various forms, such as a periodic TRS, an aperiodic TRS, or the like. In the case of periodic TRS (P-TRS), the TRS is transmitted periodically until RRC reconfiguration according to the RRC set period and slot offset value, and in the case of aperiodic TRS (A-TRS), the TRS is triggered and transmitted by MAC CE or DCI without configuring a period or slot offset value. In this case, the timing of A-TRS triggering and A-TRS transmission may have an offset configured by a higher layer or follow a predetermined value (e.g., so that A-TRS is transmitted in the same slot as A-TRS triggering).

In the case of an aperiodic TRS (A-TRS), since it may be difficult to measure the statistical characteristics of the channel due to insufficient number of time-domain REs, the aperiodic TRS may be associated with the periodic TRS. The connection between the A-TRS and the P-TRS may be supported through various methods such as quasi co-location (QCL). For example, it is possible for the base station to configure at least one P-TRS in the A-TRS as a QCL reference RS to extract channel statistics values such as delay spread, average delay, Doppler spread, and Doppler shift (QCL type A), or to extract spatial parameters such as TX beam and RX beam (QCL type D).

In addition, the TRS is allocated with bandwidth information from the higher layer parameter freqBand. If the bandwidth of the BWP through which the TRS is transmitted is smaller than 52 RB, the bandwidth of the TRS is the same as the bandwidth of the BWP, and if the bandwidth of the BWP through which the corresponding TRS is transmitted is greater than or equal to 52 RB, the bandwidth of the TRS is configured to 52 RB.

Next, a sounding reference signal (SRS) for uplink channel measurement will be described in detail. The base station may indicate the terminal to transmit SRS for uplink channel measurement, and the terminal may transmit the SRS according to the indication.

Figure 13:
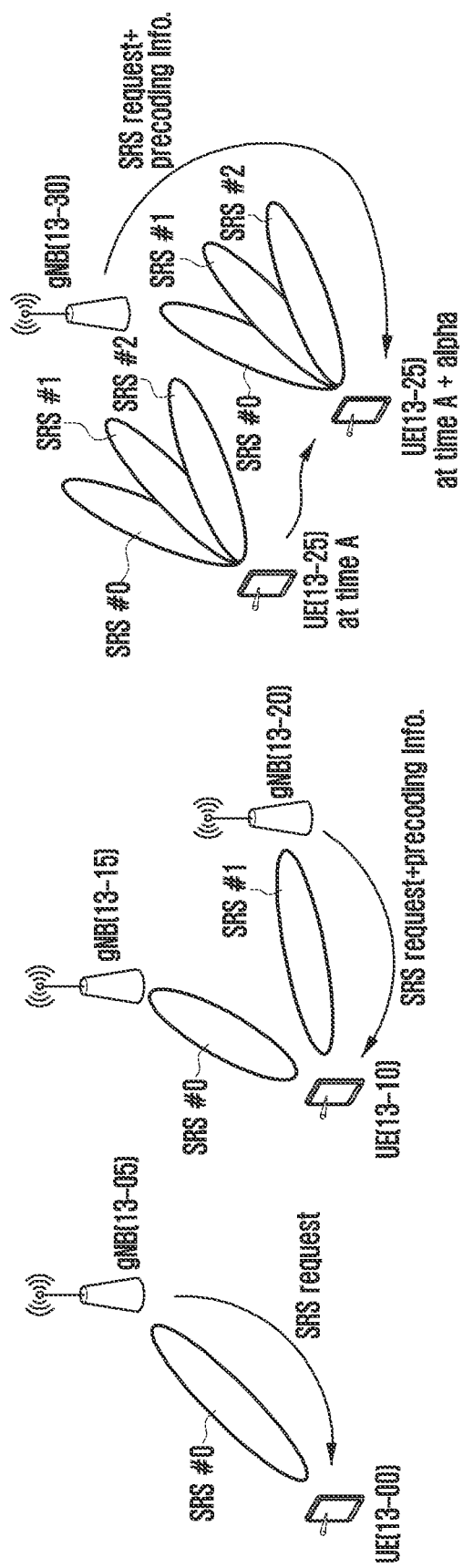
FIG. 13 is a diagram illustrating an uplink transmission structure of a 5G or NR system according to an embodiment of the disclosure.

FIG. 13 is a diagram illustrating examples of various operation scenarios of SRS according to an embodiment of the disclosure.

Referring to FIG. 13, it is possible to consider at least the following three SRS operation scenarios in an NR system.

1) A base station 13-05 configures a beam in one direction to a terminal 13-00 (in this specification, configuring beam/precoding in one direction does not apply beam/precoding or applying a wide beam (cell-coverage or sector coverage)), and the terminal 13-00 transmits the SRS according to the transmission period and offset of the SRS in the case of periodic SRS or semi-persistent SRS and according to the SRS request of the base station in the case of aperiodic SRS (at a predetermined time after the SRS request). In this case, additional information for beam/precoding is not required for the SRSs.

2) The base stations 13-15 and 13-20 may configure beams in one or more directions to the terminal 13-10, and the terminal 13-10 may transmit a plurality of SRS beamformed in the one or more directions. For example, as in the example of FIG. 11, it is possible to configure the SRS resource (or port) #0 to be beamformed to the base station 13-15 and the SRS resource (or port) #1 to be beamformed to the base station 13-20. In this case, the base stations 13-15 and 13-20 need to inform not only the SRS request but also the SRS beam/precoding information, unlike the method 1).

3) The base station 13-30 may configure beams in one or more directions to the terminal 13-25, and the terminal 13-25 may transmit a plurality of SRS beamformed in the one or more directions. For example, as in the example of FIG. 13, the base station may configure the terminal to transmit SRS by applying different beams/precodings to SRS resource (or port) #0, SRS resource (or port) #1, and SRS resource (or port) #2. Through this, even when the mobility of the terminal is high, stable communication can be performed through beam/precoder diversity. For example, the terminal 13-25 may provide channel state information to the base station 13-30 with SRS #2 at the time of time A, and may provide channel state information to the base station 13-30 through SRS #0 at time A+alpha. In this case, the base station 13-30 needs to inform not only the SRS request but also the SRS beam/precoding information, unlike the method 1).

Although the above descriptions are based on SRS transmission, similarly, it is possible to extend to other UL channels such as PRACH, PUSCH, PUCCH, and/or RS transmission, and detailed descriptions of all cases are omitted so as not to obscure the gist of the disclosure.

Figure 14:
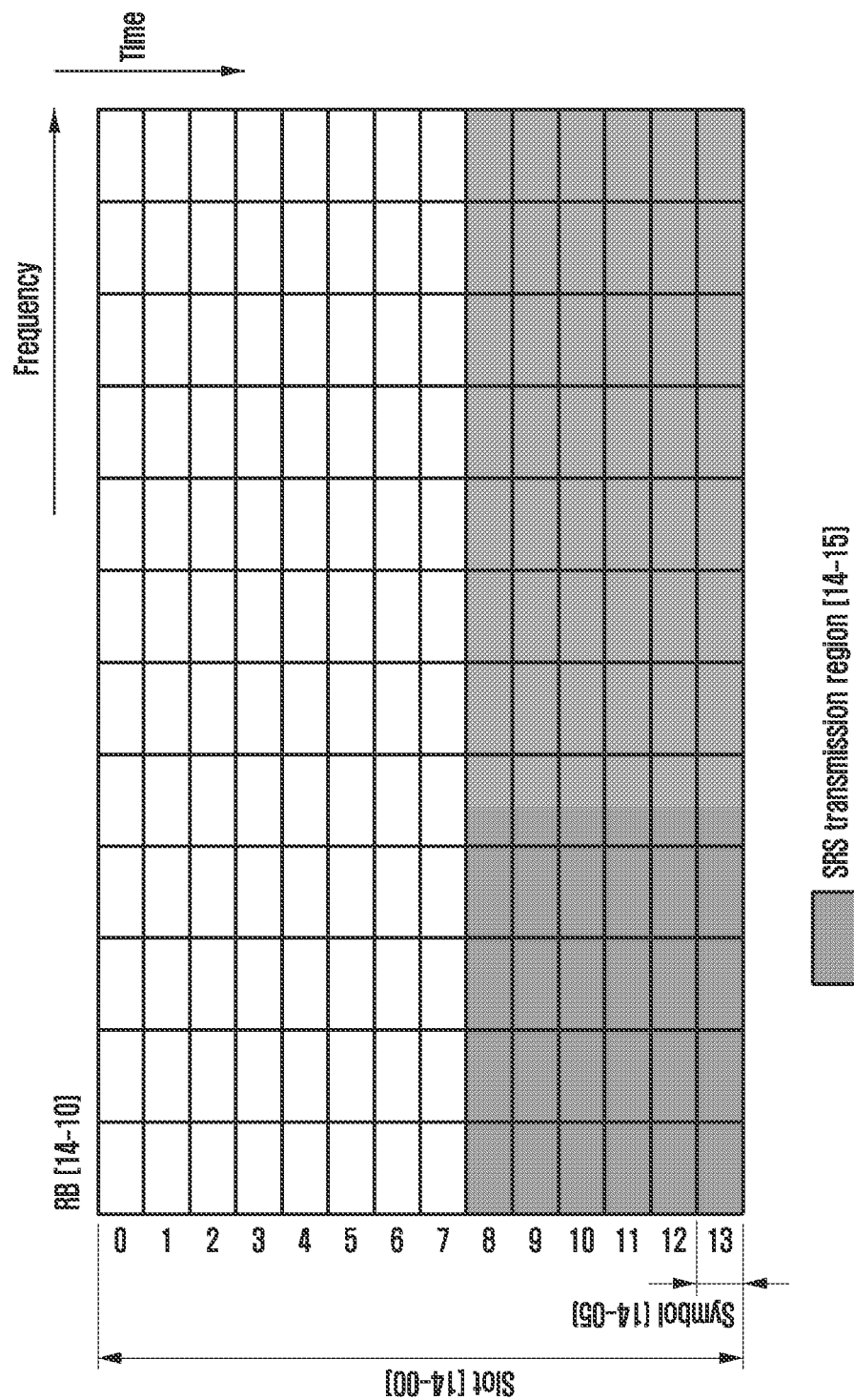
FIG. 14 is a diagram illustrating a structure in which SRS is allocated for each sub-band according to an embodiment of the disclosure.

FIG. 14 is a diagram illustrating an uplink transmission structure of a wireless communication system according to an embodiment of the disclosure.

Referring to FIG. 14, the transmission basic unit of the 5G or NR system is a slot (14-00). Assuming a general CP (Cyclic Prefix) length, each slot may consist of 14 symbols 14-05, and one symbol may correspond to one UL waveform (CP-OFDM or DFT-S-OFDM) symbol.

A resource block (RB) 14-10 is a resource allocation unit corresponding to one slot based on the time domain, and may consist of 12 subcarriers based on the frequency domain.

The uplink structure may be largely divided into a data region and a control region. Unlike the LTE system, in the 5G or NR system, the control region may be configured and transmitted at an arbitrary position in the uplink. Here, the data region includes a series of communication resources including data such as voice and packets transmitted to each terminal, and corresponds to the remaining resources except for the control region in the subframe. The control region includes a series of communication resources for a downlink channel quality report from each terminal, reception ACK/NACK for a downlink signal, an uplink scheduling request, or the like.

The terminal may simultaneously transmit its own data and control information in the data region and the control region. According to an embodiment, a symbol for which the terminal can periodically transmit SRS within one slot may be the last six symbol periods 14-15, and may be transmitted through a preset SRS transmission band within the UL BWP based on the frequency domain. However, this is an example, and a symbol capable of transmitting the SRS may be extended to another time interval or transmitted through a frequency band. The RBs capable of transmitting SRS may be transmitted in multiples of 4 RBs when transmitted in the frequency domain and may be transmitted in a maximum of 272 RBs.

In addition, according to an embodiment, the number of symbols N of the SRS may be configured to 1, 2, or 4, and may be transmitted as consecutive symbols. In addition, the 5G or NR systems allows repeated transmission of SRS symbols. Specifically, the repetition factor (r) of the SRS symbol may be $r \in \{1,2,4\}$, and may be configured to $r \leq N$. For example, when one SRS antenna is mapped to one symbol and transmitted, up to 4 symbols may be repeatedly transmitted. Meanwhile, four different antenna ports may be transmitted in four different symbols. In this case, since each antenna port is mapped to one symbol, repeated transmission of the SRS symbol is not allowed. The above-described example is only an example, and the number of symbols N and the repetition factor r of the SRS may be extended to other values.

The SRS may be configured with a constant amplitude zero auto correlation (CAZAC) sequence. In addition, the CAZAC sequences constituting each SRS transmitted from several terminals have different cyclic shift values. In addition, the CAZAC sequences generated through cyclic shift in one CAZAC sequence have a characteristic of having a correlation value of zero with sequences having a cyclic shift value different from that of each CAZAC sequence. Using this characteristic, the SRSs simultaneously allocated to the same frequency domain may be classified according to a CAZAC sequence cyclic shift value configured for each SRS by the base station.

The SRSs of several terminals may be classified according to frequency positions as well as cyclic shift values. The frequency position may be allocated in units of SRS subbands or may be divided into Comb. Comb2 and Comb4 may be supported in 5G or NR systems. In the case of Comb2, one SRS may be allocated only to the even-numbered or odd-numbered subcarriers in the SRS subband. In this case, each of the even-numbered subcarriers and the odd-numbered subcarriers may constitute one Comb.

Each terminal may be allocated an SRS subband based on the tree structure. In addition, the terminal may perform hopping on the SRS allocated to each subband at each SRS transmission time point. Accordingly, all transmit antennas of the terminal may transmit the SRS using the entire uplink data transmission bandwidth.

Figure 15:
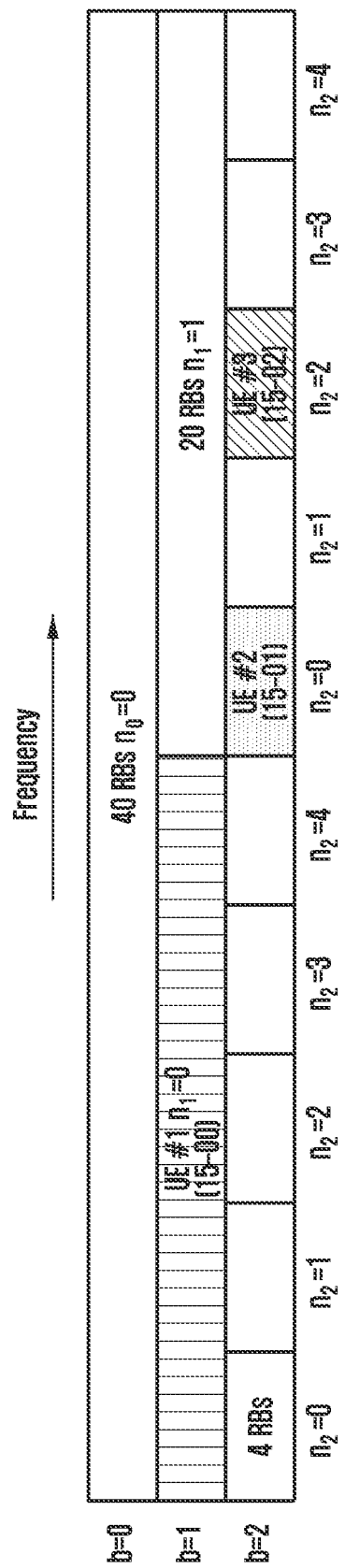
FIG. 15 is a diagram illustrating a method for a base station and a terminal to transmit and receive data in consideration of a downlink data channel and a rate matching resource, according to an embodiment of the disclosure.

FIG. 15 is a diagram illustrating a structure in which SRS is allocated for each subband according to an embodiment of the disclosure.

FIG. 15 illustrates an example in which SRS is allocated to each terminal according to a tree structure set by the base station when a data transmission band corresponding to 40 RBs in frequency is provided.

When the level index of the tree structure in FIG. 15 is b, the highest level (b=0) of the tree structure may consist of one SRS subband having a bandwidth of 40 RBs. In the second level (b=1), two SRS subbands of 20 RB bandwidth may be generated from the SRS subband of the b=0 level. Accordingly, two SRS subbands may exist in the entire data transmission band of the second level (b=1). In the third level (b=2), five 4 RB SRS subbands may be generated from one 20 RB SRS subband of the immediately above level (b=1), and there may be a structure in which 10 4RB SRS subbands exist in one level.

The configuration of such a tree structure may have various levels, SRS subband sizes, and the number of SRS subbands per level according to the configuration of the base station. Here, Nb may be defined as the number of SRS subbands in level b generated from one SRS subband of a higher level, and nb={0, . . . , Nb−1} for the indexes of these Nb SRS subbands. As the subbands per level vary in this way, as shown in FIG. 15, the terminal may be allocated to each subband per level. For example, terminal 1 (15-00) may be allocated to the first SRS subband (n1=0) between two SRS subbands having a 20 RB bandwidth at b=1 level, and terminal 2 (15-01) and terminal 3 (15-02) may be allocated to the positions of the first SRS subband (n2=0) and the third SRS subband (n2=2) below the second 20 RB SRS subband, respectively. Through these processes, multiple terminals may transmit SRS in multiple SRS subbands simultaneously within one CC.

Specifically, for the above-described SRS subband configuration, NR supports SRS bandwidth configurations as shown in Table 37 below.

TABLE 37

| $C_{SRS}$ | $B_{SRS}=0$ | | $B_{SRS}=1$ | | $B_{SRS}=2$ | | $B_{SRS}=3$ | |
|---|---|---|---|---|---|---|---|---|
| | $m_{SRS,0}$ | $N_0$ | $m_{SRS,1}$ | $N_1$ | $m_{SRS,2}$ | $N_2$ | $m_{SRS,3}$ | $N_3$ |
| 0 | 4 | 1 | 4 | 1 | 4 | 1 | 4 | 1 |
| 1 | 8 | 1 | 4 | 2 | 4 | 1 | 4 | 1 |
| 2 | 12 | 1 | 4 | 3 | 4 | 1 | 4 | 1 |
| 3 | 16 | 1 | 4 | 4 | 4 | 1 | 4 | 1 |
| 4 | 16 | 1 | 8 | 2 | 4 | 2 | 4 | 1 |
| 5 | 20 | 1 | 4 | 5 | 4 | 1 | 4 | 1 |
| 6 | 24 | 1 | 4 | 6 | 4 | 1 | 4 | 1 |
| 7 | 24 | 1 | 12 | 2 | 4 | 3 | 4 | 1 |
| 8 | 28 | 1 | 4 | 7 | 4 | 1 | 4 | 1 |
| 9 | 32 | 1 | 16 | 2 | 8 | 2 | 4 | 2 |
| 10 | 36 | 1 | 12 | 3 | 4 | 3 | 4 | 1 |
| 11 | 40 | 1 | 20 | 2 | 4 | 5 | 4 | 1 |
| 12 | 48 | 1 | 16 | 3 | 8 | 2 | 4 | 2 |
| 13 | 48 | 1 | 24 | 2 | 12 | 2 | 4 | 3 |
| 14 | 52 | 1 | 4 | 13 | 4 | 1 | 4 | 1 |
| 15 | 56 | 1 | 28 | 2 | 4 | 7 | 4 | 1 |
| 16 | 60 | 1 | 20 | 3 | 4 | 5 | 4 | 1 |
| 17 | 64 | 1 | 32 | 2 | 16 | 2 | 4 | 4 |
| 18 | 72 | 1 | 24 | 3 | 12 | 2 | 4 | 3 |
| 19 | 72 | 1 | 36 | 2 | 12 | 3 | 4 | 3 |
| 20 | 76 | 1 | 4 | 19 | 4 | 1 | 4 | 1 |
| 21 | 80 | 1 | 40 | 2 | 20 | 2 | 4 | 5 |
| 22 | 88 | 1 | 44 | 2 | 4 | 11 | 4 | 1 |
| 23 | 96 | 1 | 32 | 3 | 16 | 2 | 4 | 4 |
| 24 | 96 | 1 | 48 | 2 | 24 | 2 | 4 | 6 |
| 25 | 104 | 1 | 52 | 2 | 4 | 13 | 4 | 1 |
| 26 | 112 | 1 | 56 | 2 | 28 | 2 | 4 | 7 |
| 27 | 120 | 1 | 60 | 2 | 20 | 3 | 4 | 5 |
| 28 | 120 | 1 | 40 | 3 | 8 | 5 | 4 | 2 |
| 29 | 120 | 1 | 24 | 5 | 12 | 2 | 4 | 3 |
| 30 | 128 | 1 | 64 | 2 | 32 | 2 | 4 | 8 |
| 31 | 128 | 1 | 64 | 2 | 16 | 4 | 4 | 4 |
| 32 | 128 | 1 | 16 | 8 | 8 | 2 | 4 | 2 |
| 33 | 132 | 1 | 44 | 3 | 4 | 11 | 4 | 1 |
| 34 | 136 | 1 | 68 | 2 | 4 | 17 | 4 | 1 |
| 35 | 144 | 1 | 72 | 2 | 36 | 2 | 4 | 9 |
| 36 | 144 | 1 | 48 | 3 | 24 | 2 | 12 | 2 |
| 37 | 144 | 1 | 48 | 3 | 16 | 3 | 4 | 4 |
| 38 | 144 | 1 | 16 | 9 | 8 | 2 | 4 | 2 |
| 39 | 152 | 1 | 76 | 2 | 4 | 19 | 4 | 1 |
| 40 | 160 | 1 | 80 | 2 | 40 | 2 | 4 | 10 |
| 41 | 160 | 1 | 80 | 2 | 20 | 4 | 4 | 5 |
| 42 | 160 | 1 | 32 | 5 | 16 | 2 | 4 | 4 |
| 43 | 168 | 1 | 84 | 2 | 28 | 3 | 4 | 7 |
| 44 | 176 | 1 | 88 | 2 | 44 | 2 | 4 | 11 |
| 45 | 184 | 1 | 92 | 2 | 4 | 23 | 4 | 1 |
| 46 | 192 | 1 | 96 | 2 | 48 | 2 | 4 | 12 |
| 47 | 192 | 1 | 96 | 2 | 24 | 4 | 4 | 6 |
| 48 | 192 | 1 | 64 | 3 | 16 | 4 | 4 | 4 |
| 49 | 192 | 1 | 24 | 8 | 8 | 3 | 4 | 2 |
| 50 | 208 | 1 | 104 | 2 | 52 | 2 | 4 | 13 |
| 51 | 216 | 1 | 108 | 2 | 36 | 3 | 4 | 9 |
| 52 | 224 | 1 | 112 | 2 | 56 | 2 | 4 | 14 |
| 53 | 240 | 1 | 120 | 2 | 60 | 2 | 4 | 15 |
| 54 | 240 | 1 | 80 | 3 | 20 | 4 | 4 | 5 |
| 55 | 240 | 1 | 48 | 5 | 16 | 3 | 8 | 2 |
| 56 | 240 | 1 | 24 | 10 | 12 | 2 | 4 | 3 |
| 57 | 256 | 1 | 128 | 2 | 64 | 2 | 4 | 16 |
| 58 | 256 | 1 | 128 | 2 | 32 | 4 | 4 | 8 |
| 59 | 256 | 1 | 16 | 16 | 8 | 2 | 4 | 2 |
| 60 | 264 | 1 | 132 | 2 | 44 | 3 | 4 | 11 |
| 61 | 272 | 1 | 136 | 2 | 68 | 2 | 4 | 17 |
| 62 | 272 | 1 | 68 | 4 | 4 | 17 | 4 | 1 |
| 63 | 272 | 1 | 16 | 17 | 8 | 2 | 4 | 2 |

In addition, NR supports SRS frequency hopping based on the values in Table 37, and the detailed procedure follows Table 38 below.

TABLE 38

When SRS is transmitted on a given SRS resource, the sequence $r^{(p_i)}(n, l')$ for each OFDM symbol $l'$ and for each of the antenna ports of the SRS resource shall be multiplied with the amplitude scaling factor $\beta_{SRS}$ in order to conform to the transmit power specified in [5, 38.213] and mapped in sequence starting with $r^{(p_i)}(0, l')$ to resource elements (k, l) in a slot for each of the antenna ports $p_i$ according to $$a^{(p_i)}_{K_{TC}k'+k_0^{(p_i)},l'+l_0} = \begin{cases} \frac{1}{\sqrt{N_{ap}}}\beta_{SRS}r^{(p_i)}(k', l') & k'=0, 1, \ldots, M_{sc,b}^{SRS}-1 \; l'=0,1,\ldots,N_{symb}^{SRS}-1 \\ 0 & \text{otherwise} \end{cases}$$

The length of the sounding reference signal sequence is given by
$M_{sc,b}^{SRS} = m_{SRS,b} N_{sc}^{RB}/K_{TC}$ where $m_{SRS,b}$ is given by a selected row of Table 6.4.1.4.3-1 with b = $B_{SRS}$ where $B_{SRS} \in \{0, 1, 2, 3\}$ is given by the field b-SRS contained in the higher-layer parameter freqHopping. The row of the table is selected according to the index $C_{SRS} \in \{0, 1, \ldots, 63\}$ given by the field c-SRS contained in the higher-layer parameter freqHopping.

The frequency-domain starting position $k_0^{(p_i)}$ is defined by

TABLE 38-continued $$k_0^{(p_i)} = \bar{k}_0^{(p_i)} + \sum_{b=0}^{B_{SRS}} K_{TC} M_{sc,b}^{SRS} n_b$$

where $$\bar{k}_0^{(p_i)} = n_{shift} N_{sc}^{RB} + k_{TC}^{(p_i)}$$

$$k_{TC}^{(p_i)} = \begin{cases} (\bar{k}_{TC} + K_{TC}/2) \bmod K_{TC} & \text{if } n_{SRS}^{cs} \in \{n_{SRS}^{cs,max}/2, \ldots, n_{SRS}^{cs,max} - 1\} \text{ and } N_{ap}^{SRS} = 4 \text{ and } p_i \in \{1001, 1003\} \\ \bar{k}_{TC} & \text{otherwise} \end{cases}$$

If $N_{BWP}^{start} \leq n_{shift}$ the reference point for $k_0^{(p_i)} = 0$ is subcarrier 0 in common resource block 0, otherwise the reference point is the lowest subcarrier of the BWP.

The frequency domain shift value $n_{shift}$ adjusts the SRS allocation with respect to the reference point grid and is contained in the higher-layer parameter freqDomainShift in the SRS-Config IE. The transmission comb offset $\bar{k}_{TC} \in \{0, 1, \ldots, K_{TC} - 1\}$ is contained in the higher-layer parameter trasmissionComb in the SRS-Config IE and $n_b$ is a frequency position index.

Frequency hopping of the sounding reference signal is configured by the parameter $b_{hop} \in \{0, 1, 2, 3\}$, given by the field b-hop contained in the higher-layer parameter freqHopping.

If $b_{hop} \geq B_{SRS}$, frequency hopping is disabled and the frequency position index $n_b$ remains constant (unless re-configured) and is defined by
$n_b = \lfloor 4n_{RRC}/m_{SRS,b} \rfloor \bmod N_b$
for all $N_{symb}^{SRS}$ OFDM symbols of the SRS resource. The quantity $n_{RRC}$ is given by the higher-layer parameter freqDomainPosition and the values of $m_{SRS,b}$ and $N_b$ for $b = B_{SRS}$ are given by the selected row of Table 6.4.1.4.3-1 corresponding to the configured value of $C_{SRS}$.

If $b_{hop} < B_{SRS}$, frequency hopping is enabled and the frequency position indices $n_b$ are defined by $$n_b = \begin{cases} \lfloor 4n_{RRC}/m_{SRS,b} \rfloor \bmod N_b & b \leq b_{hop} \\ \{F_b(n_{SRS}) + \lfloor 4n_{RRC}/m_{SRS,b} \rfloor\} \bmod N_b & \text{otherwise} \end{cases}$$

where $N_b$ is given by Table 6.4.1.4.3-1, $$F_b(n_{SRS}) = \begin{cases} (N_b/2) \left\lfloor \dfrac{n_{SRS} \bmod \prod_{b'=b_{hop}}^{b} N_{b'}}{\prod_{b'=b_{hop}}^{b-1} N_{b'}} \right\rfloor + \left\lfloor \dfrac{n_{SRS} \bmod \prod_{b'=b_{hop}}^{b} N_{b'}}{2\prod_{b'=b_{hop}}^{b-1} N_{b'}} \right\rfloor & \text{if } N_b \text{ even} \\ \lfloor N_b/2 \rfloor \lfloor n_{SRS}/\prod_{b'=b_{hop}}^{b-1} N_{b'} \rfloor & \text{if } N_b \text{ odd} \end{cases}$$

and where $N_{b_{hop}} = 1$ regardless of the value of $N_b$. The quantity $n_{SRS}$ counts the number of SRS transmission. For the case of an SRS resource configured as aperiodic by the higher-layer parameter resourceType, it is given by $n_{SRS} = \lfloor l'/R \rfloor$ within the slot in which the $N_{symb}^{SRS}$ symbol SRS resource is transmitted. The quantity $R \leq N_{sym}^{SRS}$ is the repetition factor given by the field repetitionFactor contained in the higher-layer parameter resourceMapping.

As described above, the 5G or NR terminal supports the single user MIMO (SU-MIMO) technique and has a maximum of 4 transmit antennas. In addition, the NR terminal may simultaneously transmit SRSs to multiple CCs or multiple SRS subbands within the CC. In the case of the 5G or NR system, unlike the LTE system, various numerology is supported, a plurality of SRS transmission symbols may be configured in various ways, and repeated transmission for SRS transmission through a repetition factor may also be allowed. Therefore, it is necessary to count SRS transmission in consideration of this. Counting the SRS transmission may be used in various ways. For example, counting SRS transmission may be utilized to support antenna switching according to SRS transmission. Specifically, at which SRS transmission time and in which band the SRS corresponding to which antenna is transmitted may be determined by SRS transmission counting.

The base station may configure configuration information for transmission of an uplink reference signal to the terminal. Specifically, as shown in Table 39, the base station may indicate to the terminal SRS configuration information for each uplink BWP in the form of higher layer signaling srs-Config.

TABLE 39

| | |
|---|---|
| BWP-UplinkDedicated ::= | SEQUENCE { |
| > pucch-Config | SetupRelease { PUCCH-Config } |
| OPTIONAL, -- Need M | |
| (PUCCH configuration for one BWP in the support cell) | |
| > pusch-Config | SetupRelease { PUSCH-Config } |
| OPTIONAL, -- Need M | |

TABLE 39-continued

| | |
|---|---|
| (PUSCH configuration for one BWP in the support cell) | |
| > configuredGrantConfig | SetupRelease { ConfiguredGrantConfig } OPTIONAL, -- Need M |
| (Configuration type 1 or type 2 of configured grant | |
| > srs-Config | SetupRelease { SRS-Config } OPTIONAL, -- Need M |
| (Uplink sounding reference signal (SRS) configuration) | |
| > beamFailureRecoveryConfig | SetupRelease { BeamFailureRecoveryConfig } OPTIONAL, -- Cond SpCellOnly |
| (Configuration for beam failure recovery) | |
| ..., | |

According to an embodiment, the detailed structure of the higher layer signaling srs-Config may include at least some of the parameters listed in Table 40.

TABLE 40

| | |
|---|---|
| SRS-Config ::= | SEQUENCE{ |
| > srs-ResourceSetToReleaseList (SIZE(1..maxNrofSRS-ResourceSets)) OF SRS-ResourceSetId OPTIONAL, -- Need N | SEQUENCE |
| (List of released SRS resource sets) | |
| > srs-ResourceSetToAddModList (SIZE(1..maxNrofSRS-ResourceSets)) OF SRS-ResourceSet OPTIONAL, -- Need N | SEQUENCE |
| (List of added or modified SRS resource sets) | |
| > srs-ResourceToReleaseList Resources)) OF SRS-ResourceId | SEQUENCE (SIZE(1..maxNrofSRS- OPTIONAL, -- Need N |
| (List of released SRS resource sets) | |
| > srs-ResourceToAddModList (SIZE(1..maxNrofSRS-Resources)) OF SRS-Resource -- Need N | SEQUENCE OPTIONAL, |
| (List of added or modified SRS resource sets) | |
| > tpc-Accumulation OPTIONAL, -- Need S | ENUMERATED {disabled} |
| (Indicate whether accumulation of TPC command is performed) | |
| ..., | |
| SRS-ResourceSet ::= | SEQUENCE { |
| > srs-ResourceSetId | SRS-ResourceSetId, |
| (Identifier of SRS resource set) | |
| > srs-ResourceIdList ResourcesPerSet)) OF SRS-ResourceId OPTIONAL, -- Cond Setup | SEQUENCE (SIZE(1..maxNrofSRS- |
| (Identifiers of SRS resources included in the corresponding SRS resource set) | |
| > resourceType | CHOICE { |
| (SRS resource time domain operation configuration) | |
| >> aperiodic | SEQUENCE { |
| (aperiodic SRS configuration) | |
| >>> aperiodicSRS-ResourceTrigger TriggerStates-1), | INTEGER (1..maxNrofSRS- |
| (DCI codepoint that transmits SRS according to the SRS resource set setting of the corresponding area) | |
| >>> csi-RS OPTIONAL, -- Cond NonCodebook | NZP-CSI-RS-ResourceId |
| (CSI-RS resource identifier associated with an SRS resource set) | |
| >>> slotOffset OPTIONAL, -- Need S | INTEGER (1..32) |
| (Slot offset between DCI triggering time and transmission of actual SRS resource set) | |
| ..., | |
| [[ | |
| >>> aperiodicSRS-ResourceTriggerList (SIZE(1..maxNrofSRS-TriggerStates-2)) OF INTEGER (1..maxNrofSRS-TriggerStates-1)  OPTIONAL -- Need M | SEQUENCE |
| (List of additional DCI codepoints that transmit SRS according to the SRS resource set setting of the corresponding area) | |
| ]] | |
| }, | |
| >> semi-persistent | SEQUENCE { |
| (semi-persistent SRS configuration) | |
| >>>  associatedCSI-RS OPTIONAL, -- Cond NonCodebook | NZP-CSI-RS-ResourceId |
| (CSI-RS resource identifier associated with a non-codebook based SRS resource set) | |
| ... | |

TABLE 40-continued

```
    },
 >> periodic                                       SEQUENCE {
(periodic SRS configuration)
 >>>    associatedCSI-RS                                                                  NZP-CSI-RS-ResourceId
OPTIONAL, -- Cond NonCodebook
       ...
       }
    },
 },
 > usage                                           ENUMERATED {beamManagement, codebook,
nonCodebook, antennaSwitching},
    (Indicate where to use the SRS resource set)
 > alpha Alpha OPTIONAL,
-- Need S
    (Alpha value for SRS power control)
 > p0                                                                                     INTEGER (-202..24)
OPTIONAL, -- Cond Setup
    (p0 value for SRS power control)
 > pathlossReferenceRS                                       CHOICE{
    (Reference signal for SRS path loss estimation)
 >> ssb-Index                                      SSB-Index,
    (Path loss reference SS/PBCH block index)
 >> csi-RS-Index                                   NZP-CSI-RS-ResourceId
    (Path loss reference CSI-RS resource index)
 } OPTIONAL, -- Need M
 > srs-PowerControlAdjustmentStates                                        ENUMERATED { sameAsFci2,
separateClosedLoop}                                OPTIONAL, -- Need S
    (Indicate on how to perform SRS power control adjustments)
    ...,
 }
    SRS-ResourceSetId ::=                                                   INTEGER (0..maxNrofSRS-
ResourceSets-1)
    SRS-Resource ::=                               SEQUENCE {
 > srs-ResourceId                                  SRS-ResourceId,
    (SRS resource identifier)
 > nrofSRS-Ports                                   ENUMERATED {port1, ports2, ports4},
    (Number of SRS ports)
 > ptrs-PortIndex                                                          ENUMERATED {n0, n1 }
OPTIONAL,  -- Need R
    (PTRS port index of SRS resource for non-codebook based uplink MIMO
resource)
 > transmissionComb                                          CHOICE {
    (SRS comb value, comb offset, and comb value are set to 2 or 4)
 >> n2                                             SEQUENCE {
 >>> combOffset-n2                                           INTEGER (0..1),
    (When the comb value is 2, comb offset)
 >>> cyclicShift-n2                                          INTEGER (0..7)
    (When comb value is 2, cyclic shift configuration)
    },
 >> n4                                             SEQUENCE {
 >>> combOffset-n4                                           INTEGER (0..3),
    (When comb value is 4, comb offset)
 >>> cyclicShift-n4                                          INTEGER (0..11)
    (When comb value is 4, comb offset)
    }
 },
 > resourceMapping                                           SEQUENCE {
    (OFDM symbol position information of SRS resource)
 >> startPosition                                            INTEGER (0..5),
    (The time domain SRS resource location is mapped as 0 is the last symbol,
1 is the second last symbol...)
 >> nrofSymbols                                              ENUMERATED {n1, n2, n4},
    (Number of OFDM symbols)
 >> repetitionFactor                                         ENUMERATED {n1, n2, n4}
    (repeat factor)
    },
 > freqDomainPosition                                        INTEGER (0..67),
    (Frequency domain location of SRS resource)
 > freqDomainShift                                           INTEGER (0..268),
    (Frequency domain shift value of SRS resource)
 > freqHopping                                               SEQUENCE {
    (Frequency hopping information of SRS resource)
 >> c-SRS                                                    INTEGER (0..63),
    ($C_{SRS}$ information)
 >> b-SRS                                                    INTEGER (0..3),
    ($B_{SRS}$ information)
 >> b-hop                                                    INTEGER (0..3)
    ($b_{hop}$ information)
    },
 > groupOrSequenceHopping                                                  ENUMERATED { neither,
groupHopping, sequenceHopping },
```

TABLE 40-continued

```
(information on whether group hopping or sequence hopping is performed
on SRS resources)
   > resourceType                                          CHOICE {
   >> aperiodic                                            SEQUENCE {
       ...
   },
   >> semi-persistent                                      SEQUENCE {
   >>> periodicityAndOffset-sp                                         SRS-PeriodicityAndOffset,
   (Information on period and slot offset for semi-persistent SRS resources)
       ...
   },
   >> periodic                                             SEQUENCE {
   >>> periodicityAndOffset-p                                          SRS-PeriodicityAndOffset,
   (Information on period and slot offset for periodic SRS resources)
       ...
   }
   },
   > sequenceId                                            INTEGER (0..1023),
   (Initial sequence identifier for group hopping and sequence hopping)
   > spatialRelationInfo                                                       SRS-SpatialRelationInfo
OPTIONAL, -- Need R
   (Spatial relation setting information between target SRS and reference RS)
    ...,
}
SRS-PeriodicityAndOffset ::=                               CHOICE {
   > sl1                            NULL,
   > sl2                            INTEGER(0..1),
   > sl4                            INTEGER(0..3),
   > sl5                            INTEGER(0..4),
   > sl8                            INTEGER(0..7),
   > sl10                            INTEGER(0..9),
   > sl16                            INTEGER(0..15),
   > sl20                            INTEGER(0..19),
   > sl32                            INTEGER(0..31),
   > sl40                            INTEGER(0..39),
   > sl64                            INTEGER(0..63),
   > sl80                            INTEGER(0..79),
   > sl160                            INTEGER(0..159),
   > sl320                            INTEGER(0..319),
   > sl640                            INTEGER(0..639),
   > sl1280                            INTEGER(0..1279),
   > sl2560                            INTEGER(0..2559)
}
```

One or more SRS resource sets may be included in srs-Config. One SRS resource set consists of one or more SRS resources having the same time domain operation and usage. A time domain operation configurable for the SRS resource set may be one of 'periodic' operation, 'semi-persistent' operation, and 'aperiodic' operation. Meanwhile, the usage of the above-described SRS resource set is configured as a usage parameter in the SRS resource set, and may have a value of beamManagement: beam management', 'codebook: codebook-based uplink transmission', 'non-Codebook: non-codebook-based uplink transmission', 'antennaSwitching: downlink channel information acquisition using reciprocity'.

Meanwhile, information on time-frequency axis resource allocation and frequency hopping of SRS resources may be configured independently for each SRS resource. In addition, a spatial domain transmission filter to be used when the terminal transmits an SRS resource may also be configured independently for each SRS resource. The spatial domain transmission filter may be indicated by a spatialRelationInfo parameter, and the parameter may include an index of a downlink or uplink reference signal. If the spatialRelation-Info parameter points to the index of the CSI-RS resource or SSB, it may be understood that the terminal uses the same spatial domain transmission filter as the spatial domain reception filter used when receiving the referenced CSI-RS resource or SSB. Alternatively, when spatial relation info refers to another SRS resource index, it may be understood that the terminal uses the spatial domain transmission filter used to transmit the referenced SRS resource.

Next, a rate matching operation and a puncturing operation will be described in detail.

When the time and frequency resource A to which the arbitrary symbol sequence A is transmitted overlaps with the arbitrary time and frequency resource B, a rate matching or puncturing operation may be considered as the transmission/reception operation of the channel A in consideration of the resource C in the region where the resource A and the resource B overlap. A specific operation may follow the following contents.

Rate Matching operation

The base station may map and transmit the channel A only for the remaining resource regions except for the resource C corresponding to the overlapping region with the resource B among all the resources A for transmitting the symbol sequence A to the terminal. For example, when the symbol sequence A is composed of {symbol #1, symbol #2, symbol #3, symbol 4}, the resource A is {resource #1, resource #2, resource #3, resource #4} and the resource B is {resource #3, resource #5}, the base station may sequentially map and transmit the symbol sequence A to {resource #1, resource #2, resource #4}, which are the remaining resources except for {resource #3} corresponding to the resource C, from among the resource A. As a result, the base station may map and transmit the symbol sequence {symbol #1, symbol #2, symbol #3} to {resource #1, resource #2, resource #4}, respectively.

The terminal may determine the resource A and the resource B from the scheduling information for the symbol sequence A from the base station, and through this, may determine the resource C, which is an area where the resource A and the resource B overlap. The terminal may receive the symbol sequence A, assuming that the symbol sequence A is mapped and transmitted in the remaining region except for the resource C among all the resources A. For example, when symbol sequence A is composed of {symbol #1, symbol #2, symbol #3, symbol 4}, the resource A is {resource #1, resource #2, resource #3, resource #4}, the resource B is {resource #3, resource #5}, the terminal may receive, assuming that the symbol sequence A is sequentially mapped to {resource #1, resource #2, resource #4}, which are the remaining resources except for {resource #3} corresponding to the resource C among the resource A. As a result, the terminal may assume that the symbol sequence {symbol #1, symbol #2, symbol #3} is mapped to {resource #1, resource #2, resource #4} and transmitted, respectively, and perform a subsequent series of reception operations.

Puncturing Operation

When there is a resource C corresponding to the region overlapping with the resource B among all the resources A for transmitting the symbol sequence A to the terminal, although the base station maps the symbol sequence A to the entire resource A, the base station may not perform transmission in the resource region corresponding to resource C, but may perform transmission only in the remaining resource regions except for resource C among resource A. For example, when the symbol sequence A is composed of {symbol #1, symbol #2, symbol #3, symbol 4}, the resource A is {resource #1, resource #2, resource #3, resource #4} and the resource B is {resource #3, resource #5}, the base station may map the symbol sequence A {symbol #1, symbol #2, symbol #3, symbol #4} to the resource A {resource #1, resource #2, resource #3, resource #4}, respectively, may transmit only the symbol sequence {symbol #1, symbol #2, symbol #4} corresponding to {resource #1, resource #2, resource #4}, which is the remaining resources except for {resource #3} corresponding to the resource C among the resource A, and may not transmit {symbol #3} mapped to {resource #3} corresponding to the resource C. As a result, the base station may map and transmit the symbol sequence {symbol #1, symbol #2, symbol #4} to {resource #1, resource #2, resource #4}, respectively.

The terminal may determine the resource A and the resource B from the scheduling information for the symbol sequence A from the base station, and through this, may determine the resource C, which is an area where the resource A and the resource B overlap. The terminal may receive the symbol sequence A, assuming that the symbol sequence A is mapped to the entire resource A and transmitted only in the remaining regions except for the resource C in the resource region A. For example, when symbol sequence A is composed of {symbol #1, symbol #2, symbol #3, symbol 4}, the resource A is {resource #1, resource #2, resource #3, resource #4}, and the resource B is {resource #3, resource #5}, the terminal may assume that Symbol sequence A {symbol #1, symbol #2, symbol #3, symbol #4} is mapped to resource A {resource #1, resource #2, resource #3, resource #4}, respectively, but {symbol #3} mapped to {resource #3} corresponding to the resource C is not transmitted, and may receive by assuming that symbol sequence {symbol #1, symbol #2, symbol #4} corresponding to {resource #1, resource #2, resource #4}, which is the remaining resources except for {resource #3} corresponding to the resource C, among the resource A is mapped and transmitted. As a result, the terminal may assume that the symbol sequence {symbol #1, symbol #2, symbol #4} is mapped to {resource #1, resource #2, resource #4} and transmitted, respectively, and may perform a subsequent series of reception operations.

Rate Matching Resource

Figure 16:
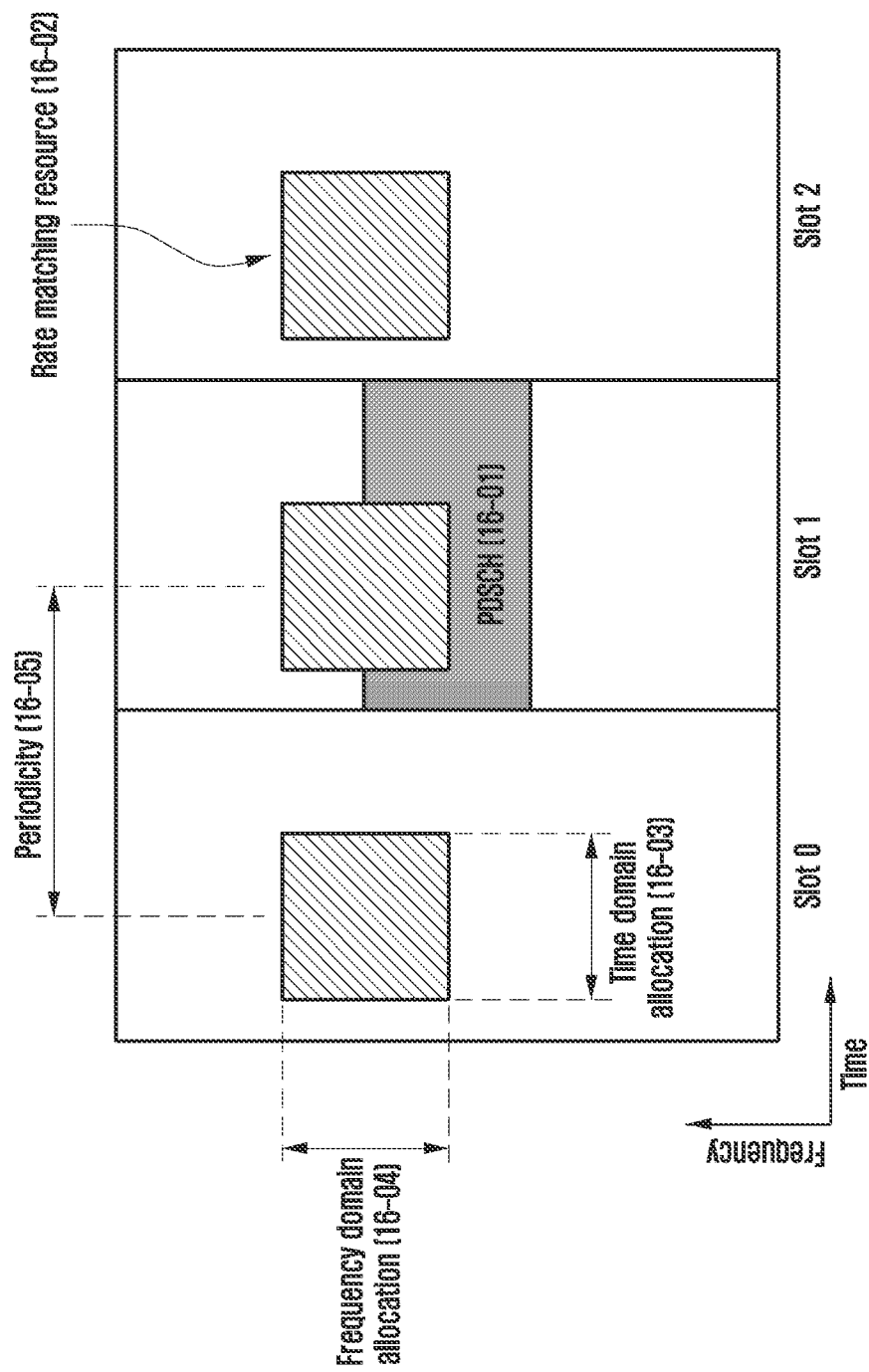
FIG. 16 is a diagram illustrating an uplink-downlink configuration considered in a 5G communication system as an example according to an embodiment of the disclosure.

FIG. 16 is a diagram illustrating a method for a base station and a terminal to transmit and receive data in consideration of a downlink data channel and a rate matching resource according to an embodiment of the disclosure.

FIG. 16 illustrates a downlink data channel PDSCH 16-01 and a rate matching resource 16-02. The base station may configure one or more rate matching resources 16-02 through higher layer signaling (e.g., RRC signaling) to the terminal. The rate matching resource 16-02 configuration information may include time axis resource allocation information 16-03, frequency axis resource allocation information 16-04, and period information 16-05. In the following description, a bitmap corresponding to the frequency-axis resource allocation information 16-04 is referred to as a "first bitmap", a bitmap corresponding to the time-axis resource allocation information 16-03 is referred to as a "second bitmap", and period information 16-05 is referred to as a "third bitmap". When all or part of the time and frequency resources of the scheduled data channel 16-01 overlap with the configured rate matching resource 16-02, the base station may rate-match the data channel 16-01 in the rate matching resource 16-02 and transmit, and the terminal may perform reception and decoding after assuming that the data channel 16-01 is rate-matched in the rate matching resource 16-02.

The base station may dynamically notify the terminal through DCI whether to rate-match the data channel in the configured rate matching resource part through additional configuration (corresponding to the "rate matching indicator" in the DCI format described above). Specifically, the base station may select some of the configured rate matching resources and group them into a rate matching resource group, and may indicate to the terminal whether the data channel for each rate matching resource group is rate matched using a DCI using a bitmap method. For example, when four rate matching resources, RMR #1, RMR #2, RMR #3, and RMR #4, are configured, the base station may configure RMG #1={RMR #1, RMR #2}, RMG #2={RMR #3, RMR #4} as a rate matching group, and the base station may indicate to the terminal whether the rate is matched in RMG #1 and RMG #2, respectively, by using 2 bits in the DCI field with a bitmap. For example, the base station may configure each bit to "1" when rate matching is to be performed and "0" when rate matching is not to be performed.

The 5G system supports the granularity of "RB symbol level" and "RE level" as a method of setting the above-described rate matching resource in the terminal More specifically, the following configuration method may be followed.

RB symbol level

The terminal may be configured up to four RateMatchPattern for each partial bandwidth by higher layer signaling, and one RateMatchPattern may include the following content.

As a reserved resource within the partial bandwidth, a resource in which time and frequency resource regions of the corresponding reserved resource are configured may be included in a combination of an RB-level bitmap and a symbol-level bitmap on the frequency axis. The reserved resource may span one or two slots. A time domain pattern (periodicityAndPattern) in which the time and frequency domains composed of each RB level and symbol level bitmap pair are repeated may be additionally configured.

A time and frequency domain resource region configured as a control resource set within the partial bandwidth and a resource region corresponding to a time domain pattern configured as a search space configuration in which the resource region is repeated may be included.
RE level The terminal may be configured the following configurations through higher layer signaling.

As configuration information (lte-CRS-ToMatchAround) for the RE corresponding to the LTE CRS (Cell-specific Reference Signal or Common Reference Signal) pattern, the number of ports of the LTE CRS (nrofCRS-Ports) and the LTE-CRS-vshift(s) value (v-shift), center subcarrier (Subcarrier) location information (carrierFreqDL) of the LTE carrier from the reference frequency point (for example, reference point A), bandwidth size of an LTE carrier (carrierBandwidthDL), subframe configuration information (mbsfn-SubframConfigList) corresponding to a multicast-broadcast single-frequency network (MBSFN), and the like may be included. The terminal may determine the location of the CRS in the NR slot corresponding to the LTE subframe, based on the above-described information.

The configuration information for a resource set corresponding to one or more ZP (Zero Power) CSI-RSs within the partial bandwidth may be included.

Next, an uplink and downlink configuration for each symbol/slot considered in an embodiment of the disclosure will be described in detail.

Figure 17:
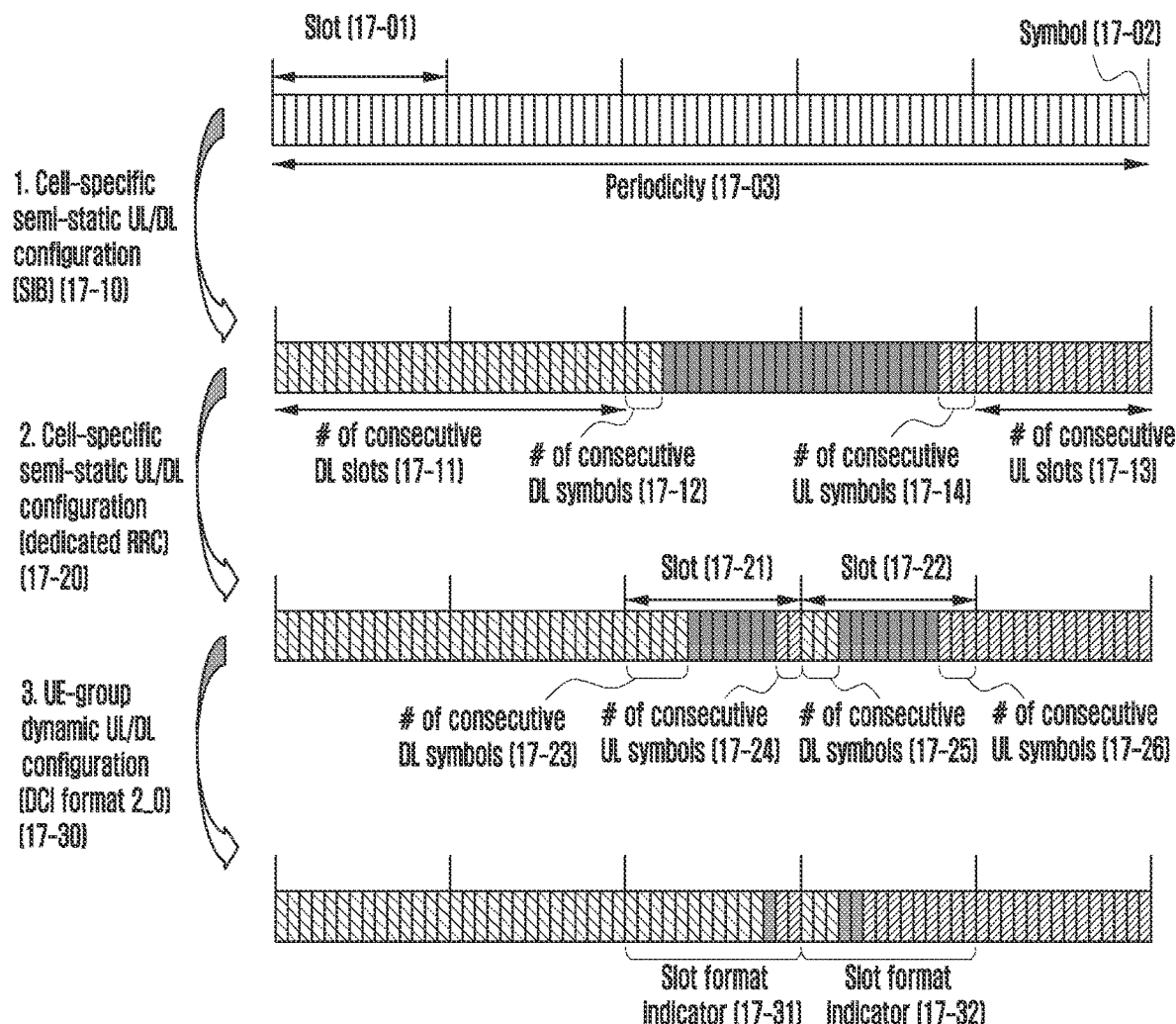
FIG. 17 is a diagram illustrating an uplink-downlink configuration method considered in a 5G communication system according to an embodiment of the disclosure.

FIG. 17 is a diagram illustrating an uplink-downlink configuration method considered in a 5G communication system according to an embodiment of the disclosure.

The uplink-downlink configuration of symbols 17-02/slots 17-01 in the 5G communication system may include three steps. First, semi-statically, the uplink-downlink of a symbol/slot may be configured through cell-specific configuration information 17-10 through system information in a symbol unit. Specifically, the cell-specific uplink-downlink configuration information through the system information may include uplink-downlink pattern information and reference subcarrier information. Through the uplink-downlink pattern information, the pattern period 17-03, the number of consecutive downlink slots from the start point of each pattern 17-11, the number of symbols of the next slot 17-12, the number of consecutive uplink slots 17-13 from the end of the pattern, and the number of symbols 17-14 of the next slot may be indicated. In this case, the terminal may determine the slots and symbols not indicated for uplink and downlink as flexible slots/symbols.

Second, through user-specific configuration information through dedicated upper layer signaling 17-20, a flexible slot or a slot 17-21, 17-22 including flexible symbols may indicate the number 17-23, 17-25 of consecutive downlink symbols from the start symbol of the slot and the number 17-24, 17-26 of consecutive uplink symbols from the end of the slot, or may indicate the entire downlink of the slot or the entire uplink of the slot.

Finally, in order to dynamically change the downlink signal transmission and the uplink signal transmission period 17-30, in each slot, whether each of the symbols (i.e., symbols not indicated by the downlink and the uplink) indicated by the flexible symbol is a downlink symbol, an uplink symbol, or a flexible symbol may be indicated through a slot format indicator (SFI) 17-31, 17-32 included in the downlink control channel. The slot format indicator may select one index from a table in which the uplink-downlink configuration of 14 symbols in one slot is preset as shown in Table 41 below.

TABLE 41

|        | Symbol number in a slot | | | | | | | | | | | | | |
|--------|---|---|---|---|---|---|---|---|---|---|---|---|---|---|
| Format | 0 | 1 | 2 | 3 | 4 | 5 | 6 | 7 | 8 | 9 | 10 | 11 | 12 | 13 |
| 0  | D | D | D | D | D | D | D | D | D | D | D | D | D | D |
| 1  | U | U | U | U | U | U | U | U | U | U | U | U | U | U |
| 2  | F | F | F | F | F | F | F | F | F | F | F | F | F | F |
| 3  | D | D | D | D | D | D | D | D | D | D | D | D | D | F |
| 4  | D | D | D | D | D | D | D | D | D | D | D | D | F | F |
| 5  | D | D | D | D | D | D | D | D | D | D | D | F | F | F |
| 6  | D | D | D | D | D | D | D | D | D | D | F | F | F | F |
| 7  | D | D | D | D | D | D | D | D | D | F | F | F | F | F |
| 8  | F | F | F | F | F | F | F | F | F | F | F | F | F | U |
| 9  | F | F | F | F | F | F | F | F | F | F | F | F | U | U |
| 10 | F | U | U | U | U | U | U | U | U | U | U | U | U | U |
| 11 | F | F | U | U | U | U | U | U | U | U | U | U | U | U |
| 12 | F | F | F | U | U | U | U | U | U | U | U | U | U | U |
| 13 | F | F | F | F | U | U | U | U | U | U | U | U | U | U |
| 14 | F | F | F | F | F | U | U | U | U | U | U | U | U | U |
| 15 | F | F | F | F | F | F | U | U | U | U | U | U | U | U |
| 16 | D | F | F | F | F | F | F | F | F | F | F | F | F | F |
| 17 | D | D | F | F | F | F | F | F | F | F | F | F | F | F |
| 18 | D | D | D | F | F | F | F | F | F | F | F | F | F | F |
| 19 | D | F | F | F | F | F | F | F | F | F | F | F | F | U |
| 20 | D | D | F | F | F | F | F | F | F | F | F | F | F | U |
| 21 | D | D | D | F | F | F | F | F | F | F | F | F | F | U |
| 22 | D | F | F | F | F | F | F | F | F | F | F | F | U | U |
| 23 | D | D | F | F | F | F | F | F | F | F | F | F | U | U |
| 24 | D | D | D | F | F | F | F | F | F | F | F | F | U | U |
| 25 | D | F | F | F | F | F | F | F | F | F | F | U | U | U |
| 28 | D | D | F | F | F | F | F | F | F | F | F | U | U | U |
| 27 | D | D | D | F | F | F | F | F | F | F | F | U | U | U |

TABLE 41-continued

| | Symbol number in a slot | | | | | | | | | | | | | |
|---|---|---|---|---|---|---|---|---|---|---|---|---|---|---|
| Format | 0 | 1 | 2 | 3 | 4 | 5 | 6 | 7 | 8 | 9 | 10 | 11 | 12 | 13 |
| 28 | D | D | D | D | D | D | D | D | D | D | D | D | F | U |
| 29 | D | D | D | D | D | D | D | D | D | D | D | F | F | U |
| 30 | D | D | D | D | D | D | D | D | D | D | F | F | F | U |
| 31 | D | D | D | D | D | D | D | D | D | D | D | F | U | U |
| 32 | D | D | D | D | D | D | D | D | D | D | F | F | U | U |
| 33 | D | D | D | D | D | D | D | D | D | F | F | F | U | U |
| 34 | D | F | U | U | U | U | U | U | U | U | U | U | U | U |
| 35 | D | D | F | U | U | U | U | U | U | U | U | U | U | U |
| 36 | D | D | D | F | U | U | U | U | U | U | U | U | U | U |
| 37 | D | F | F | U | U | U | U | U | U | U | U | U | U | U |
| 38 | D | D | F | F | U | U | U | U | U | U | U | U | U | U |
| 39 | D | D | D | F | F | U | U | U | U | U | U | U | U | U |
| 40 | D | F | F | F | U | U | U | U | U | U | U | U | U | U |
| 41 | D | D | F | F | F | U | U | U | U | U | U | U | U | U |
| 42 | D | D | D | F | F | F | U | U | U | U | U | U | U | U |
| 43 | D | D | D | D | D | D | D | D | D | F | F | F | F | U |
| 44 | D | D | D | D | D | D | F | F | F | F | F | F | U | U |
| 45 | D | D | D | D | D | D | F | F | U | U | U | U | U | U |
| 46 | D | D | D | D | D | F | U | D | D | D | D | D | F | U |
| 47 | D | D | F | U | U | U | U | D | D | F | U | U | U | U |
| 48 | D | F | U | U | U | U | U | D | D | F | U | U | U | U |
| 49 | D | D | D | D | F | F | U | D | D | D | D | F | F | U |
| 50 | D | D | F | F | U | U | U | D | D | F | F | U | U | U |
| 51 | D | F | F | U | U | U | U | D | D | F | U | U | U | U |
| 52 | D | F | F | F | F | F | U | D | F | F | F | F | F | U |
| 53 | D | D | F | F | F | F | U | D | D | F | F | F | F | U |
| 54 | F | F | F | F | F | F | F | D | D | D | D | D | D | D |
| 55 | D | D | F | F | F | U | U | U | D | D | D | D | D | D |
| 56-254 | | | | | | Reserved | | | | | | | | |
| 255 | UE determines the slot format for the slot based on TDD-UL-DL-ConfigurationCommon, or TDD-UL-DL-ConfigDedicated and, if any, on detected DCI formats | | | | | | | | | | | | | |

Figure 18:
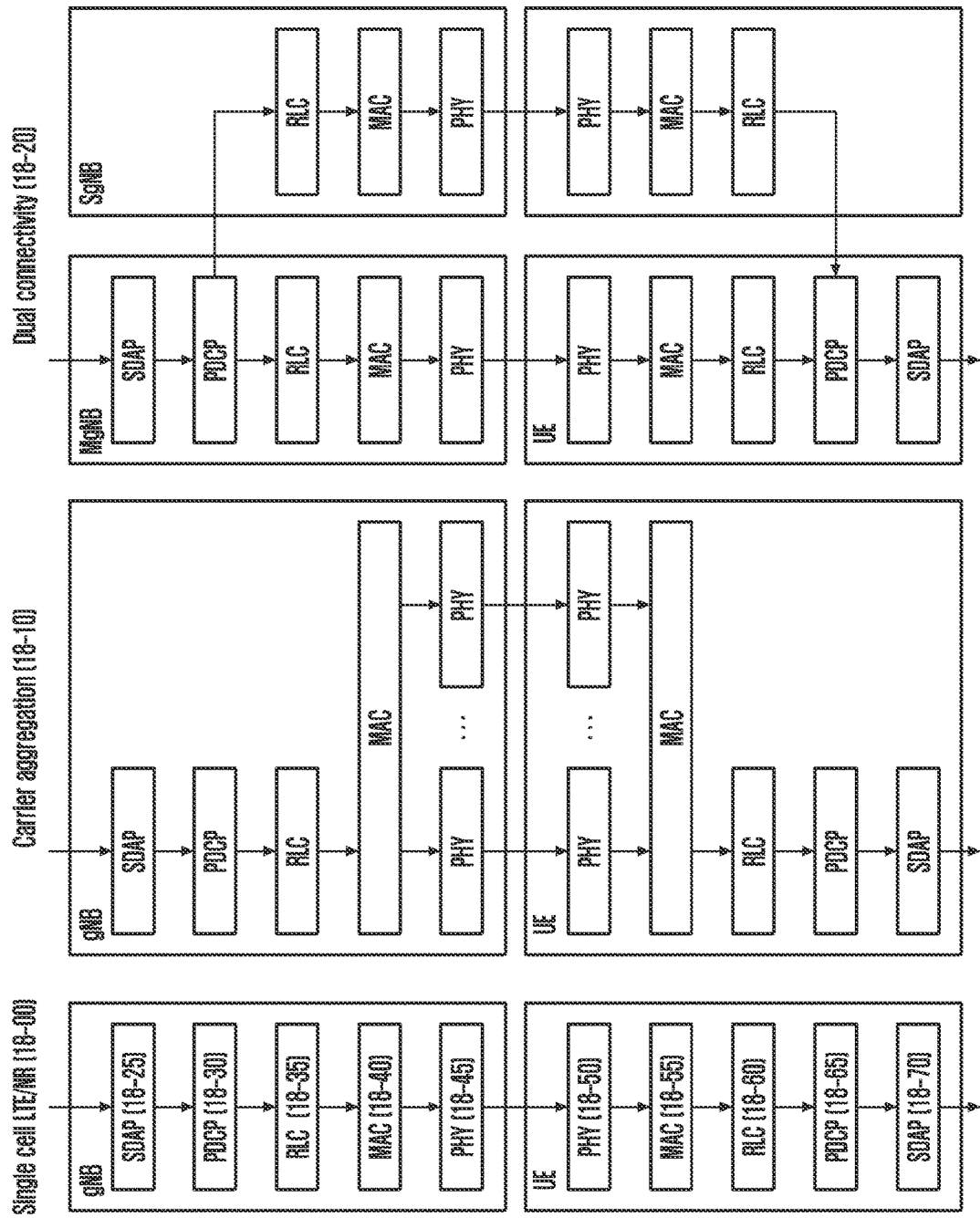
FIG. 18 is a diagram illustrating a radio protocol structure of a base station and a terminal when performing single cell, carrier aggregation, and dual connectivity according to an embodiment of the disclosure.

FIG. 18 is a diagram illustrating a radio protocol structure of a base station and a terminal when performing single cell, carrier aggregation, and dual connectivity according to an embodiment of the disclosure.

Referring to FIG. 18, the wireless protocols of the next-generation mobile communication system includes service data adaptation protocol (NR SDAP) 18-25, 18-70, packet data convergence protocol (NR PDCP) 18-30, 18-65, radio RLC link control (NR RLC) 18-35, 18-60, and medium access control (NR MAC) 18-40, 18-55 in the terminal and the NR base station, respectively.

The main functions of the NR SDAPs 18-25, 18-70 may include some of the following functions.
  Transfer of user plane data
  Mapping between a QoS flow and a DRB for both DL and UL for uplink and downlink
  Marking QoS flow ID in both DL and UL packets for uplink and downlink
  A function of mapping a reflective QoS flow to a data bearer for uplink SDAP PDUs (reflective QoS flow to DRB mapping for the UL SDAP PDUs)

With respect to the SDAP layer device, the terminal may receive an RRC message to determine whether to use the header of the SDAP layer device or whether to use the function of the SDAP layer device for each PDCP layer device, for each bearer, or for each logical channel. When the SDAP header is set, the base station may indicate the terminal to update or reconfigure mapping information for uplink and downlink QoS flows and data bearers with NAS QoS reflection setting 1-bit indicator of SDAP header (NAS reflective QoS) and AS QoS reflection setting 1-bit indicator (AS reflective QoS). The SDAP header may include QoS flow ID information indicating QoS. The QoS information may be used as data processing priority and scheduling information to support a smooth service.

The main functions of the NR PDCPs 9-30 and 9-65 may include some of the following functions.
  Header compression and decompression (ROHC only)
  Transfer of user data
  In-sequence delivery of upper layer PDUs
  Out-of-sequence delivery of upper layer PDUs
  Reordering function (PDCP PDU reordering for reception)
  Duplicate detection of lower layer SDUs
  Retransmission of PDCP SDUs
  Encryption and decryption function (Ciphering and deciphering)
  Timer-based SDU discard in uplink In the above, the reordering function of the NR PDCP device refers to a function of reordering PDCP PDUs received from a lower layer in order based on a PDCP sequence number (SN), may include a function of delivering data to a higher layer in the rearranged order, may include a function of directly delivering or without considering the order, may include a function of reordering the order to record lost PDCP PDUs, may include a function of reporting a status on the lost PDCP PDUs to the transmitting side, or may include a function of requesting retransmission for the lost PDCP PDUs.

The main functions of the NR RLCs 18-35, 18-60 may include some of the following functions.
  Data transfer function (Transfer of upper layer PDUs)
  In-sequence delivery of upper layer PDUs
  Out-of-sequence delivery of upper layer PDUs
  ARQ function (Error Correction through ARQ)
  Concatenation, segmentation and reassembly of RLC SDUs
  Re-segmentation of RLC data PDUs
  Reordering of RLC data PDUs Duplicate detection Protocol error detection RLC SDU discard function (RLC SDU discard)

RLC re-establishment function (RLC re-establishment)

In the above, in-sequence delivery of the NR RLC device refers to a function of sequentially delivering RLC SDUs received from a lower layer to an upper layer, may include a function of reassembling and delivering when one RLC SDU is originally divided into several RLC SDUs and received, may include a function of rearranging the received RLC PDUs based on an RLC sequence number (SN) or a PDCP sequence number (SN), may include a function of reordering the order to record lost RLC PDUs, may include a function of performing a status report on the lost RLC PDUs to the transmitting side, may include a function of requesting retransmission for lost RLC PDUs, may include a function of sequentially delivering only RLC SDUs before the lost RLC SDU to a higher layer when there is a lost RLC SDU, may include a function of sequentially delivering all RLC SDUs received before the timer starts to a higher layer if a predetermined timer expires even if there is a lost RLC SDU, or may include a function of sequentially delivering all RLC SDUs received so far to a higher layer if a predetermined timer expires even if there is a lost RLC SDU. In addition, the RLC PDUs may be processed in the order in which they are received (in the order of arrival, regardless of the sequence number and sequence number) and delivered to the PDCP device out-of-sequence (out-of-sequence delivery), and when the received RLC PDU is a segment, segments stored in the buffer or to be received may be received, reconstructed into one complete RLC PDU, processed, and delivered to the PDCP device. The NR RLC layer may not include a concatenation function, and the function may be performed in the NR MAC layer or replaced with a multiplexing function of the NR MAC layer.

In the above, out-of-sequence delivery of the NR RLC device refers to a function of directly delivering RLC SDUs received from a lower layer to a higher layer regardless of order, may include a function of reassembling and delivering when one RLC SDU is originally divided into several RLC SDUs and received, and may include a function of storing the RLC SN or PDCP SN of the received RLC PDUs, arranging the order, and recording the lost RLC PDUs.

The NR MACs 18-40 and 18-55 may be connected to several NR RLC layer devices configured in one terminal, and the main function of the NR MAC may include some of the following functions.

Mapping function (Mapping between logical channels and transport channels)

Multiplexing/demultiplexing of MAC SDUs

Scheduling information reporting function

HARQ function (Error correction through HARQ)

Priority handling between logical channels of one terminal

Priority handling between terminals by means of dynamic scheduling

MBMS service identification

Transport format selection

Padding function

The NR PHY layer 18-45, 18-50 may perform of channel-coding and modulating the upper layer data, making OFDM symbols and transmitting them over a wireless channel, or demodulating an OFDM symbol received through a radio channel and channel-decoding to transmit the OFDM symbol to a higher layer.

The detailed structure of the radio protocol structure may be variously changed according to a carrier (or cell) operating method. For example, when the base station transmits data to the terminal based on a single carrier (or cell), the base station and the terminal use a protocol structure having a single structure for each layer, such as 18-00. On the other hand, when the base station transmits data to the terminal based on carrier aggregation (CA) using multiple carriers in a single TRP, the base station and the terminal have a single structure up to RLC as in 18-10, but use a protocol structure for multiplexing the PHY layer through the MAC layer. As another example, when the base station transmits data to the terminal based on DC (dual connectivity) using multiple carriers in multi TRP, the base station and the terminal have a single structure up to RLC like 18-20, but use a protocol structure for multiplexing the PHY layer through the MAC layer.

Meanwhile, in the LTE and NR systems, the terminal may perform a procedure of reporting UE capability (or terminal capability) supported by the terminal to the corresponding base station while connected to the serving base station. Hereinafter, this is referred to as UE capability (reporting). The base station may transmit a message (e.g., UE capability enquiry message) for requesting UE capability report to the terminal in the connected state. The message may include a UE capability report request for each radio access technology (RAT) type of the base station. The UE capability report request for each RAT type may include frequency band information for requesting UE capability of the terminal.

In this case, the RAT type may include, for example, nr, eutra-nr, eutra, and the like. The base station may indicate at least one of nr, eutra-nr, and eutra to request a UE capability report of the terminal. In addition, the terminal may indicate at least one of nr, eutra-nr, and eutra for a RAT type that the terminal may support, and report the UE capability to the base station.

For example, when the RAT type included in the UE capability enquiry message indicates nr, the terminal supporting NR-based wireless communication may report UE capability by including a RAT type indicating nr in a message (e.g., UE capability information message) reporting UE capability.

As another example, when the RAT type included in the UE capability enquiry message indicates eutra-nr, the terminal supporting (NG) EN-DC (E-UTRA NR dual connectivity (covering E-UTRA connected to EPC or 5GC)) or NE-DC (NR E-UTRA dual connectivity) may report UE capability including the RAT type indicating eutra-nr in a message (e.g., UE capability information message) reporting UE capability.

In addition, the UE capability enquiry message may request UE capability report for a plurality of RAT types through one RRC message container. Alternatively, the base station may include a UE capability enquiry message including a UE capability report request for each RAT type a plurality of times in one RRC message and transmit it to the terminal. For example, a terminal receiving an RRC message including a plurality of UE capability enquiry messages may configure a UE capability information message corresponding to each UE capability report request and report (transmit) the configured UE capability information message to the base station multiple times.

In the next-generation mobile communication system, a UE capability request for multi-radio dual connectivity (MR-DC) including NR, LTE, E-UTRA-NR dual connectivity (EN-DC) may be performed. The UE capability enquiry message is generally sent initially after the terminal establishes a connection, but may be requested by the base station when necessary, based on an arbitrary condition.

Upon receiving the UE capability report request from the base station (or receiving the UE capability enquiry message), the terminal may configure UE capability according to the RAT type and band information requested from the base station. Hereinafter, a method for the terminal to configure UE capability in the NR system will be described.

Operation 1. If the terminal is provided with a list of at least one band between the LTE and NR systems through the UE capability report request from the base station, the terminal may configure a band combination (BC) for EN-DC and NR stand alone (SA). For example, based on the bands that have requested UE capability report through list information (e.g., FreqBandList) included in the UE capability enquiry message received from the base station, the terminal may configure a BC candidate list (first BC candidate list) for EN-DC and NR SA. In addition, the priorities of the bands may have priorities in the order described in the FreqBandList.

Operation 2. If the base station requests UE capability report by setting the "eutra-nr-only" flag or "eutra" flag in the message requesting UE capability report, the terminal may remove BCs for NR SA from the candidate list of BCs configured in operation 1. Alternatively, this operation may occur only when an LTE base station (eNB) requests "eutra" capability.

Operation 3. The terminal may remove fallback BCs from the candidate list of BCs configured in the above step. Here, fallback BC may mean BC in which a band corresponding to at least one secondary cell (SCell) is removed from a certain super set BC. Since the super set BC can already cover the fallback BC, the fallback BC can be omitted. Operation 3 may also be applied to multi-RAT dual connectivity (MR-DC). For example, LTE bands may also be applied. BCs remaining after operation 3 may be referred to as "final candidate BC list" (second BC candidate list).

Operation 4. The terminal may select BCs to be reported by selecting BCs corresponding to the requested RAT type from the "final candidate BC list". In operation 4, the terminal may configure a list (e.g., supportedBandCombinationList) including the BCs selected by the terminal in order. For example, the terminal may configure BC list and UE capability to be reported according to the preset RAT-Type order. (e.g., nr→eutra-nr→eutra).

In operations 1 to 4, the terminal may configure a featureSetCombination for each BC included in the configured supportedBandCombinationList, and configure a list (e.g., featureSetCombinations) including each featureSetCombination. In this case, the featureSetCombination may mean a set of feature sets for each band within the selected BC, and the feature set may mean a set of capabilities supported by the terminal in carriers within a specific band.

in addition, the terminal may compare each BC and feature set combination for each BC with respect to the supportedBandCombinationList. At this time, a specific BC, for example, BC #X may include all the bands of the BC, for example BC #Y, to be compared, and when the feature set combination of BC #X consists of a capability of the same or higher level than the feature set combination of BC #Y, the BC #Y may be defined as a fallback BC of BC #X. After finding all fallback BCs in the band combination list according to the above-described comparison procedure, a new BC list from which all of the fallback BCs are removed may be configured, and a list of "candidate feature set combinations" for each of these BCs may be configured. The "candidate feature set combination" may include both feature set combinations for NR and EUTRA-NR BC, and may be configured based on the feature set combination of UE-NR-Capabilities and UE-MRDC-Capabilities containers.

Operation 5. If the RAT Type requested from the base station is eutra-nr, featureSetCombinations may be included in two containers: UE-MRDC-Capabilities and UE-NR-Capabilities. However, the NR feature set may include only UE-NR-Capabilities.

However, the above-described operations are merely examples and are not limited thereto. Accordingly, according to an embodiment, some operations may be omitted or other operations may be added.

After the UE capability is configured, the terminal may transmit a UE capability information message including the UE capability to the base station. The base station may perform scheduling and transmission/reception management to the terminal, based on the UE capability information received from the terminal.

Figure 19:
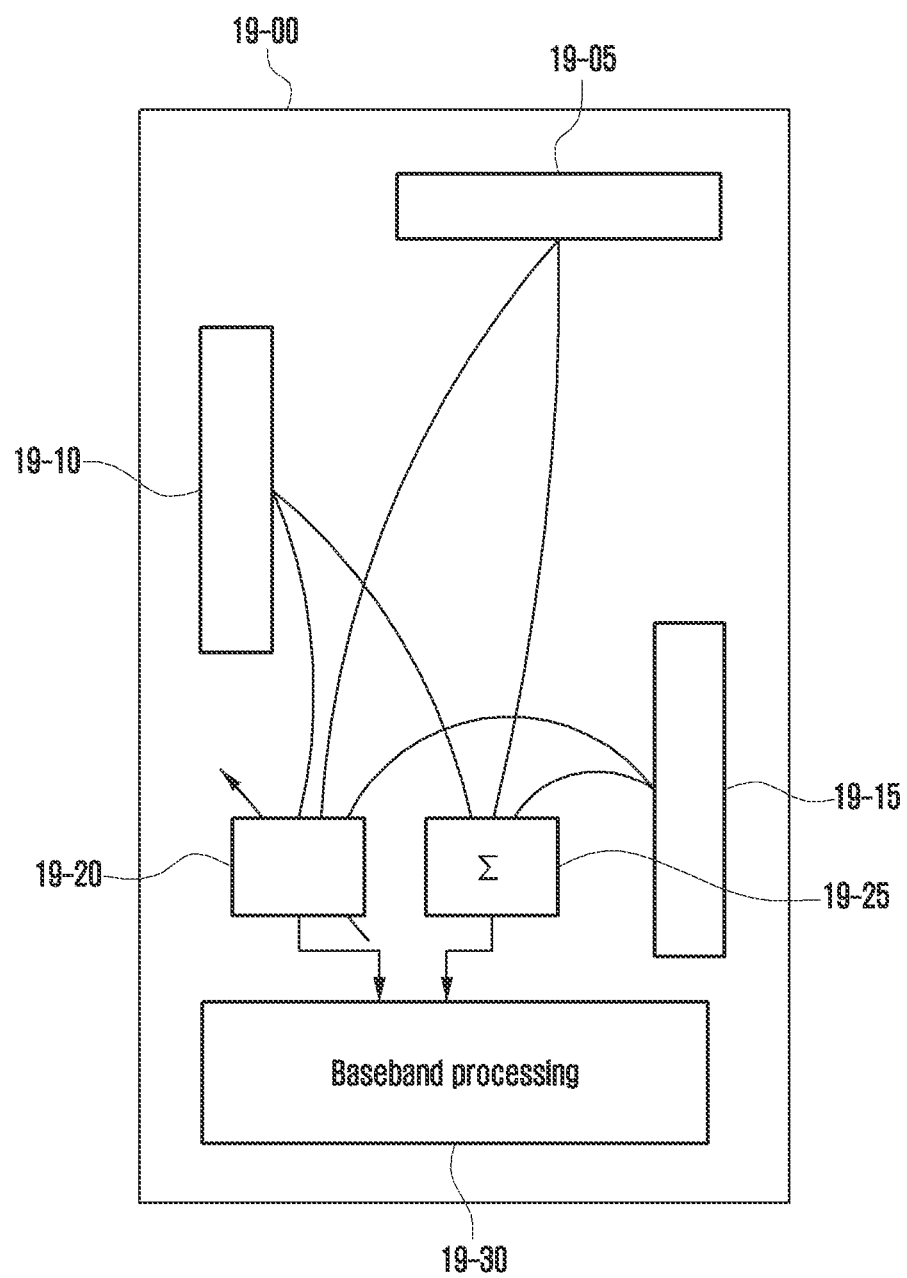
FIG. 19 is a diagram illustrating a structure of a signal processing apparatus including an antenna port, an antenna panel, and a baseband processor of a terminal according to an embodiment of the disclosure.

FIG. 19 is a diagram illustrating a structure of a signal processing apparatus including an antenna port of a terminal, an antenna panel, and a baseband processor according to an embodiment of the disclosure.

Referring to FIG. 19, the terminal 19-00 may be configured with a plurality of antenna ports or panels 19-05, 19-10, and 19-15. In FIG. 19, the terminal is shown as having three antenna ports or a panel structure, but this is an example. In an actual application, all terminals need not be limited thereto, and it is possible to use a larger or smaller number of antenna ports or panel structures. The plurality of antenna ports or panels may be connected to an antenna port/panel selection module (antenna selection module) 19-20 or may be connected to a baseband processing module 19-30 through an antenna port/panel gain combining module (antenna combining module/MIMO module) 19-25 or the like, according to various environments and conditions such as the manufacturing cost of the terminal, the target performance, the operating frequency band such as FR1 or FR2, etc. For convenience of explanation, in the following description, modules such as an antenna port/panel selection module (antenna selection module) 19-20 and an antenna port/panel gain combining module (antenna combining module/MIMO module) 19-25 will be collectively referred to as an "antenna signal processor". The signal processor (baseband processing module) 19-30 may receive an RF signal or digital signal that has passed through the antenna signal processor, measure a reference signal according to the above-described procedure, perform a TCI/QCL procedure, or measure data symbols to demodulate data. Most of the existing terminals select and use one of: the antenna port/panel selection module 19-20 for the purpose of power consumption reduction or complexity/cost reduction, or an antenna port/panel gain combining module (MIMO module) 19-25 for the purpose of expanding wireless communication coverage or capacity.

Meanwhile, in the case of future terminals, it is possible to simultaneously implement a plurality of antenna signal processors or to introduce a complex antenna signal processor capable of performing various functions in order to appropriately obtain the various gains according to antenna selection/combination/combination depending on the situation. The module size of the antenna port/panel and the minimum required distance between each module become shorter in inverse proportion to the frequency (in proportion to the wavelength) as the number of antenna ports/panels of one terminal gradually increases as the frequency operation band of wireless communication increases (for example, FR2 band over 6 GHz or FR4 band over 52.6 GHz), so that this trend will be accelerated.

In a 5G or NR wireless communication system, handover of the terminal does not occur frequently in an environment in which the mobility of the terminal is small, and the time variability of the channel is relatively low. Meanwhile, in an environment where the mobility of terminals is very high, such as terminals in vehicles on high speed trains and highways, there is a problem in that not only large signaling overhead is involved due to frequent handovers, but also reception reliability is greatly reduced due to large channel time variability of the terminal due to high Doppler shift and Doppler spread. In order to solve the above problems, in the disclosure, a single frequency network (SFN) transmission scheme that a plurality of base stations, cells, or transmission points (hereinafter, transmission reception point (TRP)) transmit the same downlink signal in the same time and frequency resource, thereby reducing the number of handovers and increasing the reception power of a received signal at the same time may be considered.

Meanwhile, when the relative speed between each TRP and the terminal transmitted in the SFN method is different from each other, the received signal of the terminal has a plurality of Doppler shift components corresponding to each relative speed. In this case, the received signal may mean not only PDSCH and PDCCH, but also DM-RS, CSI-RS, TRS, etc. of PDSCH or PDCCH. Detecting each Doppler shift component from the received signal and decoding data requires a high reception complexity of the terminal. In particular, in an environment where TRPs are arranged in a line at the front and rear of the terminal, such as in high-speed trains, and the relative speed difference between each TRP and the terminal is large, higher terminal reception complexity is required. The disclosure proposes a method of lowering the terminal reception complexity by allowing the terminal to undergo only a single Doppler shift by transmitting a signal after TRPs participating in SFN transmission pre-compensate the Doppler shift.

Embodiment 1: Doppler Shift Pre-Compensation Method of SFN Transmission TRP

This embodiment provides a method of pre-compensating for Doppler shift experienced by the terminal by TRPs participating in SFN transmission.

Figure 20A:
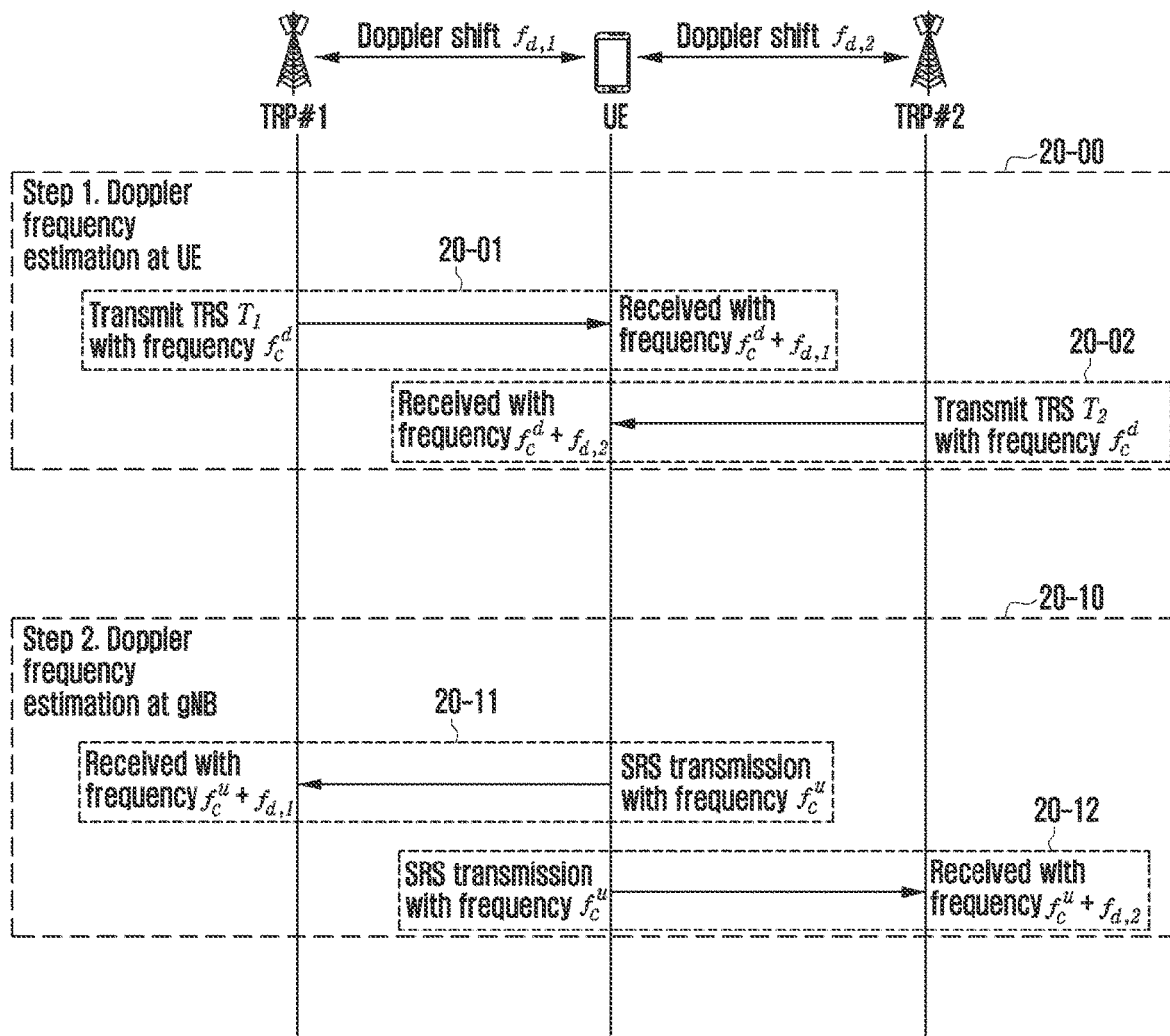
FIG. 20A is a sequence diagram illustrating a method of pre-compensating for Doppler shift experienced by the terminal in TRP according to an embodiment of the disclosure.
Figure 20B:
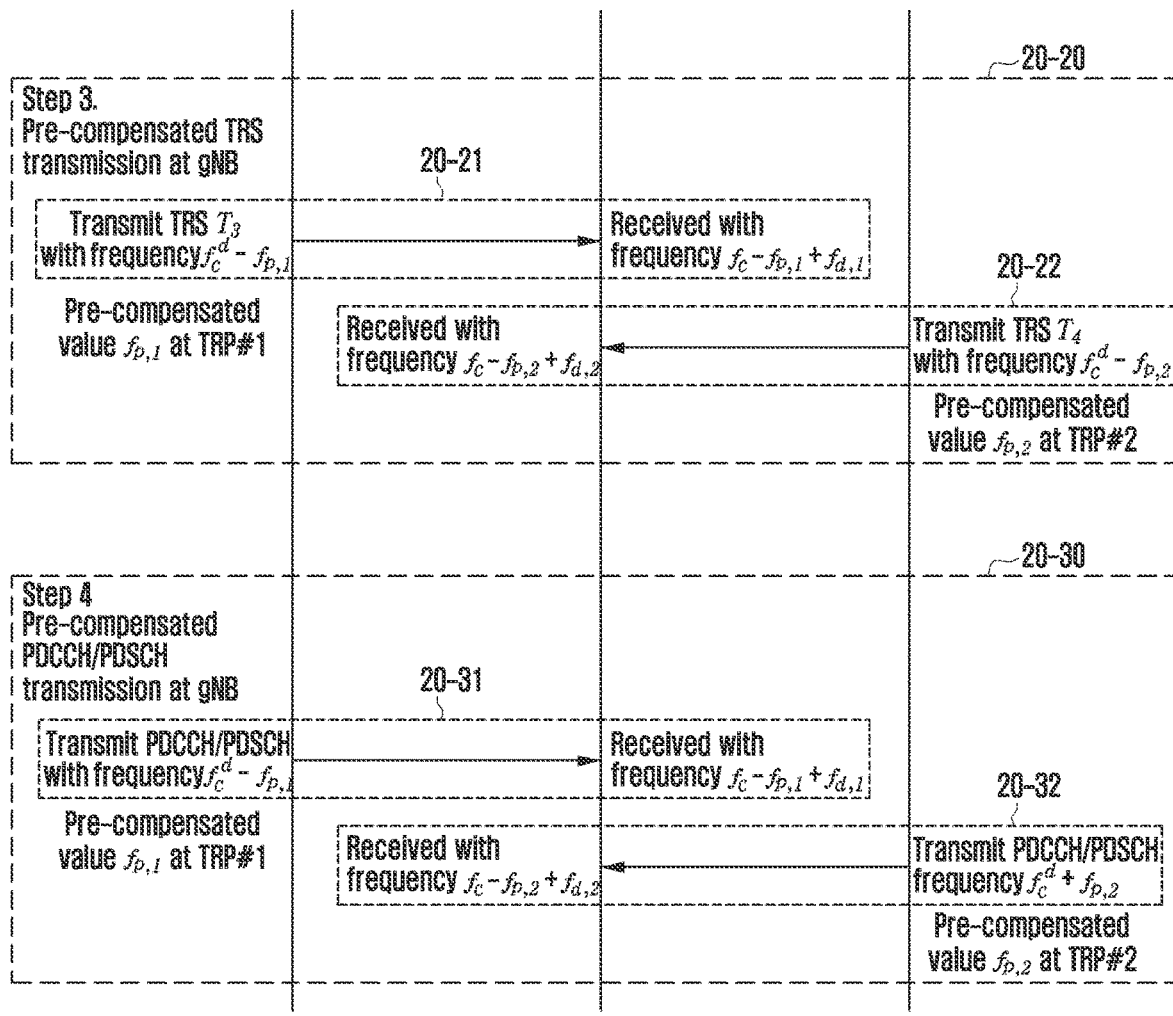
FIG. 20B is a sequence diagram illustrating a method of pre-compensating for Doppler shift experienced by the terminal in TRP according to an embodiment of the disclosure.

FIGS. 20A to 20B are sequence diagrams illustrating a method of pre-compensating for Doppler shift experienced by the terminal in TRP according to various embodiments of the disclosure.

Referring to FIGS. 20A to 20B, it is assumed that TRPs participating in SFN transmission are two TRP #1 and TRP #2, but this is only an example, and this embodiment may be applied to a case where the number of TRPs is three or more.

The Doppler shift pre-compensation may be largely composed of four steps.

In the first operation 20-00, the terminal may measure the Doppler shift of the channel between the TRP and the terminal (20-21, 20-22). More specifically, in the first step, TRPs participating in SFN transmission may transmit a tracking reference signal (TRS) to the terminal through the carrier frequency $f_c^d$ for Doppler shift measurement of the terminal 20-01, 20-02. At this time, TRS transmitted from TRP #1, that is, TRS transmitted from T1 and TRP #2, that is, T2 may be resources independent of each other (T1≠T2) or the TRSs may be the same resource that is transmitted simultaneously (transmitted SFN) (T1=T2). In the former case (T1≠T2), the terminal may measure the Doppler shift of the channel between the TRP and the terminal from each TRS. Referring to FIG. 20A, the terminal measures $f_{d,1}$ which is a Doppler shift between TRP #1 and the terminal from T1, and may measure $f_{d,2}$, which is a Doppler shift between TRP #2 and the terminal from T2. In the latter case (T1=T2), since the corresponding TRS undergoes Doppler shift from multiple TRPs, for example, $f_{d,1}$ and $f_{d,2}$ together, the terminal may measure both $f_{d,1}$ and $f_{d,2}$ from the corresponding TRS.

In the second operation 20-10, the base station may measure the Doppler shift of the channel between the TRP and the terminal. More specifically, in the second step, the terminal may transmit uplink resources, such as a sounding reference signal (SRS), to TRP #1 and TRP #2 for Doppler shift measurement of the base station 20-11, 20-12. The terminal may transmit different SRS resources to each TRP, or may transmit the same SRS to all TRPs. The carrier frequency used by the terminal when transmitting the uplink resource may be expressed as $f_c^u$. TRP #1 and TRP #2 receive the SRS, and when each TRP knows the uplink carrier frequency of the terminal, $f_{d,1}$, $f_{d,2}$, which are Doppler shifts between TRP-terminal channels, can be confirmed from the SRS, respectively. If each TRP does not know the uplink carrier frequency of the terminal, after measuring the received carrier frequency for each TRP from the SRS, the base station may identify the difference value $f_{d,1}-f_{d,2}$ of the Doppler shift from the difference in the received carrier frequency for each TRP.

In the third operation 20-20, the Doppler shift in each TRP may be pre-compensated (pre-compensated) TRS may be transmitted to the terminal 20-20. The 'Doppler shift pre-compensation' means that a specific frequency value is subtracted from the carrier frequency $f_c^d$ of the TRP transmission signal in consideration of the Doppler shift experienced by the terminal. For example, a frequency value subtracted from TRP #1 may be referred to as $f_{p,1}$, and a frequency value subtracted from TRP #2 may be referred to as $f_{p,2}$. The $f_{p,1}$ and $f_{p,2}$ values may be determined based on the Doppler shift value estimated by the base station in the second step. For example, when the base station knows both the Doppler shifts $f_{d,1}$ and $f_{d,2}$, it may be determined as $f_{p,1}=f_{d,1}$ and $f_{p,2}=f_{d,2}$. As another example, when the base station knows the difference value $f_{d,1}-f_{d,2}$ of the Doppler shift, it may be determined as $f_{p,1}=0$ and $f_{p,2}=f_{d,1}-f_{d,2}$. If the pre-compensated TRS transmitted by TRP #1 and TRP #2 are named T3 and T4, respectively, T3 and T4 may be independent resources (T3≠T4), or the TRSs may be the same resource that is transmitted simultaneously (transmitted SFN) (T3=T4). Alternatively, the TRS of the first stage and the TRS of the third stage may be TRSs having different IDs. Alternatively, the TRS may be expressed by the same ID and transmitted at different times. For example, T1 and T3 may have the same ID (e.g., the same CSI-RS-Resource-Set ID), but may be TRS resources transmitted at different times, and the relationship between T2 and T4 may be the same as the relationship between T1 and T3.

The terminal may receive the pre-compensated TRS and measure the Doppler shift value after pre-compensation. Meanwhile, if T3 and T4 are independent resources, the terminal may measure the Doppler shift for TRP #1 from T3, for example, $f_{p,1}-f_{d,1}$, and may measure the Doppler shift for TRP #2, for example, $f_{p,2}-f_{d,2}$ from T4. When T3 and T4 are the same resource, the terminal may measure both the Doppler shift components of the two TRPs, that is, $f_{p,1}-f_{d,1}$ and $f_{p,2}-f_{d,2}$ from the corresponding TRS. According to an embodiment, the third operation may be omitted, and details will be described later.

In the fourth operation 20-30, the PDCCH or PDSCH in which the Doppler shift is pre-compensated in each TRP may be transmitted to the terminal (20-31, 20-32). In the disclosure, transmitting or receiving a PDCCH may mean transmitting or receiving a DCI through the PDCCH. Also, in the disclosure, transmitting or receiving the PDSCH may mean transmitting or receiving data through the PDSCH. Meanwhile, the base station may determine whether to compensate the Doppler shift in advance according to circumstances. For example, when the speed of the terminal is dynamically changed, the precompensation of the Doppler shift may not be performed when the terminal is at a low speed, whereas the precompensation of the Doppler shift may be performed when the terminal is at a high speed. At this time, since the reception operation of the terminal may be different depending on whether or not the Doppler shift is pre-compensated, the base station may notify the terminal of whether or not the Doppler shift is pre-compensated when transmitting the PDCCH or the PDSCH. A specific notification method will be described later. In addition, the value for which the Doppler shift is pre-compensated for each TRP may be the value described in the second step. Meanwhile, the PDCCH or PDSCH transmission may be SFN transmission. That is, the same PDCCH or PDSCH may be transmitted in the same time/frequency transmission resource for each TRP.

However, the above-described operations are merely examples and are not limited thereto. Accordingly, according to an embodiment of the disclosure, some operations may be omitted or other operations may be added.

Hereinafter, details of the aforementioned pre-compensation operation will be described.

Embodiment 2: Method of Transmitting a Terminal Uplink Signal for Measuring Doppler Shift in a Base Station This embodiment discloses details of the second operation of the first embodiment.

When the terminal transmits an uplink signal for measuring Doppler shift in the base station, the uplink carrier frequency $f_c^u$ used for signal transmission may be determined based on the carrier frequency estimated through at least one of SSB and TRS received by the terminal from the base station. If, as in the first operation of Embodiment 1, multiple TRSs experiencing different Doppler shifts are configured in the terminal, or even if a single TRS resource is configured, if the corresponding resource has multiple Doppler shift components, a method of determining the uplink carrier frequency $f_c^u$, based on which TRS or which carrier frequency estimate may differ depending on the terminal implementation. For example, $f_c^u$ may be determined using a weighted average of carrier frequencies estimated through each TRS, and in this case, the weight may be the received power of each TRS. Alternatively, it is also possible to determine $f_c^u$ with the carrier frequency estimated through the TRS having the highest received power.

Therefore, in the second operation of the above-described embodiment 1, if the terminal does not know how $f_c^u$ is determined, each TRP cannot identify the $f_{d,1}$ and $f_{d,2}$, but only the difference between the two values $f_{d,1}-f_{d,2}$ can be identified. In this case, only prior compensation for the difference in Doppler shift between TRPs participating in SFN transmission may be possible, and there is a problem that prior compensation of Doppler shift occurring during single TRP transmission or DPS (dynamic point selection) transmission is impossible.

In order to overcome the above problem, the base station may need to know the $f_c^u$. As an example of a method for this, the following methods may be considered.

Method 1. The base station directly indicates the $f_c^u$ to terminal:

The base station may indicate the $f_c^u$ to the terminal through an L1 message, MAC-CE, or higher layer signaling. The $f_c^u$ value may be an absolute frequency value or a relative offset value with respect to a reference frequency of a band and a component carrier used for uplink transmission. Alternatively, the $f_c^u$ may be an incremental value for the uplink carrier frequency currently transmitted by the terminal. The above indication may be applied to all uplink signal transmission. Alternatively, the indication may be applied to a specific uplink signal transmission, for example, an uplink reference signal to be used in the second operation of the first embodiment.

Method 2. Designation of a downlink reference signal to be used for determining an uplink carrier of the terminal The base station may indicate to the terminal a downlink reference signal for determining the $f_c^u$. For example, the TRS transmitted in the first or third operation of Embodiment 1 is indicated to the terminal, and the terminal may determine $f_c^u$ based on the carrier frequency estimated from only the TRS. The carrier frequency estimated by the TRS may be transformed into various expressions such as a Doppler shift, an average Doppler shift, and an average frequency offset estimated by the TRS. Although the downlink reference signal indicated to the terminal has been described with a focus on TRS, it may be replaced with various other reference signals capable of estimating the carrier frequency, such as SSB or CSI-RS for channel estimation. Meanwhile, as a method of indicating the downlink reference signal to the terminal, the downlink reference signal may be mapped for each uplink resource to be transmitted by the terminal. In this case, the uplink resource may mean SRS, PUCCH, PUSCH, PRACH, and the like. The mapping may be in a form in which a target uplink resource refers to a channel characteristic of a source downlink reference signal, similar to the above-described TCI state. This may be used for new signaling, for example, UL TCI state, or a method for indicating a beam of uplink resources, for example, a method for indicating spatial relation info according to the related art. When the spatial relation info indication method is used, a downlink reference signal indicating a spatial domain transmission filter may be used together for an uplink carrier frequency indication. Alternatively, it may be assumed that the downlink reference signal for the terminal to determine the $f_c^u$ is a specific reference signal, for example, an SSB used for initial access, or a TRS having the lowest CSI-RS-ResourceSet ID among TRSs.

As an example of method 2, the base station may map the TRS (T1) of TRP #1 to the SRS resource for the second operation in Embodiment 1 of the terminal. This may mean that the base station instructs the terminal to use $f_c^d+f_{d,1}$, which is the carrier frequency estimate value of T1, as the uplink carrier frequency when the terminal transmits the SRS. Since TRP #1 will receive the SRS as $f_c^d+f_{d,1}+f_{d,1}$, the Doppler shift $f_{d,1}$ may be estimated by subtracting $f_c^d$, which is its downlink transmission frequency, from the SRS reception frequency.

The above-described methods are merely examples and are not limited thereto. Accordingly, various embodiments such as modifications, based on the listed methods or combinations of the listed methods may be possible. For example, when the downlink reference signal is not mapped to the uplink transmission resource, the terminal may use method 1, and if the downlink reference signal is mapped, the terminal may use method 2. In addition to this, various embodiments are possible, but not all methods are listed.

Embodiment 3: Transmission Method of TRS in which Doppler Shift is Pre-Compensated in TRP This embodiment discloses details of the third operation of the first embodiment.

The base station can improve the estimation accuracy for the Doppler shift of the PDSCH/PDCCH to be received by the terminal in the fourth operation by transmitting the pre-compensated TRS to the terminal. However, when a large number of high-speed mobile terminals exist in the network, the relative speeds with respect to the TRP for each terminal may all be different. This means that the Doppler shift values to be pre-compensated for each terminal are all different, and it means that the pre-compensated TRS must be transmitted individually for each terminal Since this causes a very large increase in TRS overhead, in this embodiment, a method of reducing the overhead of the pre-compensated TRS is presented together with the pre-compensation method of the TRS.

Figure 21:
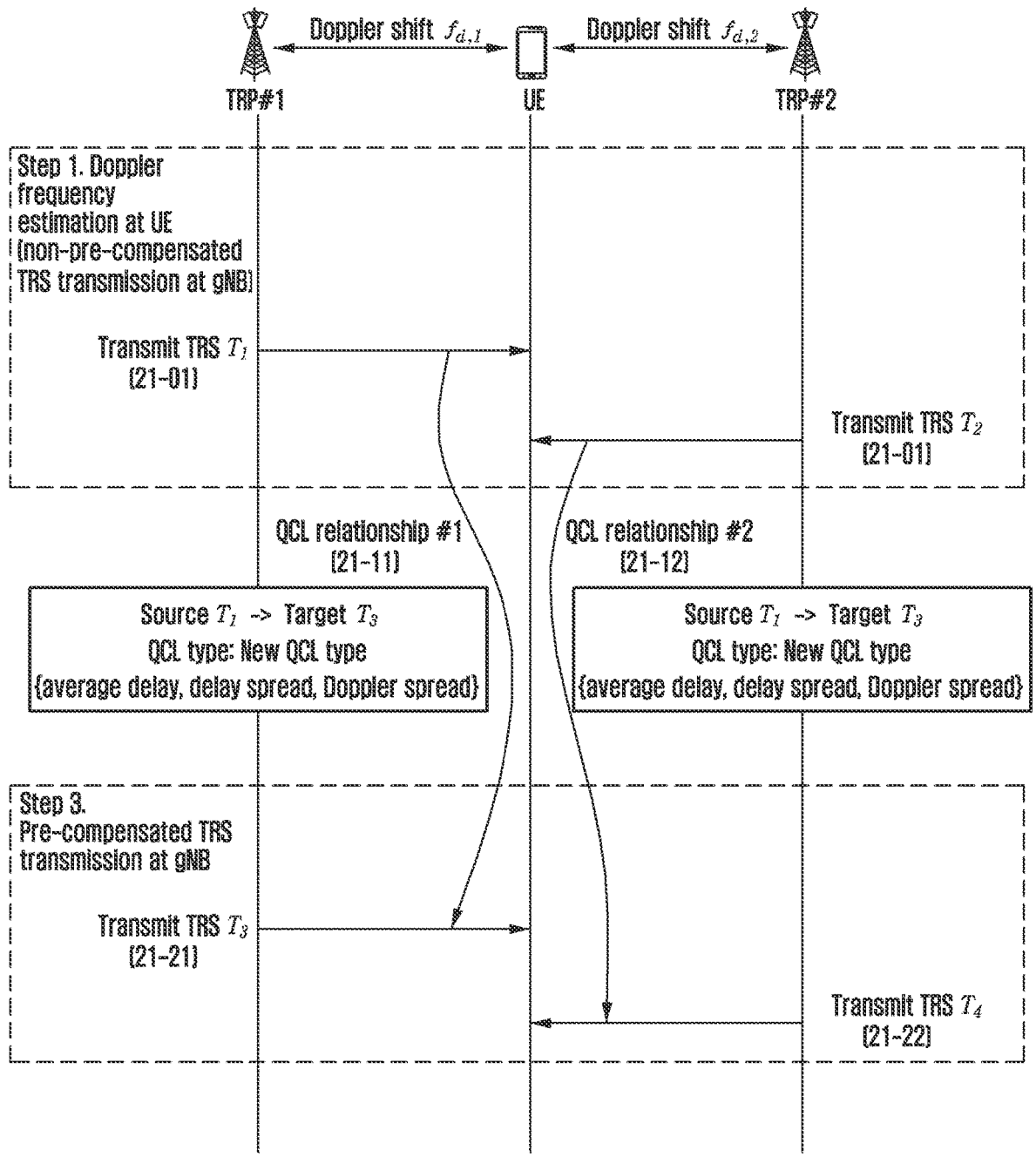
FIG. 21 is a sequence diagram illustrating a pre-compensated TRS transmission method according to an embodiment of the disclosure.

FIG. 21 is a sequence diagram illustrating a pre-compensated TRS transmission method according to an embodiment of the disclosure.

The base station may transmit the pre-compensated TRS T3 and T4 (21-21 and 21-22) to the terminal, apart from the non-pre-compensated TRS T1 and T2 (21-01 and 21-02) transmitted to the terminal in the first operation of Example 1. At this time, T3 and T4 may be separate TRS resources transmitted in each TRP, or may be transmitted in the form of SFN for the same TRS resource in each TRP. The base station may notify whether the Doppler shift of the TRS is compensated in advance in order to reduce the TRS reception complexity of the terminal. The pre-compensated TRS may share specific channel characteristics with the non-pre-compensated TRS (e.g., share at least one of average delay, delay spread, Doppler spread, and Spatial Rx parameters), but may have a specific non-shared channel characteristic (e.g., Doppler shift). Therefore, the base station may inform the terminal that the TRS has been pre-compensated and the channel characteristics for measuring the TRS by indicating the QCL relationship (21-11, 21-12) for the non-pre-compensated TRS and the shared channel characteristic with respect to the pre-compensated TRS.

As described above in the QCL framework, in the (non-pre-compensated) periodic TRS resource, another TRS is not indicated as a QCL reference according to the related art. Therefore, when the QCL reference for a specific periodic TRS resource is indicated by another TRS, the terminal may determine that the corresponding periodic transmission TRS is a pre-compensated TRS. At this time, the QCL type indicated together may be at least one of the aforementioned channel characteristics, for example, average delay, delay spread, Doppler spread, and Spatial Rx parameter.

In addition, when the pre-compensated TRS is a TRS transmitted by SFN, two or more other TRS resources may be indicated as a QCL reference for the TRS. In this case, the two or more QCL reference resources may be TRS resources transmitted from different TRPs, for example, T1 and T2.

In addition, the channel characteristics referenced by each of the two or more QCL reference resources may be at least one of the above-described channel characteristics, for example, average delay, delay spread, Doppler spread, and Spatial Rx parameter. In addition, the QCL type may be a new type not previously defined. For example, the QCL type may be a type named QCL-typeE/QCL-typeF.

When two or more QCL reference resources are indicated, the terminal may appropriately combine channel characteristics of the above-described QCL reference resources for measurement of the pre-compensated TRS serving as the QCL target.

Meanwhile, as described above in the QCL framework, in the (non-pre-compensated) aperiodic TRS resource, another TRS is necessarily indicated as a QCL reference, but in this case, only QCL-typeA and QCL-TypeD may be available when the spatial Rx parameter is used as the QCL type according to the related art. As described above, since the pre-compensated TRS has a different Doppler shift value from the non-pre-compensated TRS, the QCL type in which the Doppler shift is excluded should be used to indicate the QCL relationship between the two TRSs. In this case, the QCL type may include at least one of the aforementioned channel characteristics, for example, average delay, delay spread, Doppler spread, and Spatial Rx parameter when describing the periodic TRS resource. Therefore, when the QCL reference for a specific aperiodic TRS resource is indicated by another TRS, when the Doppler shift is excluded from the corresponding QCL type, the terminal may determine that the aperiodic transmission TRS is the pre-compensated TRS.

In addition, if the pre-compensated TRS is a TRS transmitted by SFN, two or more other TRS resources may be indicated as a QCL reference for the corresponding TRS, and the detailed instruction method may be similar to the instruction method for the periodic TRS resource.

As described above, in order to reduce the overhead for the pre-compensated TRS, the pre-compensated TRS may be allowed only for the aperiodic TRS. For example, a QCL relationship in which a QCL reference for a TRS resource is indicated by one or more different TRSs and a Doppler shift is excluded in the corresponding QCL type may be allowed only when the above 'TRS resource' is an aperiodic TRS. Alternatively, a semi-persistent TRS for supporting the pre-compensated TRS may be newly introduced, and the pre-compensation may be allowed only for the semi-persistent TRS. In this case, the QCL relationship of the semi-persistent pre-compensation TRS may be similar to the QCL relationship of the aperiodic TRS.

Meanwhile, when the non-pre-compensated TRS T1 and T2 are SFN and transmitted in multiple TRPs as the same TRS resource, the corresponding TRS may have a plurality of Doppler shift components. Meanwhile, the pre-compensated TRS T3 may be pre-compensated according to a specific component among the plurality of Doppler shift components. At this time, the base station may follow the following method to indicate the pre-compensated Doppler shift component to the terminal.

When the Doppler shift component of the TRS is, for example, decomposed into N components, the base station may indicate the terminal to follow the Doppler shift component corresponding to the $n^{th}$ order (one of n=1, ..., N). In this case, the above order may be based on one or a combination of the magnitude of the value of the Doppler shift component, the magnitude of the delay corresponding to each Doppler shift component, or the magnitude of the power corresponding to each Doppler shift component. For example, the order may be determined by sorting the magnitude of the value of the Doppler shift component, the magnitude of the delay corresponding to each Doppler shift component, or the magnitude of the power corresponding to each Doppler shift component in ascending or descending order.

Alternatively, it may be assumed that the terminal follows a Doppler shift component corresponding to a specific order, for example, the first or last order among the decomposed Doppler shift components.

The above-described methods are merely examples and are not limited thereto. Accordingly, various embodiments such as modifications based on the listed methods or combinations of the listed methods may be possible.

Referring to FIG. 21, the non-pre-compensated TRS T1 and the pre-compensated TRS T3 may be TRS resources that are transmitted at different times but have the same ID. Alternatively, T2 and T4 are transmitted at different times, but may be TRS resources having the same ID. The 'TRS resource having the same ID' is used for the TRS purpose, and may mean a resource located in the same CC and having the same CSI-RS-ResourceSet ID. According to this embodiment, even if the TRS resource having the same ID, whether or not to compensate in advance varies depending on the transmission time, when the terminal periodically receives the corresponding TRS, it may be necessary to recognize that TRS measurement results cannot be aggregated or bundled between specific reception times or between specific periods.

Figure 22:
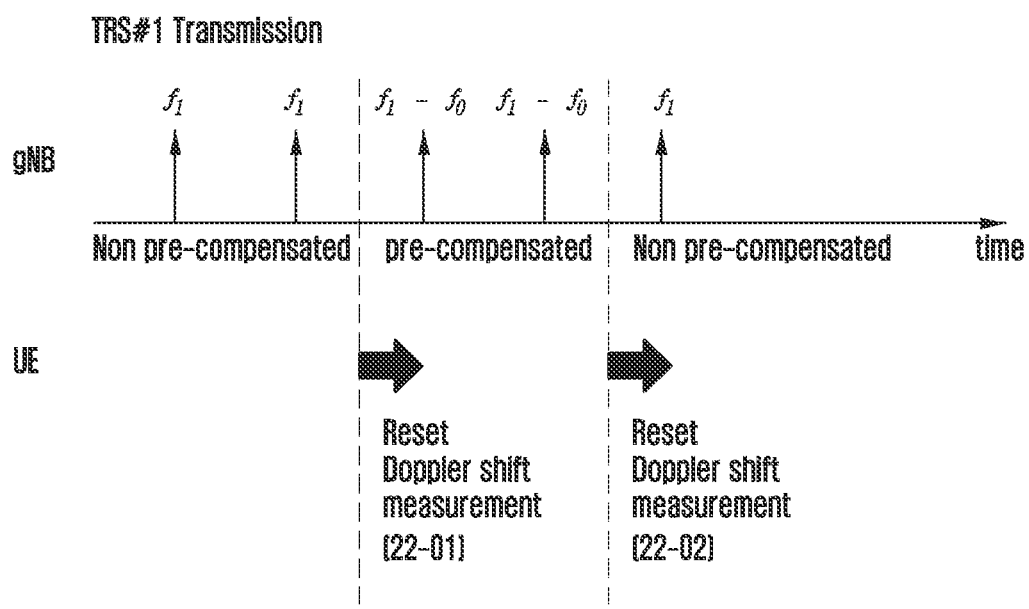
FIG. 22 is a diagram illustrating a method of initializing a measurement result of a corresponding TRS at a specific time when whether or not pre-compensation is performed is changed according to a transmission time of the TRS, according to an embodiment of the disclosure.

FIG. 22 is a diagram illustrating a method of initializing a measurement result of a corresponding TRS at a specific time when whether or not pre-compensation is performed is changed according to a transmission time of the TRS, according to an embodiment of the disclosure.

FIG. 22 illustrates an example in which a Doppler shift measurement result of a specific TRS, for example, TRS #1, is initialized at a specific time when a specific TRS, for example, TRS #1 is transmitted periodically or semi-continuously. For example, if the Doppler shift measurement result is initialized at the time point (22-01), the Doppler shift measurement result measured based on the TRS transmission of the previous time may not be used when estimating the Doppler shift for the TRS transmission of the time (22-01). Similarly, when the Doppler shift measurement result is initialized at the time point 22-02, the Doppler shift result measured based on the TRS transmission before the corresponding time point may not be used when estimating the Doppler shift at a later time point. The time point (22-01) or (22-02) may be one of the following time points.

The time point may be based on every TRS transmission period. This may mean that when the terminal estimates the TRS of a specific period, the TRS estimation result of the previous period is not used. The base station may configure a higher layer indicator in order for the terminal to newly calculate the Doppler shift without reference to the TRS estimation result of the previous period for the corresponding operation, for example, every period. The higher layer indicator may be indicated in the corresponding TRS or in a CSI report related to the corresponding TRS. As an example, a parameter (e.g., a timeRestrictionForChannelMeasurements parameter) configured in a CSI report associated with a CSI-RS resource for channel measurement may be used for the purpose of indicating the operation of the TRS.

The time point may be based on a predefined measurement period. For example, the TRS estimation result may be initialized every X ms period. The period and the Doppler shift measurement operation according to the period may be indicated by the base station to the terminal, and the instruction may be indicated for each TRS resource.

The time point may be a time point at which the base station indicates a specific command or event. For example, after the base station instructs a specific command, the Doppler shift estimation result for the TRS before the command indication time may not be used.

The above-described methods are merely examples and are not limited thereto. Accordingly, various embodiments such as modifications based on the listed methods or combinations of the listed methods may be possible.

For convenience of description, although the channel characteristic for which the measurement result is initialized in the above embodiment is limited to the Doppler shift, the channel characteristic may be extended and applied to other channel characteristics. For example, the Doppler shift may be replaced by at least one of Doppler spread, average delay, and delay spread, or may be included together with Doppler shift.

Embodiment 4: Transmission Method of PDCCH/PDSCH in which Doppler Shift is Pre-Compensated in TRP In this embodiment, details of the fourth operation of the Embodiment 1 are disclosed.

If the pre-compensated TRS is transmitted according to the third operation of Embodiment 1, the pre-compensated PDCCH or PDSCH transmitted according to the fourth operation may indicate a QCL relationship with the pre-compensated TRS. For example, a QCL reference for a pre-compensated PDCCH or PDSCH may be indicated by the pre-compensated TRS resource, and in this case, the QCL type may include at least one of QCL-typeA and QCL-typeD.

Meanwhile, when the third operation of the first embodiment is omitted, the TRS resource to refer to the Doppler shift characteristic of the pre-compensated PDCCH or PDSCH transmitted according to the fourth operation may not be configured. Therefore, if the non-precompensated TRS transmitted in the first operation of Embodiment 1 is used as the QCL reference of the PDCCH or PDSCH, the Doppler shift channel characteristic may not be included in the referenced channel information characteristic. For example, in the QCL type indicated together with the TRS, channel characteristics of at least one of average delay, delay spread, Doppler spread, and Spatial Rx parameter may be indicated, and the QCL type may not include Doppler shift. In addition, the QCL type may be a new type not previously defined. For example, the QCL type may be a type named QCL-typeE or QCL-typeF. The terminal can determine that the received PDCCH or PDSCH is a pre-compensated channel by the QCL type. The reason is that the non-precompensated PDCCH or PDSCH is indicated by the QCL relation with the TRS resource and QCL typeA (QCL type including Doppler shift) as described above.

Figure 23:
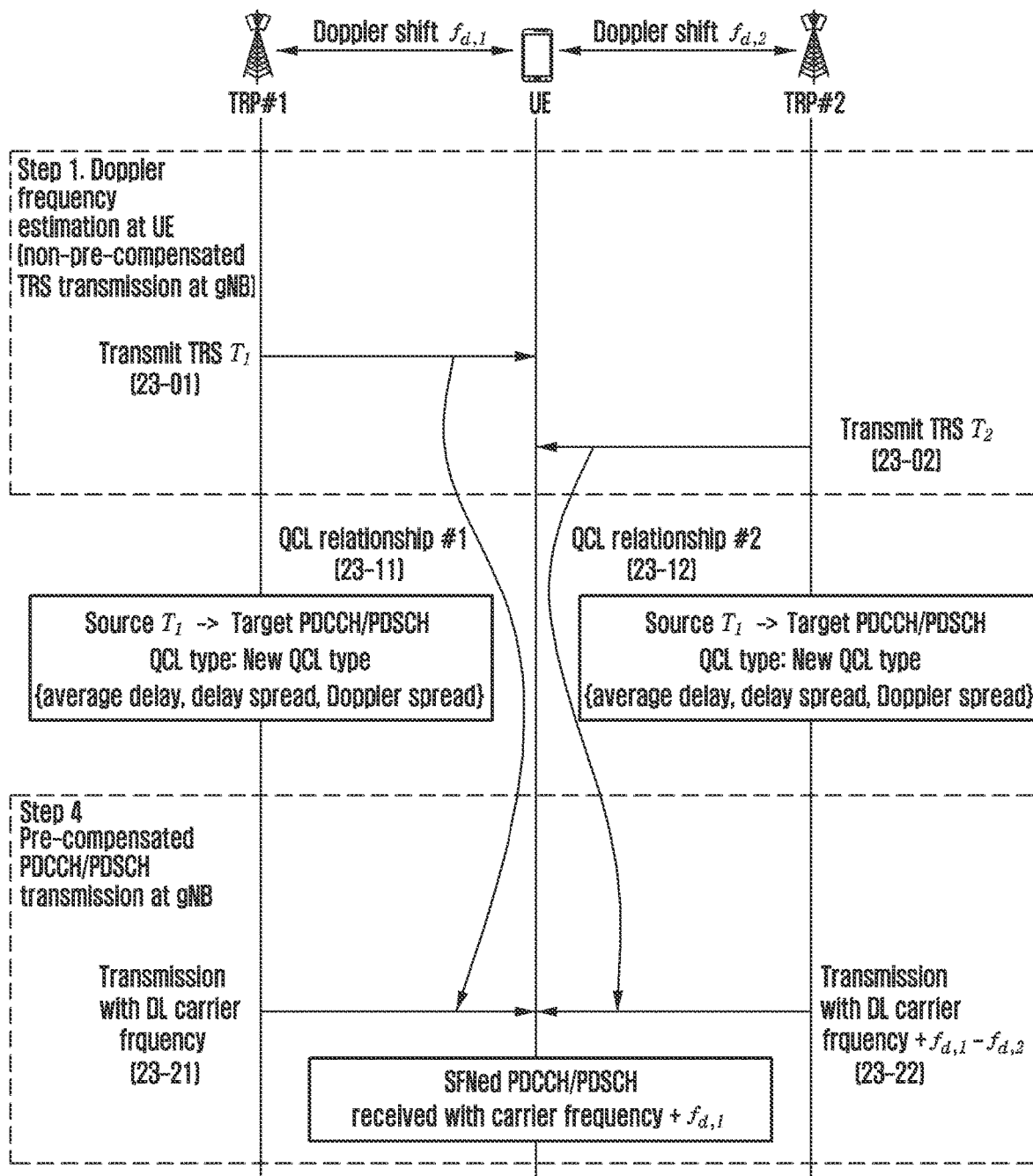
FIG. 23 is a sequence diagram illustrating a method of indicating a QCL relation of a pre-compensated PDCCH or PDSCH according to an embodiment of the disclosure.

FIG. 23 is a sequence diagram illustrating a method of indicating a QCL relation of a pre-compensated PDCCH or PDSCH according to an embodiment of the disclosure.

If independent TRSs, such as T1 and T2, are transmitted for each TRP in the first operation of Example 1 (23-01, 23-02), in the pre-compensated PDCCH or PDSCH (23-21, 23-22), the two TRSs may be indicated as a QCL reference. At this time, if the Doppler shift of the PDCCH or PDSCH is pre-compensated based on T1, the Doppler shift characteristic is shared with the PDCCH or PDSCH and T1, but only the channel characteristics other than the Doppler shift may be shared with the PDCCH or PDSCH and T2. At least one of the following may be considered as a method of sharing the above-described channel characteristics when indicating a QCL relationship for PDCCH or PDSCH reception.

When the base station indicates T1 and T2 through the QCL reference, different QCL types (23-11, 23-12) may be indicated to each reference RS. For example, QCL-typeA may be indicated to T1, but a new QCL type excluding Doppler shift may be indicated to T2.

When the base station indicates T1 and T2 through the QCL reference, the terminal may assume the value measured at T1 as a reference of the Doppler shift. The T1 may be expressed differently as the first indicated QCL reference RS, TRS with lower index, and the like.

When the base station indicates T1 and T2 through the QCL reference, the terminal may assume a Doppler shift corresponding to the reference signal used for the uplink carrier frequency setting in the second operation of the first embodiment.

The above-described methods are merely examples and are not limited thereto. Accordingly, various embodiments such as modifications based on the listed methods or combinations of the listed methods may be possible.

If the TRPs transmit one TRS in the SFN manner in the first operation of embodiment 1, in the pre-compensated PDCCH or PDSCH (23-21, 23-22), the one TRS may be indicated as a QCL reference. At this time, if the Doppler shift of the PDCCH or PDSCH is pre-compensated based on at least one of the Doppler shift components of the TRS, only channel characteristics other than the Doppler shift may be shared between the PDCCH or the PDSCH and the TRS. Since the channel estimation accuracy may be low to measure the Doppler shift with only the PDCCH or the PDSCH, the base station may consider the following as the following method for instructing the terminal the Doppler shift characteristics of the PDCCH or PDSCH pre-compensated with the TRS.

When the Doppler shift component of the TRS is, for example, decomposed into N components, the base station may indicate the terminal to follow the Doppler shift component corresponding to the $n^{th}$ order (one of n=1, . . . , N). In this case, the above order may be based on one or a combination of the magnitude of the value of the Doppler shift component, the magnitude of the delay corresponding to each Doppler shift component, or the magnitude of the power corresponding to each Doppler shift component, for example. For example, the order may be determined by sorting them in ascending or descending order.

Alternatively, it may be assumed that the terminal follows a Doppler shift component corresponding to a specific order, for example, the first or last order among the decomposed Doppler shift components.

The above-described methods are merely examples and are not limited thereto. Accordingly, various embodiments such as modifications based on the listed methods or combinations of the listed methods may be possible.

The pre-compensation indication method for the PDCCH or PDSCH described above in Embodiment 4 is equally applicable to pre-compensation of other channels capable of pre-compensation, for example, CSI-RS for channel estimation.

Figure 24:
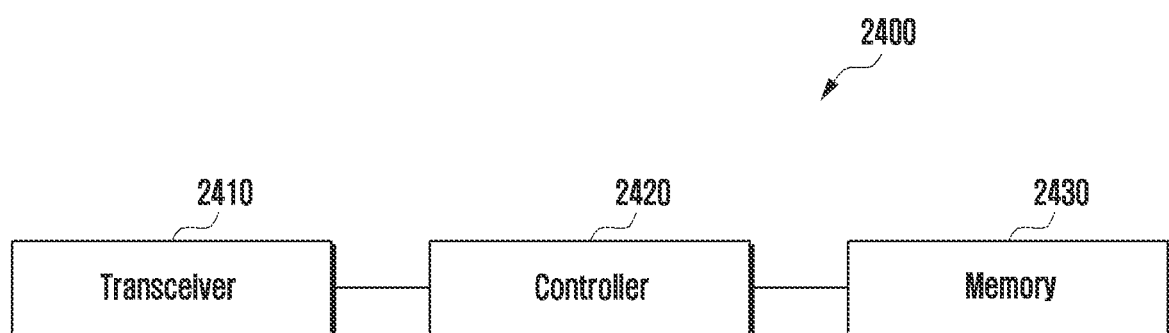
FIG. 24 is a diagram illustrating a structure of a terminal according to an embodiment of the disclosure.

FIG. 24 is a diagram illustrating a structure of a terminal according to an embodiment of the disclosure.

Referring to FIG. 24, the terminal 2400 may include a transceiver 2410, a controller 2420, and a memory 2430. According to an efficient channel and signal transmission/reception method in the 5G communication system corresponding to the above-described embodiment, the transceiver 2410, the controller 2420, and the memory 2430 of the terminal 2400 may operate. However, the components of the terminal 2400 according to an embodiment are not limited to the above-described example. According to another embodiment, the terminal 2400 may include more or fewer components than the aforementioned components. In addition, in a specific case, the transceiver 2410, the controller 2420, and the memory 2430 may be implemented in the form of a single chip.

The transceiver 2410 may include a transmitter and a receiver according to another embodiment. The transceiver 2410 may transmit/receive a signal to/from the base station. The signal may include control information and data. To this end, the transceiver 2410 may include an RF transmitter that up-converts and amplifies the frequency of a transmitted signal, and an RF receiver that low-noise amplifies and down-converts a received signal. In addition, the transceiver 2410 may receive a signal through a wireless channel, output the signal to the controller 2420, and transmit a signal output from the controller 2420 through a wireless channel.

The controller 2420 may control a series of processes in which the terminal 2400 may operate according to the above-described embodiment of the disclosure. For example, the controller 2420 may perform at least one of the methods for performing TCI emulation according to an embodiment. The storage unit 2430 may store control information or data such as TCI or QCL setting information included in a signal obtained from the terminal 2400, and may have an area for storing data required for control by the controller 2420 and data generated during control by the controller 2420.

Figure 25:
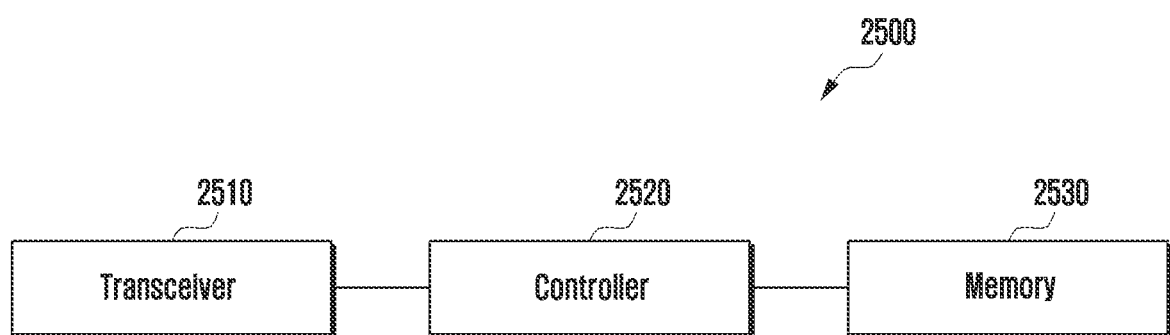
FIG. 25 is a diagram illustrating a structure of a base station according to an embodiment of the disclosure.

FIG. 25 is a diagram illustrating a structure of a base station according to an embodiment of the disclosure.

Referring to FIG. 25, the base station 2500 may include a transceiver 2510, a controller 2520, and a memory 2530. According to an efficient method for transmitting and receiving channels and signals in the 5G communication system corresponding to the above-described embodiment, the transceiver 2510, the controller 2520, and the memory 2530 of the base station 2500 may operate. However, the components of the base station 2500 according to an embodiment are not limited to the above-described example. According to another embodiment, the base station 2500 may include more or fewer components than the above-described components. In addition, in a specific case, the transceiver 2510, the controller 2520, and the storage unit 2530 may be implemented in the form of a single chip. The transceiver 2510 may include a transmitter and a receiver according to another embodiment. The transceiver 2510 may transmit/receive a signal to/from the terminal. The signal may include control information and data. To this end, the transceiver 2510 may include an RF transmitter for up-converting and amplifying the frequency of a transmitted signal, and an RF receiver for low-noise amplifying and down-converting a received signal. In addition, the transceiver 2510 may receive a signal through a wireless channel, output the signal to the controller 2520, and transmit the signal output from the controller 2520 through a wireless channel The controller 2520 may control a series of processes so that the base station 2500 can operate according to the above-described embodiment of the disclosure. For example, the controller 2520 may perform at least one of the TCI emulation methods according to an embodiment of the disclosure.

The memory 2530 may store control information such as TCI or QCL setting information determined by the base station 2500, data, or control information and data received from the terminal, and data necessary for the control of the control unit 2520, and may have an area for storing data required for control by the controller 2520 and data generated during control by the controller 2520.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method performed by a terminal in a wireless communication system, the method comprising:
receiving, from a base station, control information configuring a first transmission configuration indicator (TCI) state and a second TCI state associated respectively with a first transmission and reception point (TRP) and a second TRP operating a single frequency network (SFN) scheme transmission; and
receiving, from the base station, a downlink channel assuming that the downlink channel is quasi co-located with downlink reference signals of the first and second TCI states except for a Doppler shift related quasi co-location parameter of the second TCI state.

2. The method of claim 1, wherein the downlink channel is a physical downlink control channel (PDCCH) or a physical downlink shared channel (PDSCH).

3. The method of claim 1, wherein the downlink reference signals are channel state information reference signals (CSI-RSs) for tracking.

4. The method of claim 1, wherein the downlink reference signals are transmitted without frequency offset pre-compensation.

5. The method of claim 1, wherein the downlink channel is quasi co-located with the downlink reference signal of the first TCI state with respect to Doppler shift.

6. A method performed by a base station in a wireless communication system, the method comprising:
transmitting, to a terminal, control information configuring a first transmission configuration indicator (TCI) state and a second TCI state associated respectively with a first transmission and reception point (TRP) and a second TRP operating a single frequency network (SFN) scheme transmission; and
transmitting, to the terminal, a downlink channel,
wherein the downlink channel is quasi co-located with downlink reference signals of the first and second TCI states except for a Doppler shift related quasi co-location parameter of the second TCI state.

7. The method of claim 6, wherein the downlink channel is a physical downlink control channel (PDCCH) or a physical downlink shared channel (PDSCH).

8. The method of claim 6, wherein the downlink reference signals are channel state information reference signals (CSI-RSs) for tracking.

9. The method of claim 6, wherein the downlink reference signals are transmitted without frequency offset pre-compensation.

10. The method of claim 6, wherein the downlink channel is quasi co-located with the downlink reference signal of the first TCI state with respect to Doppler shift.

11. A terminal in a wireless communication system, the terminal comprising:
a transceiver; and
a controller configured to:
receive, from a base station via the transceiver, control information configuring a first transmission configuration indicator (TCI) state and a second TCI state associated respectively with a first transmission and reception point (TRP) and a second TRP operating a single frequency network (SFN) scheme transmission, and
receive, from the base station via the transceiver, a downlink channel assuming that the downlink channel is quasi co-located with downlink reference signals of the first and second TCI states except for a Doppler shift related quasi co-location parameter of the second TCI state.

12. The terminal of claim 11, wherein the downlink channel is a physical downlink control channel (PDCCH) or a physical downlink shared channel (PDSCH).

13. The terminal of claim 11, wherein the downlink reference signals are channel state information reference signals (CSI-RSs) for tracking.

14. The terminal of claim 11, wherein the downlink reference signals are transmitted without frequency offset pre-compensation.

15. The terminal of claim 11, wherein the downlink channel is quasi co-located with the downlink reference signal of the first TCI state with respect to Doppler shift.

16. A base station in a wireless communication system, the base station comprising:
a transceiver; and
a controller configured to:
transmit, to a terminal via the transceiver, control information configuring a first transmission configuration indicator (TCI) state and a second TCI state associated respectively with a first transmission and reception point (TRP) and a second TRP operating a single frequency network (SFN) scheme transmission, and
transmit, to the terminal via the transceiver, a downlink channel,
wherein the downlink channel is quasi co-located with downlink reference signals of the first and second TCI states except for a Doppler shift related quasi co-location parameter of the second TCI state.

17. The base station of claim 16, wherein the downlink channel is a physical downlink control channel (PDCCH) or a physical downlink shared channel (PDSCH).

18. The base station of claim 16, wherein the downlink reference signals are channel state information reference signals (CSI-RSs) for tracking.

19. The base station of claim 16, wherein the downlink reference signals are transmitted without frequency offset pre-compensation.

20. The base station of claim 16, wherein the downlink channel is quasi co-located with the downlink reference signal of the first TCI state with respect to Doppler shift.

* * * * *